United States Patent
Ejiri et al.

[11] Patent Number: 6,025,082
[45] Date of Patent: *Feb. 15, 2000

[54] MAGNETIC RECORDING MEDIUM

[75] Inventors: Kiyomi Ejiri; Hiroo Inaba; Shinji Saito; Satoru Hayakawa, all of Odawara, Japan

[73] Assignee: Fuji Photo Film Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/846,035

[22] Filed: Apr. 25, 1997

Related U.S. Application Data

[63] Continuation of application No. 07/873,201, Apr. 24, 1992, Pat. No. 5,645,917, which is a continuation-in-part of application No. 07/822,975, Jan. 21, 1992, Pat. No. 5,258,223, and a continuation of application No. 08/761,084, Dec. 4, 1996, Pat. No. 5,756,148.

[30] Foreign Application Priority Data

| Jan. 21, 1991 | [JP] | Japan | 3-019221 |
| Apr. 25, 1991 | [JP] | Japan | 3-121873 |
| Apr. 25, 1991 | [JP] | Japan | 3-121875 |
| Jul. 15, 1991 | [JP] | Japan | 3-198309 |
| Jan. 8, 1992 | [JP] | Japan | 4-18416 |
| Jan. 10, 1992 | [JP] | Japan | 4-21782 |

[51] Int. Cl.[7] ................................. G11B 5/66
[52] U.S. Cl. ............... 428/694 B; 428/694 BN; 428/694 BS; 428/694 ST; 428/323; 428/328; 428/329; 428/331; 428/336; 428/900
[58] Field of Search ........... 428/694 BN, 694 B, 428/694 BS, 694 ST, 323, 328, 329, 331, 336, 900

[56] References Cited

U.S. PATENT DOCUMENTS

| 4,163,823 | 8/1979 | Legras et al. | 428/317.9 |
| 4,439,795 | 3/1984 | Kitamoto et al. | 360/131 |
| 4,447,270 | 8/1994 | Howard et al. | 106/438 |

(List continued on next page.)

FOREIGN PATENT DOCUMENTS

| 0 392 810 A2 | 10/1990 | European Pat. Off. |
| 54-30002 | 3/1980 | Japan |
| 55-55438 | 4/1980 | Japan |
| 55-139634 | 7/1980 | Japan |

(List continued on next page.)

OTHER PUBLICATIONS

JEI Publication dated Apr. 1992, article entitled "Fuji's Super–Double Coating Strengthens ME–Position Hi8 Videotape".

SMPTE Publication presented Nov. 10–13, 1993 entitled "Electromagnetic Characteristics of Metal Particulate Media With a Thin Magnetic Layer".

Primary Examiner—Leszek Kiliman
Attorney, Agent, or Firm—Stroock & Stroock & Lavan LLP

[57] ABSTRACT

A magnetic recording medium is disclosed, comprising a non-magnetic support having provided thereon at least a lower non-magnetic layer comprising a binder having dispersed therein a non-magnetic powder and an upper magnetic layer comprising a binder having dispersed therein a ferromagnetic powder which has been coated on said lower non-magnetic layer while the lower non-magnetic layer is wet, wherein the upper magnetic layer has an average dry thickness (d) of not more than 1.0 $\mu$m and an average thickness variation ($\Delta$d) at the interface between the upper magnetic layer and lower non-magnetic layer is not more than d/2. The magnetic recording medium exhibits excellent electromagnetic characteristics, running properties, and durability.

13 Claims, 2 Drawing Sheets

U.S. PATENT DOCUMENTS

| | | | |
|---|---|---|---|
| 4,452,830 | 6/1984 | Yoshizumi | 427/215 |
| 4,465,737 | 8/1984 | Miyatuka et al. | 428/339 |
| 4,506,000 | 3/1985 | Kubota et al. | 430/39 |
| 4,507,157 | 3/1985 | Oliver, Jr. | 117/56 |
| 4,528,240 | 7/1985 | Miyoshi et al. | 428/323 |
| 4,587,157 | 5/1986 | Brock et al. | 428/216 |
| 4,617,226 | 10/1986 | Yamaguchi et al. | 428/216 |
| 4,619,856 | 10/1986 | Kamada et al. | 428/143 |
| 4,639,930 | 1/1987 | Kuo et al. | 373/120 |
| 4,649,073 | 3/1987 | Suzuki et al. | 428/212 |
| 4,654,260 | 3/1987 | Chubachi et al. | 428/328 |
| 4,664,975 | 5/1987 | Kobayasi et al. | 428/323 |
| 4,666,769 | 5/1987 | Miyata et al. | 428/323 |
| 4,708,906 | 11/1987 | Sekiyo et al. | 428/336 |
| 4,710,421 | 12/1987 | Ono et al. | 428/218 |
| 4,741,953 | 5/1988 | Katsuta et al. | 428/323 |
| 4,746,558 | 5/1988 | Shimozawa et al. | 428/141 |
| 4,756,953 | 7/1988 | Utsumi | 428/220 |
| 4,784,985 | 11/1988 | Mizuno et al. | 512/25 |
| 4,794,042 | 12/1988 | Kubota et al. | 428/328 |
| 4,839,225 | 6/1989 | Matsufuji et al. | 428/336 |
| 4,844,963 | 7/1989 | Takasuna et al. | 428/65.3 |
| 4,847,147 | 7/1989 | Aonuma et al. | 428/329 |
| 4,851,289 | 7/1989 | Ogawa et al. | 428/329 |
| 4,854,262 | 8/1989 | Chino et al. | 118/411 |
| 4,857,388 | 8/1989 | Ogawa et al. | 428/212 |
| 4,863,791 | 9/1989 | Steward et al. | 428/310.5 |
| 4,863,793 | 9/1989 | Ogowe | 428/323 |
| 4,865,924 | 9/1989 | Saito et al. | 428/694 BM |
| 4,874,633 | 10/1989 | Komatsu et al. | 427/549 |
| 4,910,068 | 3/1990 | Takagi et al. | 428/141 |
| 4,916,024 | 4/1990 | Kasuga et al. | 428/323 |
| 4,943,479 | 7/1990 | Yamada et al. | 428/331 |
| 4,952,444 | 8/1990 | Kawamata et al. | 428/141 |
| 4,963,433 | 10/1990 | Ogawa et al. | 428/323 |
| 4,965,120 | 10/1990 | Ono et al. | 428/213 |
| 5,030,484 | 7/1991 | Chino et al. | 427/434.3 |
| 5,032,428 | 7/1991 | Ogawa et al. | 427/130 |
| 5,051,291 | 9/1991 | Kawahara et al. | 428/141 |
| 5,051,303 | 9/1991 | Noguchi et al. | 428/329 |
| 5,093,192 | 3/1992 | Kawahara et al. | 428/323 |
| 5,104,750 | 4/1992 | Kubo et al. | 428/694 MT |
| 5,112,679 | 5/1992 | Nakagawa et al. | 428/323 |
| 5,151,323 | 9/1992 | Kawahara et al. | 428/323 |
| 5,156,908 | 10/1992 | Araki et al. | 428/323 |
| 5,160,761 | 11/1992 | Koga et al. | 427/548 |
| 5,196,265 | 3/1993 | Ryoke et al. | 428/332 |
| 5,219,670 | 6/1993 | Ohno et al. | 428/694 B |
| 5,258,223 | 11/1993 | Inaba et al. | 428/323 |
| 5,266,376 | 11/1993 | Okazaki et al. | 428/141 |
| 5,268,206 | 12/1993 | Komatsu et al. | 427/548 |
| 5,300,314 | 4/1994 | Hayakawa et al. | 427/58 |
| 5,318,838 | 6/1994 | Matsufuji et al. | 428/328 |
| 5,358,777 | 10/1994 | Kojima et al. | 428/212 |
| 5,384,175 | 1/1995 | Kojima et al. | 428/65.3 |
| 5,455,104 | 10/1995 | Sehigucho | 428/212 |
| 5,455,112 | 10/1995 | Inaba et al. | 428/323 |
| 5,458,948 | 10/1995 | Yanogite | 478/141 |
| 5,489,466 | 2/1996 | Inaba et al. | 428/212 |
| 5,503,911 | 4/1996 | Aoki et al. | 428/213 |
| 5,514,464 | 5/1996 | Sasaki et al. | 428/323 |
| 5,518,804 | 5/1996 | Mizuno | 428/212 |
| 5,532,041 | 7/1996 | Honjo et al. | 428/141 |
| 5,537,638 | 7/1996 | Saito | 428/141 |
| 5,547,772 | 8/1996 | Saito et al. | 428/694 B |
| 5,645,917 | 7/1997 | Ejin | 428/141 |
| 5,672,423 | 9/1997 | Inobe | 428/323 |

FOREIGN PATENT DOCUMENTS

| | | |
|---|---|---|
| 57-6178 | 2/1982 | Japan . |
| 57-198536 | 12/1982 | Japan . |
| 58-85931 | 5/1983 | Japan . |
| 58-139337 | 9/1983 | Japan . |
| 58-159228 | 10/1983 | Japan . |
| 58-51327 | 11/1983 | Japan . |
| 59-8124 | 1/1984 | Japan . |
| 59-154646 | 9/1984 | Japan . |
| 60-109020 | 6/1985 | Japan . |
| 60-154327 | 8/1985 | Japan . |
| 60-164926 | 8/1985 | Japan . |
| 60-193130 | 10/1985 | Japan . |
| 61-172215 | 7/1986 | Japan . |
| 61-204827 | 9/1986 | Japan . |
| 61-204829 | 9/1986 | Japan . |
| 61-214127 | 9/1986 | Japan . |
| 61-216116 | 9/1986 | Japan . |
| 61-237623 | 10/1986 | Japan . |
| 61-241325 | 10/1986 | Japan . |
| 62-001115 | 1/1987 | Japan . |
| 62-1115 | 1/1987 | Japan . |
| 62-36727 | 2/1987 | Japan . |
| 62-22235 | 3/1987 | Japan . |
| 62-33337 | 5/1987 | Japan . |
| 62-92128 | 7/1987 | Japan . |
| 62-159338 | 8/1987 | Japan . |
| 62-188017 | 8/1987 | Japan . |
| 62-222427 | 9/1987 | Japan . |
| 62-234231 | 10/1987 | Japan . |
| 63-146210 | 6/1988 | Japan . |
| 63-157313 | 6/1988 | Japan . |
| 63-164022 | 7/1988 | Japan . |
| 63-113931 | 11/1988 | Japan . |
| 63-317926 | 12/1988 | Japan . |
| 1-109518 | 4/1989 | Japan . |
| 1-119916 | 5/1989 | Japan . |
| 1-220120 | 9/1989 | Japan . |
| 1-235211 | 9/1989 | Japan . |
| 1-248318 | 10/1989 | Japan . |
| 1-276422 | 12/1989 | Japan . |
| 1-300419 | 12/1989 | Japan . |
| 2-15415 | 1/1990 | Japan . |
| 2-58727 | 5/1990 | Japan . |
| 2-149916 | 6/1990 | Japan . |
| 2-98816 | 6/1990 | Japan . |
| 2-194063 | 7/1990 | Japan . |
| 2-208824 | 7/1990 | Japan . |
| 2-307806 | 8/1990 | Japan . |
| 2-257424 | 10/1990 | Japan . |
| 3-17817 | 1/1991 | Japan . |
| 3-5913 | 1/1991 | Japan . |
| 3-157812 | 2/1991 | Japan . |
| 3-49032 | 3/1991 | Japan . |
| 3-80422 | 4/1991 | Japan . |
| 3-88118 | 4/1991 | Japan . |
| 3-219424 | 8/1991 | Japan . |
| 4-271010 | 9/1992 | Japan . |
| 1417442 | 12/1975 | United Kingdom . |
| 1417765 | 12/1975 | United Kingdom . |

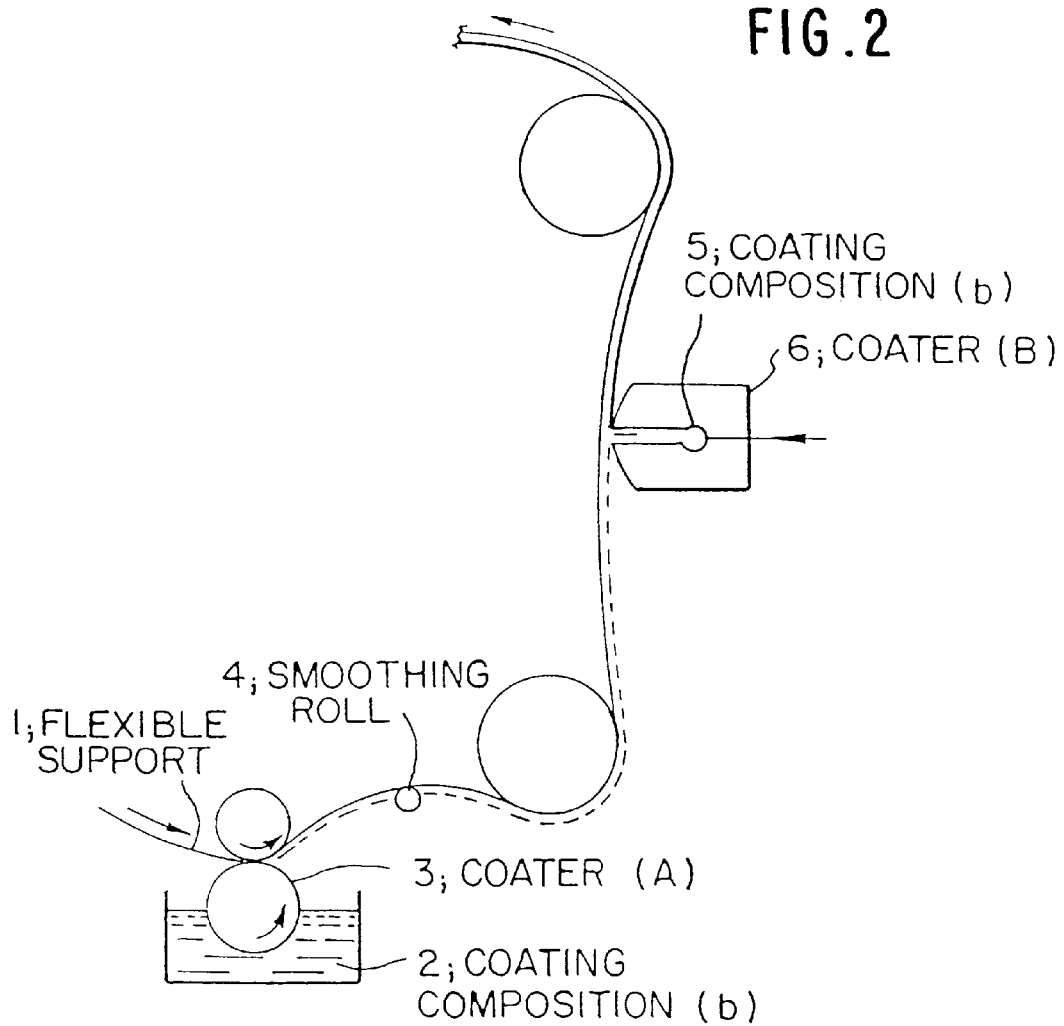
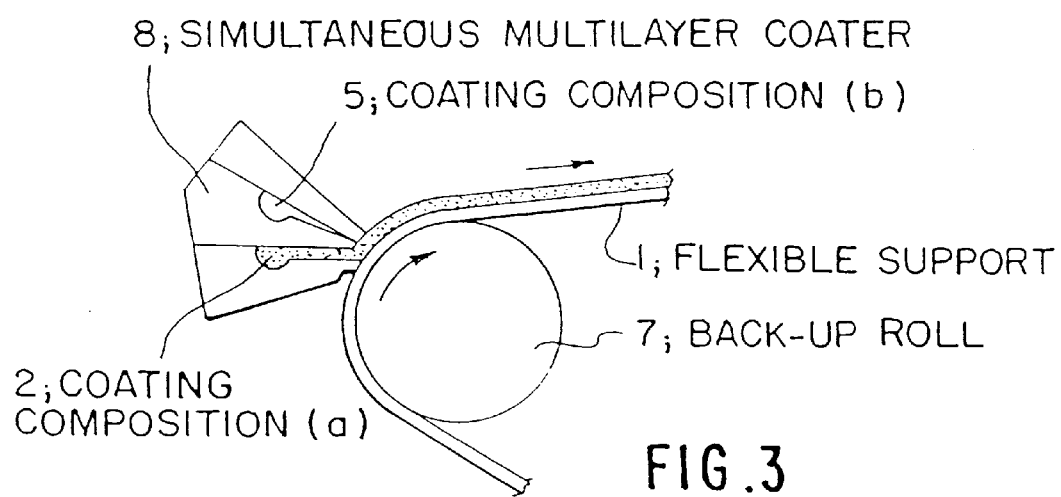

MAGNETIC RECORDING MEDIUM

This Application is a continuation of application Ser. No. 07/873,201, filed Apr. 24, 1992, now U.S. Pat. No. 5,645,917 for MAGNETIC RECORDING MEDIUM, which is a Continuation-In-Part of application Ser. No. 07/822,975, filed Jan. 21, 1992, which issued as U.S. Pat. No. 5,258,223. This application is also a continuation of Ser. No. 08/761,084, filed Dec. 4, 1996, now U.S. Pat. No. 5,756,148 which is a Continuation of application Ser. No. 07/873,201, filed Apr. 24, 1992, now U.S. Pat. No. 5,645,917 which is a Continuation-In-Part of application Ser. No. 07/822,975, filed Jan. 21, 1992, which issued as U.S. Pat. No. 5,258,223.

FIELD OF THE INVENTION

This invention relates to a magnetic recording medium, and more particularly to a thin high-density magnetic recording medium having a magnetic layer of not more than 1.0 $\mu$m in thickness which exhibits excellent electromagnetic characteristics, running properties, durability, and satisfactory productivity.

BACKGROUND OF THE INVENTION

Magnetic recording media comprising a non-magnetic support having thereon a magnetic layer comprising a binder having dispersed therein a magnetic powder, such as ferromagnetic iron oxide powder, Co-doped iron oxide powder, $CrO_2$ powder, and a ferromagnetic alloy powder have widespread applications as video tape, audio tape, and magnetic discs.

Short wave recording has recently been introduced to meet the demand for an increased recording density. For example, the recording wavelength for 8 mm-video tape has reached 0.54 m$\mu$. With this tendency, there has arisen a problem of so-called thickness loss on reproduction, that is, reproduction output is reduced as a function of increasing magnetic layer thickness.

In order to cope with this problem encountered in short wave recording, magnetic recording media using a thin film of a ferromagnetic metal have been put to practical use which have a very small thickness due to use of formation methods such as vacuum deposition techniques. Such metal-deposited recording media suffer little thickness loss and attain a very high reproduction output. However, production of such thin film magnetic metal-deposited recording media by vacuum evaporation of a metal on a non-magnetic support is less suited to mass production as compared with so-called coated type magnetic layers formed by the conventional coating techniques involving dispersions of ferromagnetic powders in a binder system. In addition, the metallic film is less reliable for long-term use because of susceptibility to air oxidation.

Therefore, it has been attempted to instead reduce the thickness of a magnetic layer formed by various manipulations of the conventional coating technique to thereby increase reproduction output. However, as the thickness of a magnetic layer is decreased to about 2 $\mu$m or less, the surface properties of a support are apt to strongly influence the surface properties of the magnetic layer resulting in deterioration of electromagnetic characteristics.

In order to reduce the thickness of a magnetic layer to minimize thickness loss of magnetic properties thereby achieving a high output while excluding the adverse influences of a support surface, it has been proposed to provide a thick non-magnetic layer between a non-magnetic support and a thin magnetic layer. For example, U.S. Pat. No. 2,819,186 discloses a magnetic recording medium comprising a support having thereon a hard and brittle magnetic layer having a magnetic substance content of 85% by weight or more and a thickness of not more than 0.25 mil as an upper layer and a soft and flexible non-magnetic lower layer having a higher thickness than the upper magnetic layer. JP-A-62-154225 (the term "JP-A" as used herein means an "unexamined published Japanese patent application") discloses a magnetic recording medium having a magnetic layer thickness of 0.5 $\mu$m or less with a subbing layer provided between the magnetic layer and the support containing carbon black as a conductive fine powder and having a thickness greater than the magnetic layer so as to prevent surface resistance of the magnetic layer from increasing. JP-A-62-222427 discloses a magnetic recording medium comprising a support having thereon a subbing layer containing an abrasive having an average particle size of from 0.5 to 3 $\mu$m and a 1 $\mu$m or less thick magnetic layer containing a ferromagnetic powder, in this order, in which a part of the abrasive in the subbing layer projects through the magnetic layer so as to serve for cleaning of a magnetic head. Thus, it has been suggested to provide a non-magnetic lower layer immediately adjacent the support to reduce the thickness of a magnetic layer thereby to achieve high-density recording and, at the same time, to incorporate into the lower non-magnetic layer additives such as carbon black for static charge prevention or an abrasive for improvement in cleaning characteristics or durability.

However, conventional techniques for producing these magnetic recording media having a lower non-magnetic layer and an upper magnetic layer involve complicated processes. For example, such processes comprise first coating a non-magnetic layer on a non-magnetic support, then drying the non-magnetic layer, and then, if desired, followed by calendering, and thereafter coating a magnetic layer thereon. However, problems have been identified with these conventional techniques.

For instance, reduction in thickness of a magnetic layer is achieved either by reducing the application rate or by using an increased amount of a solvent in a magnetic binder coating composition to reduce the ultimate film concentration. Yet, when the former approach is taken, drying of the coating transpires too quickly before sufficient leveling can occur to leave surface defects such as streaks or traces of coating pattern, resulting in very poor yield. On the other hand, when the latter approach is taken, a thin coating composition provides a coating film with many voids, resulting in shortage of packing of a ferromagnetic powder or insufficient film strength.

In order to overcome these problems, it has been proposed to form a non-magnetic layer as a lower layer and a thin coat of a highly concentrated magnetic coating composition by a simultaneous coating system. For example, JP-A-63-191315 discloses a magnetic recording medium having a lower non-magnetic layer and an upper magnetic layer formed by simultaneous coating, in which the lower layer has a thickness of 0.5 $\mu$m or more and contains no polyisocyanate.

Extensive studies have hitherto been given to the above-described simultaneous coating system or successive wet coating system, called wet-on-wet coating, for formation of a plurality of magnetic layers. However, the same techniques cannot be applied to the lower non-magnetic layer to obtain satisfactory results. That is, where a lower non-magnetic layer and an upper magnetic layer are formed by wet-on-wet coating, disturbances occur in the interface between the upper and lower layers, causing pinholes or run-away of the magnetic coating composition.

Further, although a thick non-magnetic layer formed beneath a magnetic layer eliminates the influences of the surface roughness of the support, the problem of wearability against a recording head or durability is left unmitigated. The poor wearability or durability of conventional magnetic recording media having a non-magnetic lower layer appears attributable to curing of the lower layer comprising a thermosetting resin as a binder for reasons that the magnetic layer formed thereon is brought into contact with a head or other members without cushioning and that the magnetic recording media having such a cured lower layer lacks the desired flexibility.

This problem might be resolved by using a non-curing (thermoplastic) resin as a binder in the lower layer. However, when a magnetic layer is coated on a dry lower layer containing such a non-curing resin, as in the conventional technique, the lower layer is swollen with the organic solvent of the magnetic coating composition, giving undesired influences, such as turbulence of the magnetic coating composition, leading to impairment of the surface properties of the magnetic layer and deterioration of electromagnetic characteristics.

Furthermore, a magnetic coating composition must be diluted with a relatively large quantity of a solvent before it can be coated to a dry thickness of not more than 1.0 μm. Such a diluted coating composition is susceptible to agglomeration. Further, orientation of a ferromagnetic powder is apt to be disturbed during drying due to evaporation of the large quantity of organic solvent. When the medium has a non-continuous form, for example, if it is a magnetic disc, adequate performance properties may still be obtainable to some extent even in using such a thin magnetic coating composition. However, with respect to those media having a continuous form, such as magnetic tapes, although the purpose of thickness reduction is accomplished, it is difficult to obtain sufficient electromagnetic characteristics because of deteriorated orientation and deteriorated surface properties. In addition, many voids are produced during drying, resulting in poor film strength in running. If the amount of the diluting organic solvent is decreased in order to improve orientation properties and to minimize voids, the coating stability would be deteriorated, leading to formation of many pinholes and an increased production of defective media.

On other other hand, it is known that performance properties of digital recording media may be improved by reducing the thickness of a magnetic layer. Thickness reduction is effective, in principle, but gives rise to production problems. That is, coating defects such as pinholes and coating streaks occur, and a sufficient yield cannot be reached. Further, since calendering effects would be reduced with thickness reduction, the resulting magnetic layer has poor surface properties and unsatisfactory electromagnetic characteristics.

It is suggested to overcome these problems by simultaneously forming a relatively thick non-magnetic layer as a lower layer and a thin magnetic layer of 1 μm or less in thickness as an upper layer, followed by calendering. To this effect, incorporation of non-magnetic abrasive particles or fillers into the lower layer has been proposed as disclosed in JP-A-62-22242 and JP-A-2-257424. However, when a magnetic layer and a non-magnetic layer are simultaneously coated, and the magnetic substance in the upper layer is orientated, the two layers are mixed at the interface due to the rotary motion of the magnetic substance in a magnetic field. As a result, the surface properties and orientation become insufficient, with a failure to obtain sufficient electromagnetic characteristics.

It has been proposed to provide a non-magnetic and conductive intermediate layer containing graphite flakes to improve orientation of the magnetic powder in the upper layer as described in JP-A-55-55438. Although an improvement in orientation can be achieved by this proposal, graphite itself has no film reinforcing effect, and the resulting recording medium lacks in durability. Incorporation of an inorganic powder having a Mohs hardness of 5 or more into the non-magnetic layer has also been proposed as disclosed in JP-A-60-125926. Similarly, it has been proposed to provide a non-magnetic reinforcing layer containing acicular oxalate particles to improve orientation of the magnetic powder in the upper layer as disclosed in JP-B-58-51327 (the term "JP-B" as used herein means an "examined published Japanese patent application").

Orientation properties and durability can be improved by these proposals. In actual production of magnetic recording media, nevertheless, both the flaky particles and oxalates impair surface smoothness of the magnetic layer because the former is susceptible to particle stacking, and the latter exhibits poor dispersibility in binders.

Further, in order to achieve high-density and high-output recording, magnetic recording media are demanded to have high surface smoothness so as to minimize spacing loss in contact with a recording head. Accordingly, a lower non-magnetic layer, while not being exposed, is also increasingly demanded to have a smooth surface for coating an upper magnetic layer thereon. In addition, the influence of dispersibility in the lower non-magnetic layer on the surface properties of the upper magnetic layer simultaneously formed thereon increases with the thickness reduction of the magnetic layer. Further investigations revealed that only an improvement in dispersibility of the lower layer does not suffice for obtaining satisfactory surface smoothness of the upper layer which is simultaneously formed thereon.

A magnetic layer should have a considerable coercive force (Hc) because if a magnetic layer has a low coercive force, it suffers a great self-demagnetization loss and is not suitable for short wave recording. To this effect, it has been proposed to provide a subbing layer having a thickness of from 0.5 to 5.0 μm between a non-magnetic support and a magnetic layer so that the magnetic layer may have an Hc of 1000 Oe as disclosed in JP-A-57-198536.

However, conventional techniques when applied to effecting this proposal involve problems. That is, when the technique disclosed in JP-A-57-198536 is used for simultaneous formation of such a subbing layer and the upper magnetic layer, the upper and lower layers are mixed, causing not only deteriorated surface properties but disturbed orientation. A technique for improving orientation in simultaneous coating is suggested in JP-A-3-49032, in which carbon black is dispersed in the lower layer, and orientation is conducted in multiple stages. Nevertheless, fillers having a small true specific gravity such as carbon black yield to the influence of the rotary motion of the magnetic substance during orientation, resulting in disturbance of the interface between the upper and lower layers on simultaneous coating. Thus, the above proposal, though achieving a high squareness ratio as measured in the planar direction, was insufficient for obtaining an improved residual coercive force in the direction of the normal of the magnetic layer as purposed.

An approach proposed to be taken to cope with these problems is disclosed in JP-A-62-1115. However, when the technique disclosed is applied to simultaneous coating as adopted in the present invention, the following problems arise. That is, where carbon black of low specific gravity is used in the non-magnetic lower layer, simultaneous coating or the subsequent orientation induces mixing of the non-magnetic lower layer and the upper magnetic layer or interfacial disturbances due to turbulence. Such mixing or disturbance at the interface extremely reduces orientation properties of the magnetic substance in the magnetic layer.

In case of using magnetic particles having a short major axis and a small acicular ratio, which are essentially insusceptible to flow orientation, reduction of orientation properties is conspicuous with a failure to obtain sufficient electromagnetic characteristics.

In recent years, magnetic powders to be used in a magnetic layer have been reduced in size to meet the demand for high-density recording. As the particle size decreases, the strength of the magnetic layer is so reduced. It follows, for example, the tape is stretched under high tension during preparation or running on a video deck to have increased skewness. Countermeasures against this include reduction of percent thermal shrinkage of the support or strengthening of the support, but the effect obtained is limited. Further, when a simultaneous coating system is adopted, the percent thermal shrinkage becomes greater as compared with that in the case of a successive coating system (wet-on-dry), resulting in an increase of skewness. This is because, in the latter case the lower layer is hardened after being coated by calendering or curing so that the medium is prevented from stretching, while in the former case in which the upper and lower layers are coated at once, stretching of the medium cannot be suppressed by the lower layer. Thus, the techniques disclosed in JP-A-63-187418 and JP-A-63-191315 exploiting a simultaneous coating system are accompanied by these disadvantages.

A tendency of reducing tape thickness is also developed in an attempt to extend the time of playing. Reduction in tape thickness leads to reduction in tape stiffness and, as a result, satisfactory contact with a head is impaired, resulting in reductions in electromagnetic characteristics. In particular, currently spread long-playing tapes for 8 mm-VTR or VHS have a total thickness of not more than 14 μm and have a difficulty in assuring satisfactory contact with a head. With conventional thick tapes, it has been rather effective for maintenance of smooth contact with a head to reduce the strength of the lower non-magnetic layer, but the latest thin tapes used in recording and reproducing apparatus using a rotating head can hardly obtain good contact with a head unless the stiffness of the lower non-magnetic layer is increased. Use of a stretched non-magnetic support might be effective to control the lower layer stiffness but causes a reduction in stiffness in the width direction, which is unfavorable for running durability.

As described in JP-A-63-191315, although use of no polyisocyanate in a lower non-magnetic layer is recognized effective for improving contact with a head, such a medium turned out to be inferior in preservability under a high temperature and high humidity condition. Although effective in systems attaching no weight to preservability, this technique is unsuitable to systems demanding preservability, for example, for business use or for data preservation. JP-A-63-187418 also discloses thickness reduction of a magnetic layer for improving electromagnetic characteristics, but the electromagnetic characteristics attained were still unsatisfactory. JP-A-50-803 teaches use of non-magnetic pigment fine granules having a Mohs hardness of at least 6 between a magnetic layer and a support. This proposal chiefly aims at polishing of an aluminum support with a non-magnetic powder having a Mohs hardness of 6 or more to thereby increase flatness of the support.

Hence, the techniques so far developed are incapable of satisfying the demand of reducing thickness of magnetic recording media to cope with the recent trends to extension of play time and high-density recording. That is, the conventional techniques could not achieve sufficient consistency between excellent electromagnetic characteristics and running durability. In particular, to improve running durability while reducing tape thickness requires minimization of tape edge damages. From this viewpoint, the techniques of JP-A-63-191315 and JP-A-63-187418 are insufficient.

Various proposals have ever been made for obtaining magnetic recording media having an upper magnetic layer and a lower non-magnetic layer by wet-on-wet coating. For example, JP-A-50-104003 implies wet-on-wet coating but shows use of only carbon black as a non-magnetic layer, in which the layers suffer from serious interfacial disturbance due to too strong structural viscosity.

JP-A-62-212922 (corresponding to U.S. Pat. No. 4,916,024) discloses a magnetic recording medium having a conductive intermediate layer containing carbon black and a ferromagnetic powder in a proportion of from 5 to 25% by weight based on carbon black. The ferromagnetic powder is used for the purpose of improving dispersibility of carbon black. However, since the ferromagnetic powder used in the intermediate layer has equal magnetic properties, the interfacial disturbance cannot be satisfactorily prevented. JP-A-62-214524 discloses a process for producing a magnetic recording medium, in which a plurality of layers are wet-on-wet coated. This technique is characterized by selection of the formulation of each coating composition so that the solvent and solute in each layer exhibit mutual solubility with those of the adjacent layer. Combinations of an upper magnetic layer and a lower non-magnetic layer are illustrated therein, but the examples given relate only to selection of binders. Incorporation of carbon black is also suggested but failed to eliminate the interfacial disturbance. JP-A-62-241130 (corresponding to U.S. Pat. No. 4,839,225) discloses a magnetic recording medium in which the intermediate layer contains at least one binder carrying a hydroxyl group and/or an amino group and the magnetic layer contains an isocyanate compound. This technique aims at chemical bonding of the specific binder and the isocyanate compound to thereby bring about an improvement in adhesion strength between the two layers. It is described that the intermediate layer may contain carbon black, and the layers may be coated by a wet-on-wet coating system. However, the problem of interfacial disturbance could not be resolved by such disclosures.

On the other hand, JP-A-63-88080 (corresponding to U.S. Pat. No. 4,854,262) discloses a coating apparatus having an improved doctor edge. The disclosure refers to a viscosity at a high shear rate ($10^4$ sec$^{-1}$) but only showing the viscosities of coating compositions for the upper and lower layers. Such a disclosure fails to sufficiently inhibit the interfacial disturbance.

JP-A-63-146210 discloses a magnetic recording medium in which the lower magnetic layer or non-magnetic layer contains a non-curing binder and the uppermost magnetic layer contains an electron-curing binder resin. However, the illustrated lower non-magnetic layers are only those containing carbon black, and the interfacial disturbance was still unmitigated. JP-A-63-164022 discloses a method for coating a magnetic coating composition, in which multiple layers are extrusion coated through a slot die with a magnetic coating composition having a high density being sandwiched in between non-magnetic coating compositions having a viscosity lower than that of the magnetic coating composition thereby to improve high-speed thin coating properties. This coating method aims at reduction of a gap between the bead of the magnetic coating composition and the gieβer. The interfacial disturbance could not be sufficiently eliminated by this technique. JP-A-63-187418 (corresponding to U.S. Pat. No. 4,863,793) discloses a magnetic recording medium in which the ferromagnetic powder of the upper magnetic layer has an average major axis length of less than 0.30 μm as measured with a transmission type electron microscope and a crystallite size of less than 300 Å as measured by X-ray diffractometry. The disclosure includes incorporation of carbon black, graphite, titanium oxide, etc. into the lower non-magnetic layer, referring to a specific combination of 100 parts by weight of α-$Fe_2O_3$ and 10 parts by weight of conductive carbon. However, the amount of carbon used is small, and the particle size of α-$Fe_2O_3$ is not specified, and the interfacial disturbance could not be sufficiently settled.

JP-A-63-191315 (corresponding to U.S. Pat. No. 4,963,433) discloses a magnetic recording medium in which the lower layer contains a thermoplastic binder and has a dry thickness of 0.5 μm or greater, specifically illustrating a combination of 100 parts by weight of α-$Fe_2O_3$ and 10 parts by weight of conductive carbon similar to JP-A-63-187418. However, the amount of carbon used is small, and the particle size of α-$Fe_2O_3$ is not specified, and the interfacial disturbance could not be sufficiently settled.

JP-A-2-254621 discloses a magnetic recording medium, in which a non-magnetic layer mainly comprising carbon black is provided, and a magnetic layer containing Fe—Al ferromagnetic powder is wet-on-wet coated thereon. However, the illustrated example of the lower layer comprises only carbon black, which has too a high structural viscosity to remove the interfacial disturbance.

JP-A-2-257424 discloses a magnetic recording medium in which the non-magnetic layer contains a filler having an average particle size of 50 μm or greater. Carbon black and abrasives, e.g., $Al_2O_3$ and SiC, are given as examples of useful fillers. However, the specifically illustrated non-magnetic layer contains carbon black alone, $Al_2O_3$ alone, or SiC alone. The problem of interfacial disturbance could not be resolved with such a combination.

JP-A-2-257425 discloses a magnetic recording medium containing a plurality of layers each having a coefficient of dynamic friction of not more than 0.25 and a surface specific resistivity of not more than $1.0 \times 10^9$ Ω/sq. Illustrative examples of the non-magnetic powder to be added to the lower layer are limited to $SnO_2$ alone and carbon black alone, and the interfacial disturbance could not be avoided. JP-a-2-260231 discloses a magnetic recording medium comprising a non-magnetic support having laminated thereon a first non-magnetic layer, a first magnetic layer, a second non-magnetic layer, and a second magnetic layer in this order. The illustrated non-magnetic layers solely comprise binders, failing to remove the interfacial disturbance.

JP-A-3-49032 (corresponding to U.S. Pat. No. 5,051,291) discloses a magnetic recording medium whose magnetic layer has a thickness of not more than 1.5 μm and a squareness ratio of not less than 0.85. While an increased squareness ratio can be obtained through multiple stage orientation, the lower layer contains only carbon black and failed to eliminate the interfacial disturbance due to its too strong structural viscosity.

In recent years, Hi 8 tapes have been given studies, ultimately seeking for obtaining merits possessed by both ME (vacuum deposited) tapes and MP (metal) tapes. It has been the most important subject to achieve such a high C/N in the short wavelength region (luminance signals in high region) as reached by ME tapes by using MP tapes while maintaining the excellent performance properties possessed by MP tapes, i.e., running properties, durability, and production suitability.

In seeking for improvements in performance of video tapes, attention has been accorded to the signal recording mechanism of VTR, i.e., recording depth of each signal, and double coating technique has been manipulated to optimize the upper and lower magnetic layers for the use intended. For example, double coating for VHS tapes has been carried out by using ferromagnetic powders different in particle size or magnetic characteristics for the upper and lower layers to realize high output and low noise in the whole region of luminance, color, and sound.

For the production of Hi 8 double-coated MP tapes, a so-called hybrid double coating system using different kinds of magnetic substances in the upper and lower magnetic layers has been developed, in which metallic magnetic substance meeting the demand of high-density recording is used in the upper magnetic layer, and iron oxide magnetic substance excellent in low region characteristics is used in the lower magnetic layer to thereby obtain high fidelity of sharp image and clear colors on reproduction.

Nevertheless, the conventional techniques or concepts have limits for the pursuit of further increased recording density and for drastic improvements in high region characteristics with Hi 8 MP tapes. Hence, the inventors have prosecuted further analyses and studies in the principles and mechanism of magnetic recording itself for the purpose of realizing a magnetic recording medium surpassing deposited tapes in high region characteristics.

SUMMARY OF THE INVENTION

An object of the present invention is to provide a magnetic recording medium capable of high-density recording, which, while being of coated type, exhibits high region output comparable to deposited tapes as well as running durability and preservability.

Another object of the present invention is to provide a thin magnetic recording medium which exhibits excellent electromagnetic characteristics such as an output and a C/N, which makes good contact with a head, which has satisfactory preservation stability, and which can be produced in good yield and with satisfactory efficiency.

A still another object of the present invention is to provide a magnetic recording medium which exhibits excellent electromagnetic characteristics, particularly a high output in short wave recording, and running durability, and which can be produced in good yield.

A yet another object of the present invention is to provide a magnetic recording medium which has a high RF output, excellent running durability, a reduced dropout rate, and a low block error rate (BER).

A further object of the present invention is to provide a magnetic recording medium which exhibits satisfactory electromagnetic characteristics and running properties, and particularly to provide a magnetic recording medium having satisfactory surface roughness and high electromagnetic characteristics which is prepared by a simultaneous wet-on-wet coating system.

A still further object of the present invention is to provide a magnetic recording medium having satisfactory electromagnetic characteristics, a low percent thermal shrinkage, and excellent long-term preservability.

A yet further object of the present invention is to provide a magnetic recording medium having excellent electromagnetic characteristics, and particularly reduced susceptibility to edge damages on repeated running.

The above objects of the present invention are accomplished by a magnetic recording medium comprising a non-magnetic support having provided thereon at least one lower non-magnetic layer comprising a binder having dispersed therein a non-magnetic powder and at least one upper magnetic layer comprising a binder having dispersed therein a ferromagnetic powder which is coated while said lower non-magnetic layer is wet, wherein said upper magnetic layer has an average dry thickness (d) of not more than 1.0 µm, and an average thickness variation ($^\Delta$d) at the interface between said upper magnetic layer and lower non-magnetic layer is not more than d/2 ($^\Delta$d≦d/2).

BRIEF DESCRIPTION OF THE DRAWINGS

FIG. 2 is a schematic illustration of successive wet-on-wet coating system according to the present invention.

FIG. 3 is a schematic illustration of simultaneous wet-on-wet coating system according to the present invention.

DETAILED DESCRIPTION OF THE INVENTION

Figure 1:
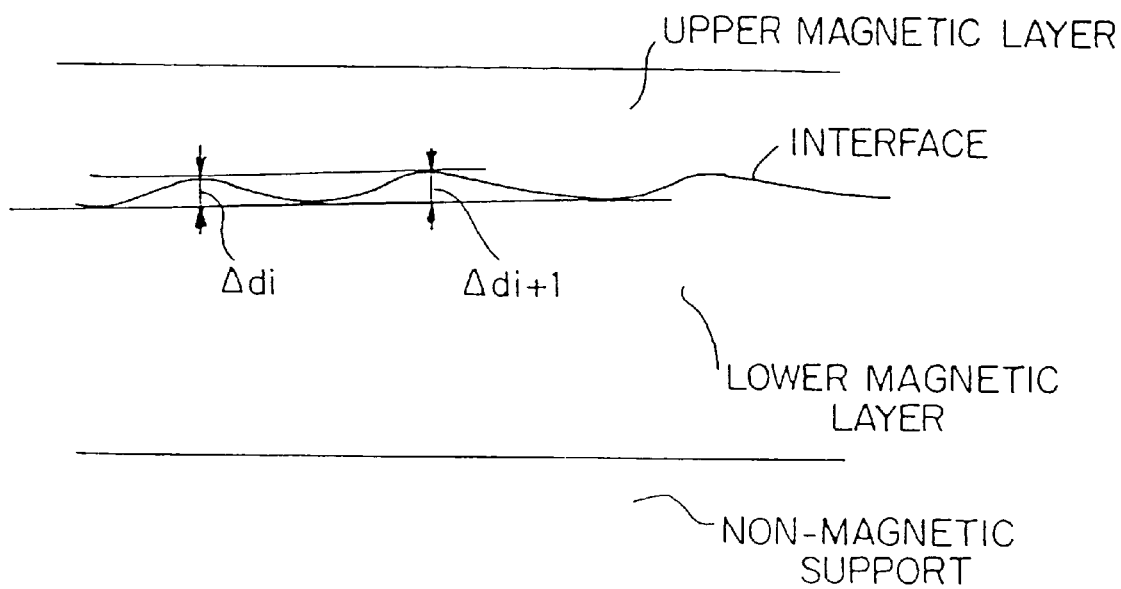
FIG. 1 is an illustration for explaining the method for determining $^\Delta$d of a magnetic recording medium.

As a result of extensive investigations, the inventors have reached conclusions that: with the conventional wet-on-wet coating system being basically adopted, one important point is to minimize "signal loss" which becomes greater with a reduction in recording wavelength, and a reduction in magnetic layer thickness is required for minimizing the signal loss at issue; and another important point is to increase magnetic energy of a magnetic layer as high as possible, and development of a new magnetic substance and achievement of high density packing are required for obtaining increased magnetic energy.

The inventors first set about thorough reduction of signal loss. Of various types of losses occurring during recording and reproduction in a magnetic recording sysetm, the inventors found that improvements in high region characteristics can be brought about by reducing "self-demagnetization loss" which has ever been considered unavoidable with MP (metal) tapes.

That is, a first feature of the present invention consists in realization of a uniform and very thin magnetic layer having a thickness of not more than 1 µm, an average thickness variation of not greater than ½ the thickness, and a standard deviation of the thickness values of not more than 0.2 µm and great reduction in self-demagnetization loss in the short wavelength region. This can be achieved by making thixotropy of coating compositions for a lower non-magnetic layer (hereinafter referred to as layer (a)) and an upper magnetic layer (hereinafter abbreviated as layer (b)) equal or close or by controlling the shape of a non-magnetic powder in layer (a) so as to eliminate any mixed region in the interface between layers (a) and (b).

A second feature of the present invention, which is to be added to the above-mentioned first feature, is that the interface between layers (a) and (b) is made uniform with small variations and the surface of layer (b) is made very smooth by controlling the size and shape of the ferromagnetic powder and non-magnetic powder in layers (b) and (a), respectively, and improving dispersibility of the non-magnetic powder itself. Such a smooth surface of layer (b) eliminates "space loss" to improve high region output.

A third feature of the present invention consists in accomplishment of increased energy of a magnetic layer. It was ascertained that the magnetic energy and coercive force of layer (b) can be increased by using a ferromagnetic fine powder having an increased Hr and an increased Hc in layer (b) thereby exhibiting high region output equal or even higher than that obtained by ME (deposited) tapes.

A fourth feature of the present invention lies in high density packing. Mere thickness reduction of a magnetic layer as conventionally attempted results in reduction of low region output or deterioration of color characteristics. In the present invention, an inorganic fine powder having extremely high rigidity in the thickness direction greatly increases the packing effect of calendering to achieve high density packing of a high energy ferromagnetic powder to thereby exhibit excellent middle to low region characteristics.

A fifth feature of the present invention resides in achievement of such characteristics as viscoelasticity, adhesion strength, resistance to steel ball wear, residual solvent content, a sol fraction, etc. for assuring excellent durability that is never reached by ME (deposited) tapes.

The above-mentioned five features function with each other organically, supplementarily, synergistically, and systematically to establish a new layer structure having an extremely reduced thickness, an extremely smoothed surface, and an extremely increased packing and to realize excellent characteristics in the high region as well as the middle to low region which have never been obtained by conventional coating techniques.

The first feature of the present invention is described below in detail.

The first feature can be realized by a magnetic recording medium comprising a non-magnetic support having provided thereon at least one lower non-magnetic layer (layer (a)) comprising a binder having dispersed therein a non-magnetic powder and at least one upper magnetic layer (layer (b)) comprising a binder having dispersed therein a ferromagnetic powder which is coated on layer (a) while layer (a) is wet, wherein layer (b) has an average dry thickness (d) of not more than 1.0 µm, and an average thickness variation ($^\Delta$d) at the interface between layers (a) and (b) in not more than d/2 ($^\Delta$d≦d/2).

That is, the first feature is an extremely reduced thickness of a magnetic layer. As a principle of self-demagnetization, the loss becomes smaller as the cross-sectional area of a magnetic layer reduces. Accordingly, achievement of an increased output of short wavelength signals indispensably requires drastic reduction of magnetic layer thickness. The effect of thickness reduction is insubstantial with a thickness greater than 1 µm, and becomes appreciable according as the thickness approaches to an effective recording thickness, generally recognized to be ¼ the recording wavelength, i.e., to recording saturation. Thus, it is demanded to reduce the thickness to an order of a submicron unit.

However, the conventional single layer coating technique encounters difficulty in coating to a thickness of submicron order. Further, as the thickness decreases, it becomes more difficult to obtain uniform thickness and surface smoothness. Besides, it has been very difficult to supply a thin coating film in a large quantity in a stable manner.

In the present invention, the conventional double coating technique is adopted with such an innovation as making it possible to form layer (b) by wet-on-wet coating on layer (a)

containing an inorganic fine powder, said layer (b) having an average thickness variation of not greater than ½ the thickness and a standard deviation of thickness of not more than 0.2 μm. The thickness of the resulting magnetic layer is from ⅓ to ⅒ that of conventional Hi 8 MP tapes and, therefore, reduces self-demagnetization loss to achieve a great increase in luminance signal output.

The principles of self-demagnetization are as follows. Magnetic poles of a magnetized magnet makes a magnetic field in not only the outside of the magnet but the inside thereof. The magnetic field in the inside of the magnet has an opposite direction to the magnetization direction and acts to decrease magnetization. Such an inside magnetic field is called a demagnetization field, and the decrease in magnetization caused by the demagnetization field is called "self-demagnetization".

The intensity of demagnetization field depends on the shape of a magnet. The smaller the cross-section area, i.e., the greater the between-poles distance, the smaller the demagnetization field, i.e., the smaller the self-demagnetization. On comparing between, for instance, a sewing needle and a steel ball, both of which are attracted to a magnet, a needle easily becomes a magnet because of its small self-demagnetization, whereas a steel ball has a large self-demagnetization and hardly becomes a magnet.

In the case of magnetic tapes, the demagnetization field is small in long wavelength (low region) recording, but as the recording wavelength becomes shorter, the distance between magnetic poles becomes smaller, and the demagnetization field increases to cause an increase of self-demagnetization loss. This is one of the great causes of deterioration of high region characteristics.

In order to lessen self-demagnetization loss, it is effective to reduce the cross-section area, i.e., the thickness of the magnetic layer according to the principles of self-demagnetization. As saturation recording is approached, the self-demagnetization loss becomes smaller to increase the output. Accordingly, it is required to reduce the thickness to an order of submicron, i.e., to bring the thickness close to the effective magnetic layer thickness (¼ the recording wavelength).

The shortest recording wavelength of Hi 8 tapes is as extremely short as 0.49 μm, which is one of the reasons for the excellent high region characteristics of the same levels as attained by extremely thin ME (deposited) tapes having an about 0.2 μm thick magnetic layer.

On the other hand, coated type MP tapes have an about 3 μm thick magnetic layer. The conventional coating system unavoidably results in formation of a magnetic layer having a thickness considerably greater than the recording wavelength. The deterioration of high region characteristics due to self-demagnetization loss has been an insuperable wall one comes up against in seeking for improvements in image quality. The inventors have succeeded to overcome the wall.

Besides self-demagnetization loss, space loss is another great cause of deterioration of high region characteristics. Magnetic flux on the tape surface is weakened as the recording wavelength becomes shorter so that even very slight spacing between tape and a video head leads to a great loss. Space loss includes micro-space loss attributable to surface roughness of a magnetic layer and macro-space loss attributable to rigidity of the tape. In order to cope with the former space loss, it is important to assure stable running properties while keeping high surface smoothness. The importance is particularly high in high-density recording on, for example, Hi 8 tapes whose shortest recording wavelength is about 40% of that of VHS tapes. With respect to the latter space loss, generally called "contact with head", how to consistently satisfy both strength and flexibility is a subject awaiting for solution. The space loss arising from tape rigidity has great influences on image quality irrespective of the recording wavelength. The inventors have settled down these problems of space loss all at once by the second feature described below in detail.

In the present invention, layer (b) preferably has a squared average surface roughness $R_{rms}$, as measured with a scanning tunnel microscope (STM), satisfying a relationship: $30 \leq d/R_{rms}$, wherein d is a dry thickness of layer (b) which is specified to be not more than 1.0 μm in the present invention.

The second feature is smoothening of the surface of a magnetic layer. Double coating technique is essentially competent for obtaining excellent surface smoothness because a lower layer absorbs surface unevenness of the base film so as to diminish the adverse influence of the unevenness upon an upper layer.

However, when one aims at surface smoothing with his considerations also given to very slight space loss in recording at short wavelength of 0.5 μm or less, the conventional double coating techniques have their own technical limits because recording mechanism needs use of ultrafine magnetic powders excellent in high region characteristics in an upper magnetic layer whereas a lower layer contains a relatively large non-magnetic powder which may cause interfacial disturbances between layers (a) and (b). Namely, even a very slight interfacial disturbance caused by the relatively large non-magnetic powder must be thoroughly avoided. The smaller the thickness of the upper layer, the greater the influence of the interfacial condition on smoothness of the upper magnetic layer. Resolution of this problem has thus been of importance.

The inventors pursued size reduction of non-magnetic particles used in the lower layer and high-density packing of the non-magnetic particles. However, ultrafine particles, as they are, are difficult to be packed uniformly and at high density. Hence, the individual ultrafine particles are subjected to a special surface treatment to have improved dispersibility to thereby achieve high-density packing and interfacial flatness.

Further, having a high packing, the non-magnetic layer has a high degree of freedom in the in-plane direction of tape to show excellent flexibility while exhibiting extremely high rigidity in the thickness direction to increase the calendering effect. As a result, smoothness can be increased by 20% of that of Hi 8 MP-DC, and the surface roughness of the magnetic layer can be decreased to 2.5 nm. The high smoothness which cannot be achieved but by wet-on-wet coating leads to a great reduction of space loss in the short wavelength region and to improvements in high region characteristics.

The third feature of the present invention is explained below in detail. The third feature lies in high output and low noise of a magnetic layer which are fundamental factors of magnetic tape performance. Such characteristics can be achieved by an upper magnetic layer having a residual coercive force (Hr) of 1500 Oe or higher in the normal direction of the surface thereof. In order to improve characteristics at short wavelengths, it is inevitable to formulate a magnetic layer so as to have high output and low noise by means of "size reduction of magnetic particles", "increase in energy", and "increase in packing" as well as "minimization of signal loss".

The fourth feature of the present invention is described below.

The magnetic recording medium of the present invention preferably has a ratio of stiffness in the coating direction (machine direction) (hereinafter abbreviated as SMD) to stiffness in the width direction (transverse direction) (hereinafter abbreviated as STD), i.e., SMD/STD, of from 1.0 to 1.9. More specifically, it is preferable that the inorganic powder present in layer (a) is a spherical to cubic polyhedral powder having a Mohs hardness of 6 or higher and an average particle size of not more than 0.15 μm.

Further, the magnetic recording medium preferably has a percent thermal shrinkage at 80° C.×30 mins. of not more than 0.4%. More specifically, it is preferable that layer (a) has a dry thickness 1 to 30 times that of layer (b) and that a difference between the powder volume ratio of layer (a) and that of layer (b) is in the range of from −5% to +20%.

In other words, the fourth feature resides in high-density packing, and it is the lower non-magnetic layer that makes it feasible to fill the magnetic powder at a high packing. The non-magnetic layer having a smooth surface and very high rigidity in the thickness direction surely receives the strong pressure of a super-high density packing (HDP) calender to thereby realize extraordinary high-density packing.

In pursuit of high region characteristics by great thickness direction of a magnetic layer, the conventional techniques have been confronted with reductions in middle to low region characteristics, resulting in a failure to obtain excellent color characteristics. In the present invention, this problem is settled by high-density packing of a high energy magnetic substance, and the lower non-magnetic layer makes it possible to arrive at such a settlement. As a result, a great improvement in high region output can be obtained while retaining excellent characteristics in the middle to low region.

That is, the present invention achieves high-density recording comparable to deposited tapes, that has been believed impossible to obtain with the conventional coated type magnetic recording media. Such achievement can first be reached by (i) uniformly coating layer (b) to a dry thickness of 1.0 μm while layer (a) is wet (wet-on-wet coating system) and (ii) controlling an average thickness variation $^\Delta d$ at the interface between layers (a) and (b) at or under d/2 with d being reduced to 1.0 μm or less in average. There is thus obtained a high-density recording medium which is comparable to deposited tapes, notwithstanding it is of coated type, and which can be actually put to practical use. One can find in patent applications filed to date some proposals relating to magnetic recording media having a 1.0 μm or less thick upper magnetic layer and a lower non-magnetic layer, but no embodiment which may be brought into the market has ever been developed. Hence, the present invention is an epoch-making achievement overthrowing the commonly received knowledge.

Thickness of layer (b) and interfacial variation $^\Delta d$ according to the present invention are determined as follows. A magnetic recording medium is sliced along its longitudinal direction with a diamond cutter to a thickness of about 0.1 μm. Micrographs (print size: A4 to A5) of the cut area were taken under a transmission electron microscope at a magnification of 10000 to 100000, preferably 20000 to 50000. The interface between layers (a) and (b) on the micrograph was identified with the naked eye with attention being paid to a difference in shape between the magnetic powder in layer (b) and the non-magnetic powder in layer (a) and traced with a black marker pen. The surface of layer (b) is also traced with a black marker pen. By the use of an image analyzer "IBAS 2" manufactured by Zeiss Co., a span of 21 cm in the longitudinal direction is divided into 100 to 300 segments, and the distance in the thickness direction between the two black lines (the interface and the surface of layer (b)) is measured in each segment to obtain an average thickness (d) of layer (b).

A distance ($^\Delta d_i$) in the thickness direction between a peak and a valley of the line formed by the interface is measured. The measurement was made on every peak and valley appearing within a width of 20 μm (real length) (10 to 20 measurements) to obtain an average thickness variation $^\Delta d$ at the interface.

While it is ideal that the interface forms a straight line with a constant thickness of layer (b), a practically achievable preferred level is that the interface forms a gently-sloping curve akin to a sine curve having a smaller amplitude and a longer interval between peaks and valleys as compared with the conventionally formed interface. The number of peaks or valleys appearing within 20 μm is preferably limited to 10 to 20 at the most. With respect to the measurement of interfacial thickness variation, FIG. 1 can be referred to.

Accordingly, $^\Delta d$ can be calculated from:

$$^\Delta d = (^\Delta d_1 + ^\Delta d_2 + \ldots + ^\Delta d_m)/m \quad (m=10 \text{ to } 20)$$

The distance (L) between two adjacent peaks of the curve of the interface is preferably not less than 1 μm, and particularly not less than 2 μm.

A standard deviation σ of the thickness of layer (b) can be obtained by utilizing the same measured values as obtained above for 100 to 300 divided segments. A preferred standard deviation σ is not more than 0.2 μm.

Returning to the first feature of the present invention, the magnetic recording medium of the present invention comprises a non-magnetic support having provided thereon at least one layer (a) and at least one layer (b) which is coated while said layer (a) is wet, wherein layer (b) has an average dry thickness (d) of not more than 1.0 μm, and an average thickness variation ($^\Delta d$) at the interface between layers (a) and (b) is not more than d/2 ($^\Delta d \leq d/2$). Layer (b) preferably has a standard deviation σ of dry thickness of not more than 0.2 μm.

The first feature can be accomplished by the following two embodiments.

A first embodiment is to control coating compositions (dispersions) for both layers (a) and (b) so as to have equal or approximate thixotropy, and a second embodiment is to control the size and shape of the non-magnetic powder in layer (a) and the magnetic powder in layer (b) so as to dynamically prevent formation of a mixed region at the interface between layers (a) and (b).

In the above-mentioned first embodiment, it is preferable that the dispersion for layer (a) shows such thixotropy that a ratio of shear stress A10$^4$ at a shear rate of 10$^4$ sec$^{-1}$ to shear stress A10 at a shear rate of 10 sec$^{-1}$, A10$^4$/A10, ranges from 3 to 100 and more preferably from 4 to 90. With the thixotropy of the dispersion for layer (a) being so controlled as having a specific A10$^4$/A10 ratio, the dispersion would exhibit thixotropy close to that of the magnetic coating composition for layer (b), causing no interfacial disturbance, and thereby avoiding pinholes or run-away.

Thus, the outstanding feature of the first embodiment of the present invention consists in the use of coating compositions for layers (a) and (b) each having specifically controlled rheological characteristics so as to show the same or substantially the same thixotropy, whereby coating defects are eliminated, a yield of production is improved, and durability and electromagnetic characteristics, e.g., output, are improved.

According to the above-described preferred embodiment, the same range of $A10^4/A10$ ratio also applies to the magnetic coating composition for layer (b).

The terminology "substantially the same thixotropy" as used herein means that difference in the $A10^4/A10$ ratio between the dispersion for layer (a) and the magnetic coating composition for layer (b) is not more than 97 and preferably 80 or less.

In the present invention, the shear stress at a certain shear rate is measured with a coaxial cylinder viscometer, e.g., "Rotovisco viscometer RV-II" manufactured by HAAKE CO. The shear rate is decided by diameters of the inner and outer cylinders, the clearance therebetween, and the number of rotation. A shear rate (D), an apparent viscosity ($\eta$), and a shear stress (A) have the following relationships.

$A=\eta \cdot D$ $D=dv/dr$ (v: peripheral speed; r: radius)

In this regard, reference can be made to T. C. Patton, *Paint Flow and Pigment Dispersion*, pub. by John Wiley & Sons (1964).

Accordingly, A10 and $A10^4$ correspond to $A=10\eta$ and $A=10^4\eta$, respectively. The $A10^4/A10$ ratio is indicative of the degree of thixotropy. The greater the ratio, the smaller the thixotropy, and vise versa. Conventional non-magnetic dispersions have a $A10^4/A10$ ratio of from about 200 to 500, i.e., weak thixotropy. If the $A10^4/A10$ ratio becomes greater, the dispersion approximates closely a Newtonian fluid, making it difficult to simultaneously coat an upper magnetic layer thereon. If it is too small, thixotropy of the dispersion is too strong to establish consistency between the viscosity suitable for simultaneous coating and the viscosity suitable for liquid feed.

The following four means (A) to (D) are included in the magnetic recording medium according to the first embodiment of the present invention which satisfies the above-mentioned thixotropic conditions, that is, the thixotropy of the dispersion for layer (a) is made at least substantially equal to that of the magnetic coating composition for layer (b), and, preferably, the $A10^4/A10$ ratio falls within the above-recited specific range for layers (a) and (b). These means are to be construed as illustrative non-limiting examples of the present invention.

(A) The non-magnetic powder in layer (a) contains (i) carbon black and (ii) an inorganic powder (other than carbon black) having a smaller average primary particle diameter than the dry thickness of layer (a), and layers (a) and (b) each contain a thermosetting polyisocyanate in a proportion of from 10 to 70% by weight based on the total binder present in each layer.

(B) The non-magnetic powder in layer (a) contains an inorganic powder having an average primary particle diameter of not more than 0.08 µm.

(C) Layer (a) has a maximum magnetic flux density (Bm) of from 30 to 500 gauss. In this case, while layer (a) has low magnetic properties, it takes no part in magnetic recording and is therefore regarded "non-magnetic".

(D) The ferromagnetic powder in layer (b) has an average major axis of not more than 0.3 µm and an average crystallite size of not more than 300 Å, layer (a) contains, as a non-magnetic powder (i) a non-magnetic metal oxide powder and (ii) carbon black having an average primary particle diameter of less than 20 nm at a (i)/(ii) ratio of from 95/5 to 60/40 by weight, and layer (a) contains a polyurethane having at least three hydroxyl groups in the molecule thereof and a polyisocyanate compound.

The terminology "average primary particle diameter" as used herein means an average particle diameter obtained from a size distribution of single particles free from fusion or association.

Means (A) is characterized by using a dispersion for layer (a) which is prepared from carbon black making a great contribution to thixotropy and an inorganic powder making a slight contribution to thixotropy as non-magnetic powder and a polyisocyanate as a binder. By these features, reduction in thickness of layer (b) and improvement in yield can be achieved. Further, by using a polyisocyanate in both layers (a) and (b), the magnetic recording medium maintains a satisfactory contact with a head, is assured of preservability in a high temperature and high humidity condition, and exhibits moderate rigidity and flexibility to improve running durability.

In means (B), the dispersion for layer (a) is prepared by using an inorganic powder having a reduced size so as to have controlled thixotropy. A proper combination of rheological characteristics of layer (b) and those of layer (a) is of importance for achieving simultaneous or successive coating in a wet state. That is, a magnetic coating composition exhibits very strong thixotropy because it has a structural viscosity due to magnetic attraction among ferromagnetic particles. Having no magnetic attraction, on the other hand, a conventionally employed dispersion for a layer comparable to layer (a) has weak thixotropy. If a conventional non-magnetic layer dispersion and a magnetic coating composition are simultaneously coated, they undergo mixing at the interface therebetween, or considerable cohesive streaks develop during the orientation following coating, causing a failure to obtain satisfactory surface properties. This problem is avoided in the present invention by using an inorganic powder having an average primary particle diameter of not more than 0.08 µm. If desired, the inorganic powder can be used in combination with a minor proportion of carbon black.

In means (C), the maximum magnetic flux density Bm of layer (a) is controlled between 30 gauss and 500 gauss. In other words, the dispersion for layer (a) has its thixotropy controlled so as to satisfy the above-described $A10^4/A10$ ratio range of between 3 to 100 by using a magnetic powder which is incapable of magnetic recording and gives no adverse influence on layer (b). The Bm of layer (a) can be controlled within the above-specified range by using a magnetic powder having a low saturation magnetization ($\sigma_s$) or by reducing the packing ratio of the magnetic powder in layer (a). As previously described, a layer containing a powder showing magnetic properties but having such a low $\sigma_s$ incapable of magnetic recording is defined to be non-magnetic.

While means (A), (B) and (C) illustrate suitable means for controlling the $A10^4/A10$ ratio within 3 and 100, the $A10^4/A10$ ratio is also related to other factors described below. Therefore, these other factors should be taken into consideration in preparation of the dispersions for layers (a) and (b) having the preferred $A10^4/A10$ ratio and in production of a magnetic recording medium having desired characteristics. Factors relating to inorganic powders or magnetic powders to be dispersed include (i) particle size (specific surface area, average primary particle diameter, etc.), (ii) structure (oil absorption, particle shape, water content, etc.), (iii) properties of powder surface (pH, weight loss on heating, etc.), and (iv) attraction force of particles ($\sigma_s$, etc.). Factors relating to binders include (v) molecular weight and (vi) functional groups. Factors relating to solvents include (vii) type (polarity, etc.), (viii) capability of dissolving a binder, and (ix) amount.

In some detail, a $A10^4/A10$ ratio is influenced by various parameters, such as molecular weight of binders, structure, affinity for solvent, water content, and the like. Thus, an important factor is the powder material selected to be packed. That is, a $A10^4/A10$ ratio is considerably dependent on the surface properties, particle size, oil absorption, and affinity for a solvent properties of the dispersed powder. For example, the smaller the particle size, the stronger the thixotropy. Carbon black which has a high oil absorption and is textured in structure makes the thixotropy very strong. Further, magnetic particles exhibit strong structural viscosity due to their own magnetic attraction and generally afford strong thixotropy. In the present invention, these powder properties are utilized in controlling thixotropy of dispersions for layers (a) and (b) within the above-mentioned $A10^4/A10$ range, for example.

The above-described second embodiment of the present invention can be accomplished by the following means (E) to (G). The essence of these means consists in how to eliminate a mixed region between layers (a) and (b), and means (E) to (G) are to be construed as illustrative non-limiting examples of the present invention.

(E) The non-magnetic powder in layer (a) has a longest axis $r_1$ to shortest axis $r_2$ ratio $(r_1/r_2)$ of not less than 2.5.

(F) The non-magnetic powder has an acicular ratio of not less than 2.5, and the magnetic powder has an average major axis of not more than 0.3 $\mu$m.

(G) Layer (a) contains a flaky non-magnetic powder and a binder containing an epoxy group and a molecular weight of more than 30,000, and layer (b) contains an acicular ferromagnetic powder or a tabular ferromagnetic powder.

In these means, an acicular or flaky non-magnetic powder is used in layer (a) in order to prevent formation of a mixed region in the interface between layers (a) and (b). As compared with conventional particulate non-magnetic powder, acicular non-magnetic powders are neatly arranged to form a strong coating film even while undried to thereby prevent formation of a mixed region even if the ferromagnetic powder in layer (b) rotates. Flaky non-magnetic powders are spread to cover the entire area in a manner akin to flooring tiles and produce the same effect as acicular powders in preventing interfacial mixing even if the ferromagnetic powder in layer (b) rotates.

In order that the flaky particles be so arranged like tiles, dispersibility of the non-magnetic dispersion should be improved by using an epoxy-containing binder having a molecular weight of 30,000 or more.

Thus, a very thin and smooth magnetic layer can be obtained without developing a mixed region in the interface by using a non-magnetic powder having a characteristic shape in a lower non-magnetic layer and forming an upper magnetic layer thereon.

Means (A) is described below in more detail.

Carbon black which can be used in layer (a) has an average primary particle diameter of not more than 30 m$\mu$, a specific surface area of from 150 to 400 m$^2$/g, and preferably from 180 to 350 m$^2$/g, a DBP absorption of from 40 to 300 ml/100 g, and preferably from 45 to 200 ml/100 g, a particle diameter of not more than 30 m$\mu$, preferably from 5 to 27 m$\mu$, and more preferably from 10 to 22 m$\mu$, a pH of from 2 to 10, a water content of from 0.1 to 10% by weight, a tapped density of from 0.1 to 1 g/cc. It is desirable that carbon black is first dispersed in a compatible binder and then mixed with an inorganic powder.

The inorganic powder preferably has a particle size of from 0.01 to 1 $\mu$m, more preferably from 0.02 to 0.5 $\mu$m, and most preferably from 0.02 to 0.08 $\mu$m. If desired, inorganic powders having different particle sizes may be combined, or a single inorganic powder having a broad size distribution may be employed to the same effect. Further, the inorganic powder has a tapped density of from 0.05 to 2 g/cc, and preferably from 0.2 to 1.5 g/cc, a water content of from 0.1 to 5% by weight, and preferably from 0.2 to 3% by weight, a pH of from 2 to 11, a specific surface area of from 1 to 100 m$^2$/g, preferably from 5 to 50 m$^2$/g, and more preferably from 7 to 40 m$^2$/g, a crystallite size of from 0.01 to 2$\mu$, a DBP absorption of from 5 to 100 ml/100 g, preferably from 10 to 80 ml/100 g, and more preferably from 20 to 60 ml/100 g, and a specific gravity of from 1 to 12, and preferably from 2 to 8. The shape of the inorganic powder may be any of an acicular shape, a spherical shape, and a cubic shape. The inorganic powder does not need to be 100% by weight pure and may be surface-treated with other compounds, if desired. In this case, a purity of 70% by weight would be enough. In using titanium oxide powder, for example, surface treatment with alumina is usually conducted. An ignition loss of the inorganic powder is preferably not more than 20% by weight. The inorganic powder to be used preferably has a Mohs hardness of at least 4. Examples of suitable inorganic powders for means (A) include titanium oxide, zinc oxide, tin oxide, and aluminum oxide. If desired, the non-magnetic powder comprising carbon black and an inorganic powder may be used in combination with other arbitrary non-magnetic powders.

A preferred weight ratio of carbon black to inorganic powder ranges from 10:90 to 80:20, and more preferably from 15:85 to 60:40.

The binder in layer (a) is preferably used in an amount of from 10 to 100% by weight, and particularly from 13 to 50% by weight, based on the non-magnetic powder. It is preferable to use a combination of 5 to 25% by weight of a vinyl chloride resin, 1 to 25% by weight of a polyurethane resin, and 1 to 15% by weight of a polyisocyanate, each based on the non-magnetic powder.

The polyisocyanate content in the total binder of each of layers (a) and (b) preferably ranges from 10 to 70% by weight, and more preferably from 20 to 50% by weight.

Means (B) is illustrated below in more detail.

In means (B), both of the magnetic coating composition and the non-magnetic dispersion preferably contain a polyisocyanate.

Suitable inorganic powders for means (B) include $SiO_2$, $TiO_2$, $\alpha$-alumina, $\alpha$—$Fe_2O_3$, boron nitride, and tin oxide. The inorganic powder should have an average primary particle diameter of not more than 0.08 $\mu$m. If desired, inorganic powders whose particle size is above this limit may be used in combination, or a single inorganic powder having a broad size distribution may be employed to the same effect. The inorganic powder has a tapped density of from 0.05 to 2 g/cc, and preferably from 0.2 to 1.5 g/cc, a water content of from 0.1 to 5% by weight, and preferably from 0.2 to 3% by weight, a pH of from 2 to 11, a specific surface area of from 1 to 100 m$^2$/g, preferably from 5 to 50 m$^2$/g, and more preferably from 7 to 40 m$^2$/g, a crystallite size of from 0.01 to 2$\mu$, a DBP absorption of from 5 to 100 ml/100 g, preferably from 10 to 80 ml/100 g, and more preferably from 20 to 60 ml/100 g, and a specific gravity of from 2 to 8. The shape of the inorganic powder may be any of an acicular shape, a spherical shape, and a cubic shape. The inorganic powder does not need to be 100% by weight pure and may be surface-treated with other compounds. In this case, a purity of 70% by weight would be enough. In using titanium oxide powder, for example, surface treatment with alumina is generally conducted. An ignition loss of the inorganic powder is preferably not more than 20% by weight. The inorganic powder to be used preferably has a Mohs hardness of at least 4.

Carbon black having an average primary particle diameter of not more than 0.03 μm, and preferably not more than 0.023 μm, may be used in combination with an inorganic powder at an inorganic powder to carbon black ratio of from 99:1 to 70:30, and particularly from 95:5 to 80:20, by weight. If the carbon black content is less than 1% by weight, which is virtually none, a desired degree of thixotropy may not be obtained. If carbon black content exceeds 30% by weight, the resulting magnetic recording medium may have insufficient surface properties in some cases.

Carbon black which may be used in combination with the above-described inorganic powder has a specific surface area of from 100 to 500 $m^2/g$, and preferably from 150 to 400 $m^2/g$, a DBP absorption of from 20 to 400 ml/100 g, and preferably from 30 to 200 ml/100 g, a particle diameter of from 5 to 80 mμ, preferably from 10 to 50 mμ, and more preferably from 10 to 40 mμ, a pH of from 2 to 10, a water content of from 0.1 to 10% by weight, and a tapped density of from 0.1 to 1 g/cc.

These non-magnetic powders are used at a weight ratio to binder of from 20 to 0.1, preferably from 10 to 0.5, and more preferably from 8 to 1, and at a volume ratio to binder of from 10 to 0.2.

Means (C) is illustrated below in more detail.

The Bm of layer (a) can be controlled within the range of from 30 to 500 gauss by using a magnetic substance having a low saturation magnetization ($\sigma_s$) or by reducing the packing ratio of the magnetic substance in layer (a). In this case, a non-magnetic substance is preferably used in an amount of from 100 to 5000 parts by weight per 100 parts by weight of the magnetic substance. The non-magnetic substance to be used preferably contains, in addition to binders, a non-magnetic powder, such as inorganic powders and carbon black. The magnetic substance preferably includes a Co—γ—$Fe_2O_3$ magnetic substance. The coercive force of the magnetic substance is not particularly limited but preferably ranges from about 400 to 1500 Oe. Hexagonal barium ferrite may be used in layer (a). The coercive force Hc of hexagonal barium ferrite to be used in this case is also non-limited but preferably ranges from 800 to 4500 Oe.

Layer (b) preferably has a coercive force Hc of from 1200 to 3000 Oe and a maximum magnetic flux density Bm of from 200 to 4500 gauss.

The inorganic powder to be used in means (C) preferably has a particle diameter of from 0.01 to 2μ. If desired, inorganic powders of different sizes may be combined, or a single powder having a broad size distribution can be used to the same effect. The inorganic powder has a tapped density of from 0.05 to 2 g/cc, and preferably from 0.2 to 1.5 g/cc, a water content of from 0.1 to 5% by weight, and preferably from 0.2 to 3% by weight, a pH of from 2 to 11, a specific surface area of from 1 to 100 $m^2/g$, preferably from 5 to 50 $m^2/g$, and more preferably from 7 to 40 $m^2/g$, a crystallite size of from 0.01 to 2μ, a DBP absorption of from 5 to 100 ml/100 g, preferably from 10 to 80 ml/100 g, and more preferably from 20 to 60 ml/100 g, and a specific gravity of from 1 to 12, and preferably from 2 to 8. The shape of the inorganic powder may be any of an acicular shape, a spherical shape, and a cubic shape. An acicular shape is preferred from the standpoint of magnetic characteristics. In particular, an acicular inorganic powder whose shape and size are close to those of a ferromagnetic powder is preferred. In this sense, a ratio of the major axis of the acicular inorganic powder to that of the ferromagnetic powder preferably falls within a range of from 0.5 to 3. The inorganic powder does not need to be 100% by weight pure and may be surface-treated with other compounds. In this case, a purity of 70% by weight would be enough. In using titanium oxide powder, for example, surface treatment with alumina is usually conducted. An ignition loss of the inorganic powder is preferably not more than 20% by weight. The inorganic powder to be used here preferably has a Mohs hardness of at least 4.

In using carbon black as a non-magnetic powder in means (C), it is preferably used in an amount of from 0.1 to 30% by weight based on the magnetic substance in either of layer (a) and layer (b). Besides contributing to thixotropy, carbon black functions in static charge prevention, reduction in coefficient of friction, light screening, and improvement in film strength. These performances of the carbon black vary depending on the species selected. Accordingly, the kind, amount or combination of carbon black species to be used in layers (a) and (b) can be selected appropriately depending on the purpose desired while taking into consideration the above-mentioned various characteristics, e.g., particle size, oil absorption, conductivity, and pH. For example, carbon black having high conductivity may be used in layer (a) for static charge prevention, and carbon black of large size may be used in layer (b) for reduction of coefficient of friction.

Carbon black which may be used in combination has a specific surface area of from 100 to 500 $m^2/g$, and preferably from 150 to 400 $m^2/g$, a DBP absorption of from 20 to 400 ml/100 g, and preferably from 30 to 200 ml/100 g, a particle diameter of from 5 to 80 mμ, preferably from 10 to 50 mμ, and more preferably from 10 to 40 mμ, a pH of from 2 to 10, a water content of from 0.1 to 10% by weight, and a tapped density of from 0.1 to 1 g/cc.

Other non-magnetic powders which can be used in means (C) include organic powders, e.g., an acrylate-styrene resin powder, a benzoguanamine resin powder, a melamine resin powder, a phthalocyanine pigment, a polyolefin resin powder, a polyester resin powder, a polyamide resin powder, a polyimide resin powder, and a polyfluoroethylene resin powder. These organic powders can be prepared by, for example, the processes described in JP-A-62-18564, JP-A-60-255827, and JP-A-60-255827.

These non-magnetic powders are used at a weight ratio to binder of from 0.1 to 10 and at a volume ratio to binder of from 0.2 to 10.

Means (D) is now illustrated below in more detail.

One of the features of means (D) consists in that the ferromagnetic powder in layer (b) has an average major axis of not more than 0.3 μm and an average crystallite size of not more than 300 Å.

To obtain a satisfactory output in short wave recording, it is preferable to use as fine as possible ferromagnetic powders. Further, a magnetic dispersion containing such a fine powder is well matched with a non-magnetic dispersion in rheological characteristics. If the ferromagnetic powder has an average major axis of more than 0.3 μm or an average crystallite size of more than 300 Å, mixing of the magnetic dispersion and the non-magnetic dispersion may take place, failing to obtain a magnetic layer of 1.0 μm or less in thickness.

A second feature of means (D) resides in that the powder constituting layer (a) comprises (i) a non-magnetic metal oxide powder and (ii) carbon black having an average particle size of less than 20 nm at a weight ratio of (i)/(ii) of 95/5 to 60/40.

Carbon black particles having an average size of smaller than 20 nm form a loose coherent structure in a dispersion to show pseudo-plasticity. A mixture of a non-magnetic metal oxide powder and such carbon black at the above-recited specific mixing ratio provides proper rheological characteristics, particularly at a low shear rate.

If the ratio is more than 95/5, pseudo-plasticity at a low shear rate may not be assured, causing mixing of layers (a) and (b). If it is less than 60/40, the dispersion tends to exhibit excessive pseudo-plasticity and become difficult to feed. Further, the dispersion may have deteriorated dispersibility to have poor surface properties.

These non-magnetic powders including the metal oxide powder and the carbon black are preferably used in layer (a) in an amount of 5 to 150% by weight and more preferably from 10 to 100% by weight based on binder in layer (a).

Suitable non-magnetic metal oxide powders used in this embodiment include α-alumina (a ratio: 90% or more), β-alumina, γ-alumina, chromium oxide, cerium oxide, α-ion oxide, corundum, titanium oxide, silicon dioxide, tin oxide, magnesium oxide, tungsten oxide, zirconium oxide, and zinc oxide. The metal oxide powder preferably has a particle diameter of 0.01 to 2 $\mu$m. If desired non-magnetic metal oxide powders whose particle size is above this limit may be used in combination, or a single non-magnetic metals oxide powder having a broad size distribution may be employed to the same effect. The metal oxide powder has a tapped density of from 0.05 to 2 g/cc, and preferably from 0.2 to 1.5 g/cc, a water content of from 0.1 to 5% by weight, and preferably from 0.2 to 3% by weight, a pH of from 2 to 11, a specific surface area of from 1 to 100 $m^2$/g, preferably from 5 to 50 $m^2$/g, and more preferably from 7 to 40 $m^2$/g, a crystallite size of from 0.01 to $2\mu$, a DBP absorption of from 5 to 100 ml/100 g, preferably from 10 to 80 ml/100 g, and more preferably from 20 to 60 ml/100 g, and a specific gravity of from 2 to 12, and preferably from 3 to 8. The shape of the metal oxide powder may be any of an acicular shape, a spherical shape, a cubic shape, and a tabular shape. The metal oxide powder does not need to be 100% by weight pure and may be surface-treated with other compounds. In this case, a purity of 70% by weight would be enough. In using titanium oxide powder, for example, surface treatment with alumina is generally conducted. An ignition loss of the metal oxide powder is preferably not more than 20% by weight. The metal oxide powder to be used preferably has a Mohs hardness of at least 4.

Typical examples of commercially available non-magnetic metal oxide powder include UA5600 and UA5605, (all produced by Showa Denko K.K.); AKP-20, AKP-30, AKP-50, HIT-50, HIT-100, and ZA-G1 (all produced by Sumitomo Chemical Co., Ltd.); G5, G7, and S-1 (all produced by Nippon Chemical Industrial Co., Ltd.); TF-100, TF-120, and TF-140 (all produced by Toda Kogyo K.K.); TTO-51B, TTO-55A, TTO-55B, TTO-55C, TTO-55S, TTO-55D, FT-1000, FT-2000, FTL-100, FTL-200, M-1, S-1, and SN-100 (all produced by Ishihara Sangyo Kaisha, Ltd.); ECT-52, STT-4D, STT-30D, STT-30, STT-65C, Y-LOP, and R516 (all produced by Titan Kogyo K.K.); T-1 (produced by Mitsubishi Material Corp.); MT-100S, MT-100T, MT-150W, MT-500B, MT-600B, and MT-100F (all produced by TAYCA CORPORATION); FINEX-25 (produced by Sakai Chemical Industry Co., Ltd.); and DEFIC-Y (produced by DOWA MINING CO., LTD.).

A third feature of means (D) is that layer (a) contains a polyurethane having at least three hydroxyl groups in the molecule thereof and a polyisocyanate compound. In order to form a very thin upper magnetic layer by wet-on-wet coating, it is necessary to control the rheological relationship between the upper magnetic dispersion and the lower non-magnetic dispersion. Where both the upper and lower layers contain a ferromagnetic powder, the range of rheological characteristics of the coating compositions permissible in simultaneous wet-on-wet coating is relatively broad. Where the dispersion for the lower layer contains only a non-magnetic powder as in the present invention, it exhibits much different rheological characteristics from those of the magnetic dispersion for the upper layer because of lack of magnetic properties. If two dispersions different in viscoelasticity are wet-on-wet coated, the two coatings undergo mixing, resulting in the failure of film formation. It is not until the conditions mentioned above in the second and third features are satisfied that the rheological characteristics of the lower non-magnetic dispersion can be controlled in good agreement with those of the upper magnetic dispersion containing the above-mentioned specific ferromagnetic powder.

It is known that a polyisocyanate compound is reacted with a hydroxyl group to provide a high-molecular weight compound. When a polyisocyanate compound and a polyurethane having three or more hydroxyl groups per molecule are dispersed together, the reaction slightly proceeds in the dispersion to provide moderate rheological characteristics. If the polyurethane contains two or less hydroxyl groups, the rheological characteristics of the dispersion becomes different from those of the upper magnetic dispersion, resulting in mixing of layers.

That is, in means (D), layer (a) containing fine carbon black particles having a particle size of less than 20 nm, in which the carbon black particles are, though non-magnetic, linked in a bead-like structure to show thixotropic properties is formed under layer (b) containing fine ferromagnetic powder. The thixotropic properties of the carbon black are synergistically enhanced by a three-dimensional high polymer formed between a polyurethane having at least three hydroxyl groups per molecule and a polyisocyanate compound in layer (a). Thus, a very thin magnetic layer (b) can be formed on layer (a) without suffering from any coating defect such as pinholes or coating streaks.

The polyurethane which can be used in means (D) is basically prepared from a polyol, a diisocyanate and, if desired, a chain extender by known processes. The polyol and/or chain extender may have a plurality of hydroxyl groups having different reactivity. The polyurethane may also be prepared by opening the epoxy group of an epoxy-containing polyurethane which is obtainable by using an epoxy-containing polyol.

Where a chain extender is used, the skeleton of the polyol to be used is not limited as far as it has at least two hydroxyl groups and is selected from polyether polyol, polyester polyol, polycarbonate polyol, polycaprolactone polyol, and copolymer polyols thereof. Where no chain extender is used, the polyol to be used must have at least three hydroxyl groups per molecule. Typical examples of the polyether polyol skeleton include polyalkylene glycols, e.g., polyethylene glycol and polypropylene glycol. The polyester polyol skeleton can be synthesized by, for example, polycondensation of a dihydric alcohol and a dibasic acid or ring-opening polymerization of lactones, e.g., caprolactone. Examples of typical dihydric alcohols include glycols, e.g., ethylene glycol, propylene glycol, butanediol, 1,6- hexanediol, and cyclohexanedimethanol. Typical examples of dibasic acids include adipic acid, pimelic acid, azelaic acid, sebacic acid, phthalic acid, and terephthalic acid.

The polycarbonate polyol skeleton includes (i) a polycarbonate polyol having a molecular weight of from 300 to 20,000 and a hydroxyl value of from 20 to 300 which is synthesized by condensation or interesterification between a dihydric alcohol represented by formula:

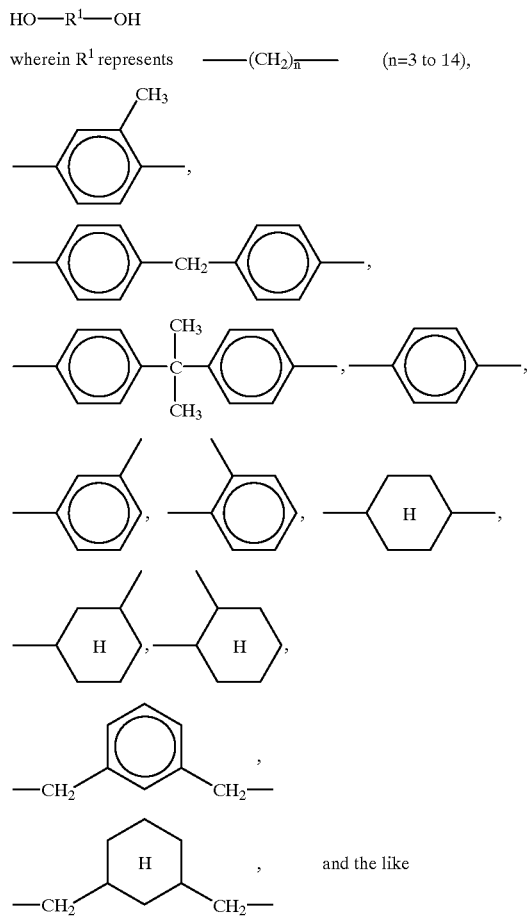

and the like and phosgene, a chloroformic ester, a dialkyl carbonate, or a diaryl carbonate and (ii) a polycarbonate polyester polyol having a molecular weight of from 400 to 30,000 and a hydroxyl value of from 5 to 300 which is synthesized by condensation between the above-described polycarbonate polyol (i) and a dicarboxylic acid represented by formula:

HOOC—R²—COOH wherein $R^2$ represents an alkylene group having from 3 to 6 carbon atoms, a 1,4-, 1,3-, or 1,2-phenylene group, or a 1,4-, 1,3-, or 1,2-cyclohexylene group.

The above-described polyols may be used in combination with up to 90% by weight of other polyols, e.g., polyether polyol, polyester polyol or polyester, based on the above-described polyol. The above-described polyol may contain, in addition to a hydroxyl group, a polar functional group, e.g., —SH, —COSH, —CSSH, —SO₃M, —COOM, —OPO(OM)₂ (wherein M represents a hydrogen atom, Na, K, or Li), an epoxy group, and an amino group.

The diisocyanate which can be reacted with the polyol to form a polyurethane is not particularly limited, and any of the conventionally employed diisocyanate compounds can be used. Examples of suitable diisocyanate compounds are tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate.

The chain extenders which can be used include known compounds, such as the above-mentioned polyhydric alcohols, aliphatic polyamines, alicyclic polyamines, and aromatic polyamines, and, in addition, these compounds having further bonded thereto a hydroxyl group which is different in reactivity.

The polyurethane resin is added to the non-magnetic metal oxide powder in an amount usually of from 1 to 100% by weight, preferably from 3 to 50% by weight, and more preferably from 4 to 40% by weight, based on the non-magnetic metal oxide powder. The polyurethane to be added preferably has a glass transition temperature of from −50° to 100° C., an elongation at break of from 100 to 2000%, a breaking stress of from 0.05 to 10 kg/cm², and a yield point of from 0.05 to 10 kg/cm².

The polyisocyanate which is used in layer (a) includes isocyanate compounds, e.g., tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate; reaction products between such an isocyanate compound and a polyhydric alcohol; and polyisocyanate compounds obtained by condensation of isocyanate compounds. These polyisocyanate compounds are commercially available under trade names of Coronate L, Coronate HL, Coronate 2030, Coronate 2031, Millionate MR, and Millionate MTL (all produced by Nippon Polyurethane Co., Ltd.); Takenate D-102, Takenate D-110N, Takenate D-200, and Takenate D-202 (all produced by Takeda Chemical Industries, Ltd.); and Desmodule L, Desmodule IL, Desmodule N, and Desmodule HL (all produced by Sumitomo Bayer Co., Ltd.). These compounds may be used either individually or in combination of two or more thereof to take advantage of a difference in curing reactivity. The polyisocyanate is added in an amount usually of from 1 to 50% by weight, preferably from 2 to 40% by weight, and more preferably from 4 to 30% by weight, by weight based on the non-magnetic metal oxide powder.

According to the second embodiment, a non-magnetic powder having a characteristic shape is used in the lower non-magnetic layer thereby making it possible to form an upper magnetic layer having a dry thickness of not more than 1.0 μm without forming a mixed region between the upper magnetic layer and the lower non-magnetic layer.

The terminology "mixed region" as used herein means a region where the components of the upper magnetic layer and those of the lower non-magnetic layer are present in a mixed form. More specifically, the "mixed region" means existence of the ferromagnetic powder originated in the upper magnetic layer and the non-magnetic powder originated in the lower non-magnetic layer in the interface therebetween. Accordingly, with no mixed region, each of the ferromagnetic powder and the non-magnetic powder undergoes no disturbance in orientation in the vicinity of the interface so that the interface in the cross section can be traced without difficulty. As a result, surface properties of the recording layer are improved, leading to an increase in RF output and an effective reduction in BER (block error rate) or drop-out. Further, thickness reduction of the magnetic layer to 1 μm or less leads to stable production of a magnetic recording medium suited for short wave recording.

While processes for producing the magnetic recording medium according to the second embodiment are not particularly restricted, the means adopted in the above-described exemplary means (E) through (G) can be successfully applied. That is, these magnetic recording media can be produced by appropriately selecting the shape or size of the ferromagnetic powder and/or non-magnetic powder, the kind of the binder, and the like.

In means (E), the lower non-magnetic layer contains a non-magnetic powder having an $r_1/r_2$ ratio (i.e., axial ratio) of 2.5 or more. The non-magnetic powder having such a specific axial ratio is orientated in the longitudinal direction through flow orientation on coating thereby inhibiting the rotary action thereof due to magnetic orientation of the ferromagnetic powder. As a result, the disturbance at the interface between the lower and upper layers, and also the orientation of the ferromagnetic powder can be improved.

While "$r_1$" and "$r_2$" indicate the longest and shortest length of the particle axis in average, respectively, the specific shape of the non-magnetic powder is principally arbitrary and may be either acicular or tabular as observed under an electron microscope. The terminology "axis" as used herein does not mean an axis of symmetry in its strict sense. In the case of acicular particles, $r_1$ is usually called an average major axis length and is not more than 3 μm, and preferably not more than 1.5 μm (in this case, $r_2$ corresponds to an average minor axis length or thickness), with a preferred axial ratio ranging from 5 to 20. In the case of flaky or tabular particles, $r_1$ corresponds to a so-called plate diameter and ranges from 0.01 to 3 μm, and preferably from 0.05 to 1.5 μm (in this case, $r_2$ is a thickness of the plate), with a preferred aspect ratio ranging from 5 to 20.

The non-magnetic powder is used in an amount usually of from 5 to 150% by weight and preferably from 10 to 100% by weight based on the binder in the lower non-magnetic layer.

While the ferromagnetic powder in the upper magnetic layer are not particularly limited in physical properties, shape, and size, acicular or tabular ferromagnetic powders having the longest axis of not more than 0.3 μm in average are preferred. Specific examples of the acicular ferromagnetic powder are $\gamma$—$Fe_2O_3$, $Fe_3O_4$, Co—$\gamma$—$Fe_2O_3$, $CrO_2$, and ferromagnetic alloy powders (e.g., Fe—Ni and Fe—Ni—Co). Specific examples of the tabular ferromagnetic powder include hexagonal ferrite powders, e.g., barium ferrite and strontium ferrite, and Co alloy powders. Particularly preferred are Fe-based alloys and hexagonal ferrites.

In means (F), the upper magnetic layer has a ferromagnetic powder having an average longest axis of not more than 0.3 μm, and the lower non-magnetic layer contains a non-magnetic powder having an acicular ratio of not less than 2.5. Differences from means (E) reside in that the shape of the non-magnetic powder is limited to an acicular form and that the average longest axis of the ferromagnetic powder is limited to 0.3 μm at the most, whereby the degree of powder packing and the output can be improved.

The terminology "acicular ratio" as used herein has the same meaning as $r_1/r_2$ as defined in means (E) with respect to the non-magnetic powder. For making a distinction therefrom, the acicular ratio will hereinafter be expressed as $R_1/R_2$, wherein $R_1$ is the average longest axial length, and $R_2$ the average shortest axial length. $R_1$ is not more than 3 μm, and preferably not more than 1.5 μm, with a preferred axial ratio being 5 or more.

The acicular non-magnetic powder which can be used in means (F) includes powders of non-magnetic metals (e.g., Cu, Cr, Ag, Al, Ti, and W) or oxides thereof (e.g., α- or γ—$Al_2O_3$, $Cr_2O_3$, α-ferrite, goethite, $SiO_2$ (inclusive of glass), $ZrO_2$, $CeO_2$, and rutile or anatase titanium dioxide).

The acicular non-magnetic powder is usually used in an amount of from 5 to 150% by weight and preferably from 10 to 100% by weight based on the binder in the lower non-magnetic layer.

The lower non-magnetic layer generally has a thickness of not less than 0.5 μm, and preferably between 0.5 and 5.0 μm. If it is thinner than 0.5 μm, productivity tends to be reduced, and calender-moldability may be deteriorated, failing to obtain sufficient electromagnetic characteristics.

The ferromagnetic powder has an arbitrary shape and may be either acicular or tabular. The definition of the axial ratio $r_1/r_2$ given in means (E) also applies to the average particle size of the ferromagnetic powder. For making a distinction therefrom, the axial ratio of the ferromagnetic powder to be used in this means (F) will hereinafter be expressed by $\phi_1/\phi_2$. In the case of acicular powders, $\phi_1$ is not more than 0.3 μm, and preferably not more than 0.25 μm, with the $\phi_1/\phi_2$ ratio being 2.5 or more. In the case of tabular powders, $\phi_1$ is between 0.01 and 0.3 μm, and preferably between 0.05 and 0.2 μm, with the $\phi_1/\phi_2$ ratio being 2.5 or more.

In means (G), the lower non-magnetic layer contains a flaky non-magnetic powder and a binder having an epoxy group as a functional group, and the upper magnetic layer contains an acicular or tabular ferromagnetic powder.

The flaky shape of the non-magnetic powder to be used in means (G) can be defined by the same overall value range for axial ratio $r_1/r_2$ used for the flaky powder used in means (E). However, for purpose of making necessary distinctions therefrom, the axial ratio of the flaky non-magnetic powder used in means (G) will hereinafter be expressed by $r_3/r_4$. $r_3$ ranges from 0.1 to 5 μm, and preferably from 0.1 to 2 μm, with the $r_3/r_4$ ratio preferably being 2.5 or more.

Specific but non-limiting examples of the flaky non-magnetic powder for means (G) preferably include graphite, mica, and boron nitride.

The amount of the flaky non-magnetic powder added is generally from 10 to 200% by weight and preferably from 12 to 120% by weight based on the binder in the lower non-magnetic layer.

The shape of the ferromagnetic powder which can be used here is limited to an acicular or tabular form, which can be defined by the same axial ratio $\phi_1/\phi_2$ as for the ferromagnetic powder used in means (F). For making a distinction therefrom, the axial ratio of the magnetic powder used in means (G) will hereinafter be expressed by $\phi_3/\phi_4$. In the case of acicular powders, $\phi_3$ is not more than 0.3 μm, with the $\phi_3/\phi_4$ ratio being not less than 2.5. In the case of tabular powders, $\phi_3$ is not more than 0.3 μm, with the $\phi_3/\phi_4$ ratio being not less than 2.5.

Examples of suitable acicular ferromagnetic powders include γ-iron oxide, Co-doped iron oxide, $CrO_2$, and Fe-based alloy powders. Examples of suitable tabular ferromagnetic powders include hexagonal ferrite ferromagnetic powders (e.g., Ba ferrite, Sr ferrite), and Co alloy powders.

Conventional binders can be used for dispersing and binding these ferromagnetic powders in means (G). If desired, the magnetic coating composition may further contain an abrasive, carbon black, a lubricant, and other conventional additives for magnetic powder containing coatings.

Binders which can be used in the lower non-magnetic layer comprises at least an epoxy-containing resin having a molecular weight of more than 30,000 and preferably not more than 200,000. It appears that the epoxy group of the binder resin is reacted with a hydroxyl group distributed on the surface of the non-magnetic powder thereby preventing stacking of the non-magnetic powder and improving dispersibility. Having a flaky shape, the non-magnetic powder is arranged in the lower non-magnetic layer in a configuration akin, to tiles covering a floor. Even when the ferromagnetic powder in the upper magnetic layer coated thereon undergoes magnetic field orientation, it is under control by the so-arranged non-magnetic powder in the lower layer at the interface and thus suffers no mixing with the lower layer components, thereby accomplishing satisfactory orientation. As a result, packing properties and surface properties are improved, and the RF output performance is increased.

The epoxy group content in the epoxy-containing binder resin is preferably in the range of from $1 \times 10^{-5}$ to $20 \times 10^{-4}$ eq/g, and more preferably from $4 \times 10^{-5}$ to $16 \times 10^{-4}$ eq/g. Incorporation of an epoxy group can be carried out by conventional techniques. For example, an epoxy-containing resin can be prepared by copolymerizing a vinyl monomer having a glycidyl group and other monomers. In addition, the process hereinafter described with respect to an epoxy-containing vinyl chloride resin can be used for the preparation of the epoxy-containing resin having a molecular weight of more than 30,000.

The epoxy-containing resin is generally used in an amount of from 5 to 100% by weight and preferably from 10 to 70% by weight based on the total binder in the lower non-magnetic layer.

In means (G), it is preferable to add an abrasive having a Mohs hardness of 5 or more to the lower non-magnetic layer at a non-magnetic powder/abrasive ratio of from 95/5 to 60/40 by weight. Incorporation of such an abrasive is effective to increase the strength of the lower non-magnetic layer, which leads to improved mechanical strength of the resulting magnetic recording medium. That is, the powder is prevented from falling off thereby to reduce BER and drop out and to improve durability.

Examples of abrasives having a Mohs hardness of 5 or more include $\alpha-Al_2O_3$, $Cr_2O_3$, $\alpha-Fe_2O_3$, $ZrO_2$, $TiO_2$, TiC, $SiO_2$. SiC, and $CeO_2$. The particle size of the abrasive is preferably not greater than the thickness of the lower non-magnetic layer, usually ranging from about 0.1 to 5$\mu$, and preferably from 0.1 to 2$\mu$. The abrasive grain may have either a granular shape or an acicular shape. If the mixing ratio of the abrasive to the flaky non-magnetic powder is less than 5/95, sufficient durability may not be obtained. If it is more than 40/60, the effects of the flaky powder on orientation of the magnetic powder tend to be reduced.

In the magnetic recording medium satisfying the first feature of the present invention, layer (b) preferably has an average dry thickness (d) ranging from $\lambda/4$ to $3\lambda$ and a surface roughness (Ra) of not more than $\lambda/50$.

To this effect, it is preferable that the ferromagnetic powder in layer (b) is an acicular powder having a major axis length of not more than 0.3 $\mu$m or a tabular powder having a plate diameter of not more than 0.3 $\mu$m and that the non-magnetic powder in layer (a) is a particulate powder having an average particle size of not more than $\lambda/4$ or an acicular powder having a major (longest) axis length of from 0.05 to 1.0 $\mu$m and an acicular ratio of from 5 to 20, or a tabular powder having a plate diameter of from 0.05 to 1.0 $\mu$m and an aspect ratio of from 5 to 20.

The above-mentioned surface properties can be achieved by the following four means (H) to (J) while controlling the standard deviation of average dry thickness of layer (b) to 0.2 $\mu$m or less.

(H) The non-magnetic powder in layer (a) contains an inorganic powder having a Mohs hardness of 3 or higher, the ferromagnetic powder in layer (b) is an acicular powder, and said inorganic powder has an average particle size ½ to 4 times the crystallite size of said acicular ferromagnetic powder.

(I) The non-magnetic powder in layer (a) contains an inorganic powder having a Mohs hardness of 3 or higher, the ferromagnetic powder in layer (b) is an acicular powder, and said inorganic powder has an average particle size not greater than ⅓ the major axis length of said acicular ferromagnetic powder.

(J) The ferromagnetic powder in layer (b) is a hexagonal tabular powder having an axis of easy magnetization in the direction perpendicular to the plate thereof, and the non-magnetic powder in layer (a) contains an inorganic powder having an average particle size of not more than the plate diameter of the ferromagnetic powder.

(K) The non-magnetic powder in layer (a) contains an inorganic powder coated with an inorganic oxide.

The effects of means (H) are described below.

In order to coat layer (b) to such a very small thickness as 1 $\mu$m or less, simultaneous wet-on-wet coating is required. In this coating system, surface roughness is decided by the relationship between the particle size of the inorganic powder in layer (a) and the crystallite size of the ferromagnetic powder in layer (b). In the case of acicular ferromagnetic powders, a crystallite size approximately corresponds to the shorter (minor) axis length. If the average particle size of the inorganic powder in layer (a) is less than ½ the crystallite size of the acicular ferromagnetic powder, dispersion of layer (a) becomes difficult, failing to obtain a smooth surface, which failure leads to insufficient surface smoothness of the finally obtained magnetic recording medium. To the contrary, if the average particle size of the inorganic powder in layer (a) exceeds 4 times the crystallite size of the ferromagnetic powder, the distance among particles in layer (a) becomes longer so that the ferromagnetic powder in layer (b) readily undergoes influences of the surface properties of layer (a), resulting in a failure to obtain sufficient surface properties. As demonstrated in Examples hereinafter given, it is desirable, for assurance of sufficient surface properties, to use an inorganic powder having an average particle size ½ to 4 times, and particularly ⅔ to 2 times, the crystallite size of a ferromagnetic powder in layer (b). Such an inorganic powder preferably has a spherical shape or a cubic shape and has a Mohs hardness of 3 or higher, preferably 4 or higher, and more preferably 9 or higher.

Further, the inorganic powder in layer (a) preferably has a volume packing of from 20 to 60%, and more preferably from 25 to 55%.

In order to reduce surface roughness by controlling the relationship between the non-magnetic powder size and ferromagnetic powder size as described above, there is a preferred range for the volume packing of the powder in layer (a). If the volume packing is less than 20%, the distance among particles in layer (a) becomes longer so that the ferromagnetic powder in layer (b) readily undergoes influences of the surface properties of layer (a). Further, the ferromagnetic powder in layer (b) is apt to be incorporated into layer (a), making the interface rougher. Furthermore, the squareness ratio would be reduced. On the other hand, if the volume packing exceeds 60%, the coating composition has too a high viscosity for coating. If coating may be carried out, the resulting medium would have poor running durability, suffering fall-off of powders.

The above-described inorganic powder is preferably present in an amount of 60% by weight or more based on the total non-magnetic powder. The inorganic powder to be used preferably includes metal oxides and alkaline earth metal salts. It is preferable to use carbon black in combination with the inorganic powder with the expectation of obtaining known effects, for example, reduction in surface resistivity. However, having a very poor dispersibility, carbon black alone is not sufficient for obtaining satisfactory electromagnetic characteristics. For satisfactory dispersibility, at least 60% by weight of total inorganic powder must be selected from metal oxides, metals, and alkaline earth metal salts. Should the proportion of the inorganic powder be less than 60%, with that of carbon black exceeding 40% by weight, dispersibility would be insufficient for obtaining desired electromagnetic characteristics.

The effects of means (I) are described below.

For maintaining satisfactory electromagnetic characteristics by wet-on-wet coating, it is necessary to increase a squareness ratio. If the inorganic powder in layer (a) has a large average particle size with respect to the magnetic powder in layer (b), the distance among particles in layer (a) becomes large to cause disturbance of orientation of the ferromagnetic powder particularly at the interface between layers (a) and (b), resulting in deterioration of surface properties of layer (b) as discussed above with respect to means (H). In order to reduce such orientation disturbance, it is required that fine non-magnetic particles should be arranged along the longer axis direction of the ferromagnetic powder to support the ferromagnetic particles so as to prevent orientation disturbance over the longitudinal direction of the ferromagnetic powder. In using an acicular ferromagnetic powder in layer (b), experimentation proved that use of an inorganic powder whose average particle size is not more than 1/3, preferably of from 1/3 to 1/2, the major axis length of the acicular ferromagnetic powder in layer (a) realizes a squareness ratio equal to that of a single magnetic layer and satisfactory surface properties.

The same approach is taken in means (J). That is, use of a hexagonal tabular ferromagnetic powder in place of an acicular ferromagnetic powder brings about vertical orientation to suppress the interfacial disturbance thereby increasing the squareness ratio. The average particle size of the inorganic powder to be used in layer (a) should not be greater than the plate diameter of the hexagonal tabular powder, and is preferably not less than 1/5 the plate diameter.

In means (I) and (J), the volume packing of the inorganic powder in layer (a) preferably ranges from 20 to 60% for the same reasons as described in (H).

Further, by controlling the thickness of layer (b) below 5 times the major axis length of the ferromagnetic powder, the effect of calendering on improvement of packing is enhanced to further improve electromagnetic characteristics.

Preferred kinds and properties of the inorganic powder to be used in means (I) and (J) are the same as described with respect to means (H).

The effects of means (K) are as follows. Examples of suitable inorganic oxides to be coated on the inorganic powder in layer (a) include $Al_2O_3$, $SiO_2$, $TiO_2$, $ZrO_2$, $SnO_2$, $Sb_2O_3$, and $ZnO$, with $Al_2O_3$, $SiO_2$, and $ZrO_2$ being particularly preferred. These inorganic oxides may be used either individually or in combinations thereof. If desired, surface treatment of the inorganic powder may be carried out by co-precipitation of the above-mentioned oxide compounds, or the inorganic powder is first treated with alumina and then with silica, or vise versa. The surface treating coat may be porous depending on the end use, but is, in general, preferably has a uniform and dense structure.

The surface treatment of the non-magnetic inorganic powder can be effected, for example, as follows. A material(s) of the non-magnetic inorganic powder is dry ground and then wet ground together with water and a dispersing agent, followed by centrifugal separation for removing coarse particles. The resulting finely divided slurry is transferred to a surface treatment bath where the dispersed particles are coated with a metal hydroxide. A prescribed amount of an aqueous solution of a salt of Al, Si, Ti, Zr, Sb, Sn, Zn, etc. is added to the bath, and a neutralizing acid or alkali is added thereto to form a hydrous oxide with which the inorganic powder is coated. The by-produced water-soluble salt is removed by decantation, filtration, or washing, and the slurry is finally adjusted to a prescribed pH, followed by filtration and washing with pure water. The washed filter cake is dried by a spray drier or a band drier. The dried product is pulverized in a jet mill. The surface treatment with Al or Si may also be carried out by applying vapors of $AlCl_3$ or $SiCl_4$ to the non-magnetic inorganic powder and then passing steam therethrough.

With respect to other suitable surface treatments, reference can be made to *Characterization of Powder Surfaces*, Academic Press.

In the above-described embodiments in which the range of thickness of layer (b) optimum for a particular recording wavelength and the upper limit of thickness variation of layer (b) (i.e., a width of variation in the thickness direction) are specified, the surface roughness of layer (b) is decided with an improvement, leading to a success of forming a thin, uniform, and even magnetic layer. As a result, high reproduction output and high C/N ratio can be reached while preventing variations in reproduction output and amplitude modulation noise even if the recording wavelength becomes shorter. In the conventional magnetic recording media with the thickness of the magnetic layer being reduced, if the recording wavelength becomes shorter, variations in thickness of the magnetic layer (contributing to reproduction in its totality) caused variations in reproduction output and amplitude modulation noise. Such disadvantages of the conventional techniques can thus be overcome by the present invention.

The shortest recording wavelength λ varies depending on the type of magnetic recording media. For example, it is 0.7 μm for 8 mm metal video tapes, 0.5 μm for digital video tapes, or 0.67 μm for digital audio tapes.

The thickness d of layer (b) according to the present invention is in the range of $\lambda/4 \leq d \leq 3\lambda$, and preferably $\lambda/4 \leq d \leq 2\lambda$ (i.e., $0.25 \leq d/\lambda \leq 2$). The average thickness d of layer (b) according to the present invention usually falls within a range of from 0.05 to 1 μm, and preferably from 0.05 to 0.8 μm.

The thickness of layer (b) can be obtained by actual measurements as described above. It is also obtainable by fluorescent X-ray method. In this case, a calibration curve of fluorescent X-ray intensity for an element inherently contained in a magnetic layer is prepared from magnetic layer samples having a known thickness, and a thickness of a sample of unknown thickness is obtained from its fluorescent X-ray intensity. In the present invention, $^\Delta d$ is controlled below d/2, that is, $^\Delta d/d$ is controlled below 0.5, preferably below 0.3, and more preferably below 0.25. $^\Delta d$ ranges from 0.001 to 0.5 μm, preferably from 0.03 to 0.3 μm, and more preferably from 0.05 to 0.25 μm. With these conditions being fulfilled, layer (b) is assured of evenness of its thickness and, at the same time, has its surface roughness Ra controlled at or below λ/50, i.e., to control l/Ra at or above 50, preferably at or above 75, and more preferably at or above 80. The terminology "surface roughness Ra" as used herein means a centerline average roughness as measured with an interference roughness tester.

The magnetic recording medium of the present invention are produced by forming layer (b) on layer (a) either by simultaneous coating or successive coating while layer (a) is wet. Simultaneous wet-on-wet coating is preferred. The magnetic recording medium produced by the wet-on-wet coating system of the present invention, for example, by simultaneous coating of a lower non-magnetic layer and a 1 μm or less thick upper magnetic layer is free from various coating defects which develop with a single magnetic layer having a reduced thickness or with a double-layer structure formed by coating an upper magnetic layer on a dried lower non-magnetic layer (so-called wet-on-dry coating).

The inventors ascertained that mere reduction in magnetic layer thickness is not enough and that there is an optimum thickness range in relation to the shortest recording wavelength λ. That is, if the magnetic layer thickness is thinner than λ/4, a magnetic flux contributing to reproduction decreases to cause reduction of output. If it exceeds 3λ, short wavelength components undergo demagnetization by a deep layer recording magnetic field of simultaneously recorded long wavelength components, which also causes reduction of output. Accordingly, $d \leq 3\lambda$, and preferably $d \leq 2\lambda$.

Turning to a C/N, a fundamental factor of performance properties of magnetic recording media, it is influenced by not only unevenness of a magnetic layer surface (surface roughness), which is a conventionally identified problem with a thick magnetic layer, but also a thickness variation at the interface between a non-magnetic layer and a magnetic layer. The latter consideration was not important in the conventional thick magnetic layer but carries weight with the magnetic layer thickness d falling within the specific range $\lambda/4 \leq d \leq 3\lambda$. This is because an output is influenced by the magnetic flux of the whole magnetic layer with d falling within the above range. In this connection, it was found that an average thickness variation $^\Delta d$ at the interface between layers (a) and (b) should be not more than d/2. The surface of layer (b) is required to be smooth as in the conventional thick magnetic layer, and surface roughness Ra is required to satisfy the relationship: $Ra \leq \lambda/50$.

The above-described embodiments for the first feature thus make it possible to produce high performance coated type magnetic recording media exhibiting electromagnetic characteristics comparable to thin metal tapes at high productivity without being accompanied by the problems associated with metal tapes, such as necessity of treatment in vacuum, susceptibility to corrosion, and low productivity.

The second feature of the present invention is that the squared mean surface roughness $R_{rms}$ of layer (b) as measured with a scanning tunnel microscope (STM) and an average dry thickness d of layer (b) satisfies a relationship: $30 \leq d/R_{rms}$.

As the thickness of a magnetic layer is reduced, self-demagnetization loss is expected to be reduced to increase output. At the same time, however, reduction of thickness means reduction in margin to be pressed on calendering. It follows that the effect of calendering is lessened, resulting in increased surface roughness. In order to decrease self-demagnetization loss to thereby improve output, it is preferable to control the STM surface roughness so as to satisfy the above relationship.

$R_{rms}$ as measured with an atomic force microscope (AFM) is preferably not more than 10 nm. Interference surface roughness Ra as measured with 3d-MIRAU is preferably from 1 to 4 nm, and a peak-to-valley value (P-V value) is preferably not more than 80 nm.

Gloss of the surface of layer (b) after calendering is preferably from 250 to 400%.

The third feature of the present invention can be accomplished by means (L) or (M):

(L) The ferromagnetic layer in layer (b) is an acicular ferromagnetic alloy powder having a major axis length of not more than 0.3 μm and a coercive force (Hc) of not less than 1500 Oe or a tabular ferromagnetic powder having a plate diameter of not more than 0.3 μm and an Hc of not less than 1000 Oe.

(M) Layer (b) contains a ferromagnetic alloy powder having a major axis length of not more than 0.25 μm and an acicular ratio of not more than 12, and layer (b) has an Hc of not less than 1500 Oe in the longitudinal direction and not less than 1000 Oe in the width direction.

According to means (L) and (M), variation or disturbance at the interface between layers (a) and (b) can be suppressed to prevent orientation disturbance of the ferromagnetic powder in layer (b), whereby the coercive force of layer (b) having a dry thickness of not more than 1.0 μm in each of normal direction, longitudinal direction, and width direction can be set above a certain level to improve electromagnetic characteristics particularly in short wavelength recording.

Means (L) is described below in detail.

Residual coercive force (Hr) as used herein means a value obtained as follows. A magnetic field of 10 kOe is applied to a magnetic recording medium sample in the in-plane direction of layer (b). When the thus magnetized sample is turned 90° in the thickness direction, the intensity of the outer magnetic field applied in the normal direction with respect to layer (b) which is required for making the residual magnetization zero is a residual coercive force.

According to means (L), Hr is set at 1500 Oe or higher, by which demagnetization loss during recording can effectively be inhibited to attain high output. This is probably because Hr corresponds to a vertical magnetization component. Because the contribution of the coercive force of this vertical magnetization component increases particularly in short wavelength recording, it is believed that setting Hr high brings about inhibition of demagnetization loss on recording.

Means (L) can be realized by proper selection of an inorganic powder to be used in layer (a) for the purpose of achieving high Hr thereby minimizing orientation disturbance of the ferromagnetic powder at the interface between layers (a) and (b) and also by using a ferromagnetic powder having large magnetization anisotropy (i.e., having a higher Hc in one direction) and preferably by conducting orientation in multiple stages.

Means (L) thus makes it possible to produce high performance coated type magnetic recording media exhibiting electromagnetic characteristics comparable to thin metal tapes at high productivity without being accompanied by the problems associated with metal tapes, such as necessity of treatment in vacuum, susceptibility to corrosion, and low productivity.

While the ferromagnetic powders capable of assuring a high Hr are not particularly limited in kind, proper choice of the shape and kind thereof in carrying out means (L) produces greater effects.

That is, the ferromagnetic powder which can be used in means (L) is an acicular ferromagnetic alloy powder having a major axis length of not more than 0.3 μm, preferably not more than 0.25 μm, and a coercive force (Hc) of not less than 1500 Oe, preferably not less than 1550 Oe, or a tabular ferromagnetic powder having a plate diameter of not more than 0.3 μm, preferably not more than 0.2 μm, and an Hc of not less than 1000 Oe, preferably not less than 1200 Oe.

The above-mentioned acicular ferromagnetic alloy powder, inclusive of a single metal powder, preferably has an acicular ratio (longest axis length/shortest axis length) of from 2 to 15, and preferably from 5 to 12. Specific examples of such an acicular ferromagnetic alloy powder include single metals, e.g., Fe, Ni, and Co; and alloys comprising such a metal as a main component (at least 75%) and other prescribed elements. If desired, other elements, e.g., Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, and B, may further be present for the purpose of improving various characteristics.

The tabular ferromagnetic powder to be used in means (L) has an aspect ratio (plate diameter/thickness ratio) of from 2 to 30, and preferably from 5 to 20. Examples of such tabular ferromagnetic powders are hexagonal ferrite ferromagnetic powders (e.g., barium ferrite, strontium ferrite, lead ferrite, calcium ferrite, cobalt ferrite), and hexagonal Co powder. More specifically, barium ferrite or strontium ferrite of magnetoplumbite type and barium ferrite or strontium ferrite of magnetoplumbite type locally containing a spinel phase are included. Particularly preferred are barium ferrite and strontium ferrite. In order to control coercive force, the above-mentioned hexagonal ferrite having added thereto Co—Ti, Co—Ti—Zr, Co—Ti—Zn, Ni—Ti—Zn, Ir—Zn, etc. can be used. The plate diameter is a width of a tabular particle and can be measured under electron microscopic observation.

In means (L), ferromagnetic powders other than those enumerated above, e.g., magnetic iron oxide $FeO_x$ (x=1.33 to 1.5) and Co-doped $FeO_x$ (x=1.33 to 1.5), may also be used either alone or in combination with the above-mentioned ferromagnetic powders.

The inorganic powders which can be used in layer (a) in means (L) include metals (e.g., Cu, Cr, Ag, Al, Ti, and W), metal oxides, metal carbonates, metal sulfates, metal nitrides, metal carbides, and metal sulfides. Specific examples include $TiO_2$ (rutile or anatase), $TiO_x$, cerium oxide, tin oxide, tungsten oxide, ZnO, $ZrO_2$, $SiO_2$, $Cr_2O_3$, α-alumina (α ratio: 90% or more), β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide, either alone or in combination of two or more thereof. The shape, size, and the like of these inorganic powders are arbitrary. Two or more different kinds of inorganic powders may be combined, or a single kind of the inorganic powder having a selected size distribution may be employed according to the purpose sought. Particulate inorganic powders usually have a particle size of not more than 0.2 $\mu$m, and preferably between 0.005 and 0.08 $\mu$m, and acicular inorganic powders usually have a major axis length of from 0.05 to 1.0 $\mu$m, and preferably from 0.05 to 0.5 $\mu$m, with an acicular ratio ranging from 5 to 20, and preferably from 5 to 15.

From the standpoint of physical properties, preferred inorganic powders are those having a tapped density of from 0.05 to 2 g/cc, and preferably from 0.2 to 1.5 g/cc, a water content of from 0.1 to 5%, and preferably from 0.2 to 3%, a pH of from 2 to 11, and a DBP absorption of from 5 to 100 ml/100 g, preferably from 10 to 80 ml/100 g, and more preferably from 20 to 60 ml/100 g. The non-magnetic inorganic powder does not need to be 100% by weight pure and may be surface-treated with other compounds, e.g., compounds of Al, Si, Ti, Zr, Sn, Sb, Zn, etc., to form thereon a coat of an oxide of such element according to the purpose sought. In this case, a purity of 70% by weight would be enough. An ignition loss of the inorganic powder is preferably not more than 20% by weight.

These inorganic powders are commercially available under trade names of UA 5600 and US 5605 (both produced by Showa Denko K.K.); AKP-20, AKP-30, AKP-50, HIT-50, HIT-100, and ZA-G1 (all produced by Sumitomo Chemical Co., Ltd.); G5, G7, and S-1 (all produced by Nippon Chemical Industrial Co., Ltd.; TF-100, TF-120, TF-140, R 516 (all produced by Toda Kogyo K.K.); TTO-51B, TTO-55A, TTO-55B, TTO-55C, TTO-55S, TTO-55D, FT-1000, FT-2000, FTL-100, FTL-200, M-1, S-1, SN-100, R-820, R-830, R-930, R-550, CR-50, CR-80, R-680, and TY-50 (all produced by Ishihara Sangyo Kaisha, Ltd.); ECT-52, STT-4D, STT-30D, STT-30, and STT-65C (all produced by Titan Kogyo K.K.); T-1 (produced by Mitsubishi Material Corp.); NS-O, NS-3Y, and NS-8Y (all produced by Nippon Shokubai Kagaku Kogyo Co., Ltd.); MT-100S, MT-100T, MT-150W, MT-500B, MT-600B, and MT-100E (all produced by Teika K.K.); FINEX-25, BF-1, BF-10, BF-20, BF-1L, and BF-10P (all produced by Sakai Kagaku K.K.); DEFIC-Y and DEFIC-R (both produced by Dowa Kogyo K.K.); and Y-LOP and calcined product thereof (produced by Titan Kogyo K.K.).

A particularly preferred non-magnetic inorganic powder for use in the present invention is titanium oxide, and especially titanium dioxide. Process for producing titanium oxide is described below in detail. Preparation of titanium oxide chiefly includes a sulfuric acid process and a chlorine process. According to the former process, a raw ore of ilmenite is distilled in sulfuric acid to extract Ti, Fe, etc. in the form of a sulfate, and iron sulfate is removed by crystallization. After purifying the residual titanium sulfate solution by filtration, hydrolysis is conducted under heating to precipitate hydrous titanium oxide, which is then filtered and washed to remove impurities. A particle size regulator, etc. is added thereto, followed by calcination at 80 to 1000° C. to obtain crude titanium oxide. The structure type, rutile or anatase, is decided by the kind of a nucleating agent added on hydrolysis. The resulting crude titanium oxide is subjected to finishing treatments, such as pulverization, classification, surface treatment, and so on. The chlorine process is applied to a naturally-occurring rutile type ore or synthetic rutile. An ore is chlorinated in a reduced state at a high temperature, whereby Ti is converted to $TiCi_4$, and Fe to $FeCl_2$. After cooling, solidified iron oxide is separated from liquid $TiCl_4$. The resulting crude $TiCl_4$ is purified by rectification and, after addition of a nucleating agent, brought into an instantaneous reaction with oxygen at 1000° C. or higher to obtain crude titanium oxide, which is then subjected to the same finishing treatments as described above for imparting pigment properties.

In the present invention, layer (a) may further contain carbon black to decrease surface resistivity $R_s$ as commonly expected. Carbon black which can be used in the present invention includes furnace black for rubbers, thermal black for rubbers, color black, and acetylene black. Carbon black to be used preferably has a specific surface area of from 100 to 500 m$^2$/g, a DBP absorption of from 20 to 400 ml/100 g, an average particle size of from 5 to 30 m$\mu$, a pH of from 2 to 10, a water content of from 0.1 to 10%, and a tapped density of from 0.1 to 1 g/cc.

Specific examples of commercially available carbon black which can be used in the present invention are BLACKPEARLS 2000, 1300, 1000, 900, 800, 880 and 700 and VULCAN XC-72 (all produced by Cabot Corp.); #3050, #3150, #3250, #3750, #3950, #2400B, #2300, #1000, #970, #950, #900, #850, #650, #40, MA 40, and MA-600 (all produced by Mitsubishi Chemical Industries, Ltd.); CONDUCTEX SC (produced by Columbian Co., Ltd.); 8800, 8000, 7000, 5750, 5250, 3500, 2100, 2000, 1800, 1500, 1255, and 1250 (all produced by Raven); and Ketjenblack EC (produced by Akizo Chemie Nederland B.V.). Carbon black having been surface treated with a dispersing agent, etc., resin-grafted carbon black, or carbon black having its surface partly graphitized may be employed. Carbon black may previously be dispersed in a binder before it is added to a magnetic coating composition. The above-described carbon black species may be used either individually or in combination of thereof. In choosing carbon black species for use in the present invention, Carbon Black Kyokai (ed.), *Carbon Black Binran* can be referred to.

If desired, layer (a) may furthermore contain a non-magnetic organic powder, such as an acrylate-styrene copolymer resin powder, a benzoguanamine resin powder, a melamine resin powder, a phthalocyanine pigment, a polyolefin resin powder, a polyester resin powder, a polyamide resin powder, a polyimide resin powder, and a polyfluoroethylene resin powder. Processes for producing these organic powders are described, e.g., in JP-A-62-18564 and JP-A-60-255827.

The total non-magnetic powder is usually used at a weight ratio to binder of from 20 to 0.1, and at a volume ratio to binder of from 10 to 0.1.

While a subbing layer is generally provided in magnetic recording media, it is different from the lower non-magnetic layer according to the present invention in not only thickness (generally 0.5 µm or less) but the purpose sought (for improvement of adhesion between a support and an upper layer, e.g., a magnetic layer). Provision of a subbing layer is also recommended in the present invention for improving adhesion between a support and layer (a).

Multi-staged orientation of layer (b) can be carried out by any conventional method. For example, layer (b) is orientated while both layers (a) and (b) are wet with a cobalt magnet of 3000 G and then with a solenoid of 1500 G.

Means (M) is illustrated below in detail.

The terminology "coercive force Hc in the longitudinal direction of layer (b)" means the outer magnetic field applied in parallel with layer (b) and in the longitudinal direction of layer (b) which is necessary to bring a residual magnetic field to zero after applying a magnetic field of 10 kOe to a sample in its in-plane direction with a vibrating sample magnetometer (VSM), the "longitudinal direction" being a direction parallel with the in-plane and with the coating orientation direction. Likewise, the terminology "coercive force Hc in the width direction of layer (b)" means the outer magnetic field applied in parallel with layer (b) and in the width direction of layer (b) which is necessary to bring a residual magnetic field to zero after applying a magnetic field of 10.kOe to a sample in parallel with its in-plane direction and in its width direction with VSM, the "with direction" being a direction parallel with the in-plane and perpendicular to the coating orientation direction.

Means (M) is characterized by setting Hc in the longitudinal direction of a magnetic layer having a thickness of not more than 1.0 µm at 1500 Oe or higher, and preferably 1600 Oe or higher, and setting Hc in the width direction at 1000 Oe or higher, and preferably 1100 Oe or higher, thereby improving electromagnetic characteristics, particularly reproduction output, while inhibiting crosstalk to reduce BER.

The effects of action of means (M) are the same as those described with respect to means (L), with the vertical magnetization component as referred to in means (L) being replaced with a magnetization component in the longitudinal or width direction. That is, means (M) aims at inhibition of recording demagnetization of a magnetization component in the longitudinal or width direction. The problem of productivity associated with the conventional techniques in attempting to obtain high performance properties of a magnetic layer can be resolved by using an inorganic powder in layer (a). While embodiments of layer (a) are not particularly restricted in means (M), it is preferable to make a proper selection of the inorganic powder to be incorporated into layer (a) and to control the thickness of layer (a) as described below.

Further, in means (M), a ferromagnetic alloy powder having a major axis length of not more than 0.25 µm, and preferably not more than 0.2 µm, and an acicular ratio of not more than 12, and preferably of from 7 to 11, is employed for assurance of Hc in both longitudinal and width directions. The ferromagnetic alloy powders to be used are the same as the acicular ferromagnetic alloy powders enumerated above with reference to means (L).

The inorganic powder which can be used in means (M) preferably includes particulate particles having a true specific gravity of not less than 3, and preferably between 4 and 8, and an average particle size of not more than 0.2 µm, and preferably of from 0.005 to 0.08 µm, and acicular particles having a true specific gravity of not less than 3, and preferably from 4 to 8, a major axis length of from 0.05 to 1.0 µm, and preferably from 0.05 to 0.5 µm, and an acicular ratio of from 5 to 20, and preferably from 5 to 15. The same specific examples of the inorganic powders as enumerated above for means (L) apply to means (M). The terminology "true specific gravity" as used herein has the same meaning as true density, a substantial density excluding any pores or voids among particles.

A preferred thickness of layer (a) is 0.5 µm or greater, and particularly from 0.5 to 5.0 µm. It the thickness of layer (a) is less than 0.5 µm, productivity tends to fall, and calender effects tend to be reduced, causing a failure of obtaining sufficient electromagnetic characteristics.

Other factors, such as carbon black and non-magnetic organic powders to be incorporated into layer (a), are the same as described in means (L).

Further, layer (b) of the magnetic recording medium fulfilling the third feather of the present invention has a standard deviation 3σ of not more than 0.6 µm, and preferably not more than 0.2 µm. That is, it would be enough if 97% of segments fall within 0.6 µm. 3a is preferably not more than 6d/10.

Standard deviation σ can be obtained as follows. A magnetic recording medium is sliced along its longitudinal direction with a diamond cutter to a thickness of about 0.1 µm. Micrographsm (print size: A4 to A5) of the cut area were taken with a transmission type electron microscope (TEM) at a magnification of 10000 to 100000, preferably 20000 to 50000. The interface between layers (a) and (b) was identified with the naked eye with attention paid to a difference in shape between the magnetic powder in layer (b) and the non-magnetic powder in layer (a) and traced with a black marker pen. The surface of layer (b) is also traced with a black marker pen. By the use of an image analyzer "IBAS 2" manufactured by Zeiss Co., the distance in the thickness direction between the two black lines is measured in each of 100 to 300 divided segments to obtain a standard deviation according to the following formula, taking layer (b) thickness in each segment as $x_1$:

$$\sigma = \frac{\sqrt{\sum_{i=1}^{n}(x_i - d)^2}}{n} \quad (n = 100 \text{ to } 300)$$

The aforementioned $^\Delta$d gives a consideration of only the interfacial variation, while standard deviation a of average thickness d gives a consideration of layer (b) thickness variation inclusive of both surface roughness of layer (b) and the interfacial variation. The interfacial variation is preferably such that 3σ is within 0.6 μm.

Thus, surface roughness Ra can be controlled so as to satisfy a relationship: Ra≦λ/50, i.e., λ/Ra≧50, preferably ≧75, and more preferably ≧100, while maintaining evenness of the layer (b) thickness (Ra: centerline average roughness measured with interference roughness tester).

Further, the thickness d and surface roughness Ra of layer (b) are preferably related with the shortest recording wavelength λ so as to have relationships: λ/4≦d≦3λ, preferably λ/4≦d≦2λ (i.e., 0.25≦λ/d≦2); and Ra≦λ/50, respectively.

There is thus obtained a magnetic recording medium having a high reproduction output and a high C/N ratio while preventing reproduction output variations or amplitude modulation noise.

The above-described surface characteristics can be accomplished by means (H) to (J) above discussed.

The fourth feature of the present invention can preferably be realized by a means in which the stiffness of the magnetic recording medium is controlled so as to have an SMD/STM ratio of from 1.0 to 1.9.

To this effect, it is preferable to use a spherical to cubic polyhedral inorganic powder having a Mohs hardness of 6 or higher and an average particle size of not more than 0.15 μm in layer (a). With an SMD/STD ratio being so adjusted, dynamic characteristics of the magnetic recording medium are controlled to have improved contact with a head while improving electromagnetic characteristics in short wavelength recording.

SMD and STD can be measured with a commercially available stiffness tester, e.g., a loop stiffness tester manufactured by Toyo Seiki K.K. A 8 mm wide and 50 mm long specimen is cut out of a magnetic recording medium sample in such a manner that the lengthwise direction agrees with the coating direction of the sample (for measurement of SMD) or with the width direction of the sample (for measurement of STD), and both ends of the specimen are adhered to make a loop. A load is applied to the inner diameter direction at a rate of displacement of 3.5 mm/sec, and a load (mg) required for giving a displacement of 5 mm is taken as SMD or STD.

The SMD/STD ratio is controlled within a range of from 1.0 to 1.9, and preferably from 1.1 to 1.85. A magnetic recording medium having a total thickness of 13.5±1 μm has an SMD of from 50 to 200 mg, and preferably from 50 to 150 mg, and an STD of from 40 to 150 mg, and preferably from 50 to 130 mg.

Means for SMD/STD control is not particularly limited, but the control is preferably effected by selection of the shape and Mohs hardness of the inorganic powder to be used in layer (a). The inorganic powder is preferably selected from spherical to cubic, polyhedral inorganic powders having a Mohs hardness of 6 or more, and particularly 6.5 or more, and an average particle size of not more than 0.15 μm, and particularly not more than 0.12 μm.

In order to obtain satisfactory contact with a head, the magnetic recording medium is required to have increased stiffness in each direction to some extent. To this effect, the powder to be used preferably has hardness. If Mohs hardness is less than 6, each stiffness decreases, failing to retaining satisfactory contact with a head. Further, a small average particle size of 0.15 μm or less is good for satisfactory contact with a head probably because the contact area with a binder is so increased that both SMD and STD would be improved the more. In the present invention, the SMD/STD ratio is adjusted within the above-recited specific range.

Particularly excellent effects on electromagnetic characteristics are manifested as STD approaches SMD, i.e., the SMD/STD ratio approaches 1. In this connection, use of a polyhedral inorganic powder, inclusive of from a spherical powder to a cubic powder, in layer (a) makes dynamic physical properties of the coating film isotropic, which is advantageous for improving STD.

The polyhedral inorganic powders include spherical powders and regular or irregular polyhedral powders having one or more regular or irregular polygons such as regular n-gons (e.g., a regular square, a regular pentagon, and a regular hexagon) and irregular n-gons. Those having an axial ratio of arbitrarily selected two axes ranging from 0.6 to 1.4, and preferably from 0.7 to 1.3, are desirable.

The fourth feature of the present invention can also be realized by another means in which a percent thermal shrinkage of the magnetic recording medium at 80° C.×30 minutes has is controlled not to exceed 0.4%. To this effect, layer (a) has a dry thickness 1 to 30 times the dry thickness of layer (b), and a difference subtracting a powder volume ratio of layer (b) from that of layer (a) is within a range of from −5% to +20%; the ferromagnetic powder in layer (b) has a crystallite size of not more than 300 Å, and the inorganic powder in layer (a) is a particulate powder having an average particle size of less than 0.15 μm or an acicular powder having an average major axis length of less than 0.6 μm; the inorganic powder in layer (a) is at least one of titanium oxide, barium sulfate, calcium carbonate, strontium sulfate, silica, alumina, zinc oxide, and α-iron oxide; and layer (a) further contains, as a second component, less than 50 parts by weight of carbon black having an average particle size of not more than 30 mμ, a DBP absorption of from 30 to 300 ml/100 g, and a BET specific surface area of from 150 to 400 m$^2$/g per 100 parts by weight of the above-described inorganic powder.

This means aims at production of a coated type magnetic recording medium having its magnetic layer thickness reduced to 1 μm or less to reduce self-demagnetization loss without causing coating defects such as pinholes and streaks and also at controlling thermal shrinkage of the medium below a certain level.

By controlling percent thermal shrinkage after preservation at 70° C. for 48 hours to 0.4% or less, skewness can be diminished while obtaining excellent electromagnetic characteristics comparable to ferromagnetic metal thin films.

In other words, this means is based on the finding that a proper strength of a magnetic recording medium with which a magnetic recording medium having a very thin magnetic layer can be produced with good productivity while minimizing skewness can be specified by the above-described percentage thermal shrinkage.

The terminology "percent thermal shrinkage" as used herein means a value calculated by 100×[(length of magnetic recording medium at room temperature before heating)−(length of magnetic recording medium after preserved at 70° C. for 48 hours without tension)]/(length of magnetic recording medium before heating).

Means for controlling percent thermal shrinkage are not particularly restricted. More specifically, the following means are suitable.

The dry thickness of layer (a) is made 1 to 30 times, preferably 2 to 20 times, that of layer (b), whereby expansion and contraction of the magnetic recording medium are controlled by film strength of layers (a) and (b). If the layer (a) thickness is less than the layer (b) thickness, the film strength is not sufficient for preventing thermal shrinkage from increasing with a reduction in layer (b) thickness. If the layer (a) thickness is more than 30 times the layer (b) thickness, the total thickness of the recording medium increases to increase a residual solvent, which leads to disadvantages such as plasticization of the film.

The film strength of layers (a) and (b) can be properly adjusted by controlling a difference subtracting a powder volume ratio of layer (b) from that of layer (a) within a range of from −5% to +20%, and preferably from 0 to 15%. If this difference is less than −5%, an increase in thermal shrinkage of layer (b) cannot be suppressed. If it exceeds 20%, the magnetic recording medium itself becomes too hard, causing fall-off of the powder.

The powder volume ratio of layer (b) usually ranges from 10 to 50%, and preferably from 20 to 45%, and that of layer (a) usually ranges from 20 to 60%, and preferably from 25 to 50%.

The powder volume ratio of each layer can be controlled by adjustment of powder to binder ratio and size and shape of the powders in each layer. An increase in binder amount results in a relative decrease in powder volume ratio. The finer the powder, the greater the effect on reduction of percent thermal shrinkage. However, too fine powders are difficult to disperse.

The ferromagnetic powder to be used in this means preferably has a crystallite size of not more than 300 Å, and particularly from 100 to 250 Å, and an average major axis diameter of from 0.005 to 0.4 $\mu$m, and particularly from 0.1 to 0.3 $\mu$m, with an average major axis diameter/crystallite size ratio being from 3 to 25, and particularly from 5 to 20. The ferromagnetic powder preferably has a BET specific surface area of from 25 to 80 m$^2$/g, and particularly from 30 to 70 m$^2$/g. If the BET specific surface area is less than 25 m$^2$/g, noise tends to increase. If it exceeds 80 m$^2$/g, desired surface properties are hardly obtained.

The inorganic powder in layer (b) to be used in this means preferably includes a particulate powder having an average particle size of less than 0.15 $\mu$m, and particularly from 0.005 to 0.7 $\mu$m, and an acicular powder having an average major axis length of less than 0.6 $\mu$m, and particularly from 0.1 to 0.3 $\mu$m, and an acicular ratio (average major axis length/minor axis length) of from 4 to 50, and particularly from 5 to 30.

The inorganic powders to be used preferably include rutile titanium oxide, α-iron oxide, and goethite.

Layer (b) may further contain carbon black. Carbon black to be used usually has an average particle size of not more than 30 m$\mu$, and preferably from 5 to 28 m$\mu$, a DBP absorption of from 30 to 300 ml/100 g, and preferably from 50 to 250 ml/100 g, a BET specific surface area of from 150 to 400 m$^2$/g, and preferably from 170 to 300 m$^2$/g, a pH of from 2 to 10, a water content of from 0.1 to 10%, and a tapped density of from 0.1 to 1 g/cc.

Carbon black is preferably used in an amount of less than 50 parts by weight, and more preferably from 13 to 40 parts by weight, per 100 parts by weight of the above-described inorganic powder.

Carbon black functions to prevent static charge and to enhance film strength. It also serves for void volume control. Since a high void volume results in a relative decrease of powder volume ratio, carbon black is useful for controlling powder volume ratio of layer (a). In particular, carbon black particles having a structure or hollow carbon black particles are effective for this purpose. A void volume of layer (a) preferably falls within ±10% of that of layer (b) and preferably ranges from 10 to 30%.

The fifth feature of the present invention relates to durability. Various indications for obtaining durability as desired are described below.

A Young's modulus of the magnetic recording medium is preferably from 300 to 2000 kg/mm$^2$, and more preferably from 400 to 1500 kg/mm$^2$ as measured with a tensile tester. With respect to layer (b), a Young's modulus is preferably from 400 to 5000 kg/mm$^2$, and more preferably from 500 to 4000 kg/mm$^2$; a yield stress is preferably from 3 to 20 kg/mm$^2$, and more preferably from 4 to 18 kg/mm$^2$; and a yield elongation in tension is preferably from 0.2 to 8%, and more preferably from 0.5 to 5%. These indications of durability are influenced by the ferromagnetic powder, binder, carbon black, inorganic powder, and support used.

A stiffness in flexure (loop stiffness) of the magnetic recording medium having a total thickness of more than 11.5 $\mu$M is preferably from 40 to 300 mg, that with the total thickness being 10.5±1 $\mu$m is preferably from 20 to 90 mg, and that with the total thickness being thinner than 9.5 $\mu$m is preferably from 10 to 70 mg. This indication of durability is chiefly influenced by the support.

An elongation of the magnetic recording medium at which cracking initiates is preferably not more than 20% as measured at 23° C. and 70% RH.

A Cl/Fe spectrum a of the surface of layer (b) is preferably from 0.3 to 0.6, and an N/Fe spectrum β of layer (b) is preferably from 0.03 to 0.12, both measured with an X-ray photoelectric spectrophotometer. These indications of durability are influenced by the ferromagnetic powder, inorganic powder, and binder used.

The magnetic layer preferably has a glass transition temperature Tg of from 40 to 120° C. (a maximum peak of loss elastic modulus in the measurement of dynamic viscoelasticity at 110 Hz), a storage elastic modulus E' (50° C.) of from 0.8×10$^{11}$ to 11×10$^{11}$ dyne/cm$^2$, and a loss elastic modulus E" (50° C.) of from 0.5×10$^{11}$ to 8×10$^{11}$ dyne/cm$^2$ as measured with a dynamic viscoelastometer. The loss tangent is preferably not more than 0.2. If the loss tangent is too high, tack troubles tend to develop. These properties are important indications of durability and are influenced by the binder, carbon black, and solvent used.

An adhesive strength between the non-magnetic support and layer (b) is preferably not less than 10 g as measured by 180° peel test on a 8 mm wide specimen at 23° C. and 70% RH.

A steel ball wear of the surface of layer (b) is preferably from 0.7×10$^{-7}$ to 5×10−7 mm$^3$ at 23° C. and 70% RH. This is chiefly concerned with a ferromagnetic powder and gives a direct indication of wear resistance (durability) of the magnetic layer surface.

When five electron micrographs (×50000) taken of the magnetic recording medium with SEM are observed with the naked eye, the number of abrasive grains appearing on the surface of the magnetic laeyr is preferably not less than 0.1 per $\mu$m$^2$. The number of abrasive grains present on the surface of the end of the upper magnetic layer is preferably not less than 5/$\mu$m$^2$. These indications of durability are influenced by the abrasive and binder used in the magnetic layer.

A residual solvent in the magnetic recording medium as measured by gas chromatography is preferably not more than 50 mg/M$^2$. A residual solvent in layer (b) is preferably not more than 20 mg/m$^2$, and more preferably not more than 10 mg/m$^2$. The residual solvent in layer (b) is preferably lower than that in layer (a).

A sol fraction (a ratio of THF solvent solids content to weight of layer (b)) of the magnetic recording medium is preferably not more than 15%. This indication of durability is influenced by the ferromagnetic powder and binder used.

When information is recorded on the magnetic recording medium at a short wavelength (1 MHz) and developed by magnetic development with Ferricolloid, the number of continuous black or white lines appearing in a 5 mm wide specimen is preferably not more than 5 as observed under a differential interference microscope (×10).

A coefficient of friction ($\mu$) of the magnetic recording medium is preferably from 0.15 to 0.4, and more preferably from 0.2 to 0.35, on its magnetic side and from 0.15 to 0.4, and more preferably from 0.2 to 0.35, on its back side.

A contact angle with water of the magnetic recording medium is preferably from 60° to 130°, and more preferably from 80° to 120°. A contact angle with methylene iodide is preferably from 10° to 90°, and more preferably from 20° to 70°. These contact angles are decided by the lubricant or dispersing agent used.

A surface free energy of each of the magnetic layer and the back layer is preferably from 10 to 100 dyne/cm.

A surface resistivity of each of the magnetic layer and the back layer is preferably not more than $1 \times 10^9$ $\Omega$/sq, and more preferably not more than $1 \times 10^8$ $\Omega$/sq.

In the following description, other materials which can be used in the present invention are described. Also, other general aspects of the present invention are described below, which are subject to further limitations set forth in the above descriptions of the preferred embodiments depending on which particular embodiment of the invention is practiced.

The non-magnetic inorganic powder which can be used in the present invention includes metals, metal oxides, metal carbonates, metal sulfates, metal nitrides, metal carbides, and metal sulfides. Specific examples of these inorganic compounds include $TiO_2$ (rutile or anatase), $TiO_x$, cerium oxide, tin oxide, tungsten oxide, ZnO, $ZrO_2$, $SiO_2$, $Cr_2O_3$, $\alpha$-alumina ($\alpha$ ratio: 90% or more), $\beta$-alumina, $\gamma$-alumina, $\alpha$-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide, either alone or in combination of two or more thereof. These inorganic powders are not limited in shape or size. If desired, different inorganic powders may be used in combination, or a single powder having a selected size distribution can be used to the same effect.

A particle size of the non-magnetic inorganic powder is preferably accordant with the particular embodiment selected. In general, particulate, spherical or polygonal particles have a particle size usually of from 0.01 to 0.7 $\mu$m and preferably not more than ¼ the shortest recording wavelength $\lambda$. Acicular particles have a major axis length usually of from 0.05 to 1.0 $\mu$m, and preferably of from 0.05 to 0.5 $\mu$m, with an acicular ratio usually of from 5 to 20, and preferably of from 5 to 15. Tabular particles have a plate diameter usually of from 0.05 to 1.0 $\mu$m, and preferably of from 0.05 to 0.5 $\mu$m, with an aspect ratio (plate diameter/thickness ratio) usually of from 5 to 20, and preferably of from 10 to 20.

The inorganic powders have a tapped density usually of from 0.05 to 2 g/cc, and preferably of from 0.2 to 1.5 g/cc; a water content usually of from 0.1 to 5%, and preferably of from 0.2 to 3%; a pH usually of from 2 to 11, and preferably of from 4 to 10; a specific surface area usually of from 1 to 100 m$^2$/g, preferably of from 5 to 70 m$^2$/g, and more preferably of from 7 to 50 m$^2$/g; a crystallite size of from 0.01 to 2 $\mu$m; a DBP absorption usually of from 5 to 100 ml/100 g, preferably of from 10 to 80 ml/100 g, and more preferably of from 20 to 60 ml/100 g; a specific gravity usually of from 1 to 12, and preferably of from 3 to 6; a stearic acid (SA) adsorption usually of from 1 to 20 $\mu$mol/m$^2$, and preferably of from 2 to 15 $\mu$mol/m$^2$; and a surface roughness factor usually of from 0.8 to 1.5. A heat of wetting in water (25° C.) is preferably from 200 to 600 erg/cm$^2$. Solvents in which the inorganic powder generates a heat of wetting within this range can be used. The number of water molecules present on the surface of the inorganic powder at 100° to 400° C. is suitably from 1 to 10/100 Å. An isoelectric point of the inorganic powder in water is preferably between pH 3 and pH 9.

The inorganic powder does not need to be 100% by weight pure and, if desired, may be surface-treated with other compounds, e.g., compounds of Al, Si, Ti, Zr, Sn, Sb, Zn, etc., to form thereon a coat of an oxide of such element according to the purpose sought. In this case, a purity of 70% by weight would be enough. An ignition loss of the inorganic powder is preferably not more than 20% by weight.

Specific examples of these inorganic powders include UA 5600 and US 5605 (both produced by Showa Denko K.K.); AKP-20, AKP-30, AKP-50, HIT-50, HIT-100, and ZA-G1 (all produced by Sumitomo Chemical Co., Ltd.); G5, G7, and S-1 (all produced by Nippon Chemical Industrial Co., Ltd.; TF-100, TF-120, TF-140, R 516 (all produced by Toda Kogyo K.K.); TTO-51B, TTO-55A, TTO-55B, TTO-55C, TTO-55S, TTO-55D, FT-1000, FT-2000, FTL-100, FTL-200, M-1, S-1, SN-100, R-820, R-830, R-930, R-550, CR-50, CR-80, R-680, and TY-50 (all produced by Ishihara Sangyo Kaisha, Ltd.); ECT-52, STT-4D, STT-30D, STT-30, and STT-65C (all produced by Titan Kogyo K.K.); T-1 (produced by Mitsubishi Material Corp.); NS-O, NS-3Y, and NS-8Y (all produced by Nippon Shokubai Kagaku Kogyo Co., Ltd.); MT-100S, MT-100T, MT-150W, MT-500B, MT-600B, and MT-100E (all produced by Teika K.K.); FINEX-25, BF-1, BF-10, BF-20, BF-1L, and BF-10P (all produced by Sakai Kagaku K.K.); DEFIC-Y and DEFIC-R (both produced by Dowa Kogyo K.K.); and Y-LOP and calcined product thereof (produced by Titan Kogyo K.K.).

Of these non-magnetic inorganic powder particularly preferred for use in the present invention is titanium oxide, and especially titanium dioxide. Process for producing titanium oxide is described below in detail. Preparation of titanium oxide chiefly includes a sulfuric acid process and a chlorine process. According to the former process, a raw ore of ilmenite is distilled in sulfuric acid to extract Ti, Fe, etc. in the form of a sulfate, and iron sulfate is removed by crystallization. After purifying the residual titanium sulfate solution by filtration, hydrolysis is conducted under heating to precipitate hydrous titanium oxide, which is then filtered and washed to remove impurities. A particle size regulator, etc. is added thereto, followed by calcination at 80 to 1000° C. to obtain crude titanium oxide. The structure type, rutile or anatase, is decided by the kind of a nucleating agent added on hydrolysis. The resulting crude titanium oxide is subjected to finishing treatments, such as pulverization, classification, surface treatment, and so on. The chlorine process is applied to a naturally-occurring rutile type ore or synthetic rutile. An ore is chlorinated in a reduced state at a high temperature, whereby Ti is converted to $TiCl_4$, and Fe to $FeCl_2$. After cooling, solidified iron oxide is separated from liquid $TiCl_4$. The resulting crude $TiCl_4$ is purified by rectification and, after addition of a nucleating agent, brought into an instantaneous reaction with oxygen at 1000° C. or higher to obtain crude titanium oxide, which is then subjected to the same finishing treatments as described above for imparting pigment properties.

In the present invention, layer (a) may further contain carbon black to decrease surface resistivity $R_s$ as commonly expected. Carbon black which can be used in the present invention includes furnace black for rubbers, thermal black for rubbers, color black, and acetylene black. Carbon black to be used preferably has a specific surface area usually of from 100 to 500 $m^2/g$, and preferably of from 150 to 400 $m^2/g$; a DBP absorption usually of from 20 to 400 ml/100 g, and preferably of from 30 to 200 ml/100 g; an average particle size of from 5 to 80 mµ, preferably from 10 to 50 mµ, and more preferably from 10 to 40 µm; a pH of from 2 to 10; a water content of from 0.1 to 10%; and a tapped density of from 0.1 to 1 g/cc.

Specific examples of commercially available carbon black which can be used in the present invention are BLACKPEARLS 2000, 1300, 1000, 900, 800, 880 and 700 and VULCAN XC-72 (all produced by Cabot Corp.); #3050, #3150, #3250, #3750, #3950, #2400B, #2300, #1000, #970, #950, #900, #850, #650, #40, MA 40, and MA-600 (all produced by Mitsubishi Chemical Industries, Ltd.); CONDUCTEX SC (produced by Columbian Co., Ltd.); 8800, 8000, 7000, 5750, 5250, 3500, 2100, 2000, 1800, 1500, 1255, and 1250 (all produced by Raven); and Ketjenblack EC (produced by Akizo Chemie Nederland B.V.). Carbon black having been surface treated with a dispersing agent, for example, resin-grated carbon black, or carbon black having its surface partly graphitized may be employed. Carbon black may previously be dispersed in a binder before it is added to a non-magnetic coating composition. The above-described carbon black species may be used either individually or in combination thereof.

In choosing a carbon black species for use in the present invention, reference can be made to, for example, Carbon Black Kyokai (ed.) *Carbon Black Binran*.

The non-magnetic organic powder which can be used in the present invention includes acryl-styrene resin powders, benzoguanamine resin powders, melamine resin powders, phthalocyanine pigments, polyolefin resin powders, polyester resin powders, polyamide resin powders, polyimide resin powders, and polyfluoroethylene resin powders. These resin powders can be prepared by, for example, the processes described in JP-A-62-18564 and JP-A-60-255827.

These non-magnetic powders are usually used at a weight ratio to binder of from 20 to 0.1 and a volume ratio to binder of from 10 to 0.1.

In general magnetic recording media, it is common to form a subbing layer on a support. However, such a subbing layer, as having a thickness of not more than 0.5 µm and being provided for the purpose of improving adhesive strength between a support and a magnetic layer, etc., entirely different from the lower non-magnetic layer according to the present invention. It is, as a matter of course, recommended to form a subbing layer for improving adhesion between a support and the lower layer.

Ferromagnetic powders which can be used in the upper magnetic layer include γ-$FeO_x$ (x=1.33 to 1.5), Co-doped γ-$FeO_x$ (x=1.33 to 1.5), ferromagnetic alloy fine powders comprising Fe, Ni or Co as a main component (75 atom % or more), barium ferrite, and strontium ferrite. These ferromagnetic powders may optionally contain Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, for example, in addition to the prescribed elements. The ferromagnetic powder may previously be treated with a dispersing agent, a lubricant, a surface active agent, an antistatic agent, and the like, as hereinafter described. Specific examples of suitable ferromagnetic powders are described, e.g., in JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-48-39639, and U.S. Pat. Nos. 3,026,215, 3,031,341, 3,100,194, 3,242,005, and 3,389,014.

Of the above-mentioned ferromagnetic powders, ferromagnetic alloy powders may contain a small amount of a hydroxide or an oxide. The ferromagnetic alloy fine powders can be prepared by known processes, such as a process comprising reduction with a reducing gas, e.g., hydrogen in the presence of a complex organic acid salt (mainly an oxalate), a process comprising reducing iron oxide with a reducing gas, e.g., hydrogen to obtain Fe or Fe-Co particles, a process comprising pyrolysis of a metal carbonyl compound, a process comprising adding to an aqueous solution of a ferromagnetic metal a reducing agent, e.g., sodium borohydride, a hypophosphite, or hydrazine to conduct reduction, and a process comprising evaporating a metal in a low pressure inert gas to obtain a fine powder. The thus obtained ferromagnetic alloy powder may further be subjected to a conventional slow oxidation treatment by, for example, a process comprising dipping in an organic solvent followed by drying; a process comprising dipping in an organic solvent, blowing an oxygen-containing gas to form an oxidized film on the surface of the powder, followed by drying; or a process comprising forming an oxidized film on the powder surface using a mixed gas of oxygen and an inert gas at a controlled mixing ratio in the absence of an organic solvent.

The ferromagnetic powder in the upper magnetic layer has a BET specific surface area of from 25 to 80 $m^2/g$, and preferably from 35 to 60 $m^2/g$. If the specific surface area is less than 25 $m^2/g$, noise tends to be increased. If it exceeds 80 $m^2/g$, satisfactory surface properties may not be obtained. The ferromagnetic powder generally has a crystallite size of from 100 to 450 Å, and preferably from 100 to 350 Å. Saturation magnetization $\sigma_s$ of an iron oxide magnetic powder is 50 emu/g or more, and preferably 70 emu/g or more, and that of the ferromagnetic metal fine powder is preferably 100 emu/g or more, more preferably from 110 to 170 emu/g. The ferromagnetic powder preferably has a coercive force of 1100 to 2500 Oe and more preferably 1400 to 2000 Oe, and an acicular ratio of 18 or less and more preferably 12 or less.

Percent residual magnetism $r_{1500}$ of the ferromagnetic powder, which is observed when a magnetic recording medium is magnetized to saturation and then a magnetic field of 1500 Oe is applied to the opposite direction, is preferably not more than 1.5%, and more preferably not more than 1.0%.

The ferromagnetic powder preferably has a water content of from 0.01 to 2% by weight. However, the water content of the ferromagnetic powder is preferably optimized according to the kind of a binder to be used. γ-Iron oxide preferably has a tapped density of 0.5 g/cc or more, and more preferably 0.8 g/cc or more. In the case of alloy powder, the tapped density is preferably 0.2 to 0.8 g/cc. If it is more than 0.8 g/cc the alloy powder is liable to be oxidized during preparation of magnetic coatings, resulting in insufficient saturation magnetization ($\sigma_s$), and if it less than 0.2 g/cc, dispersibility of the powder may be deteriorated.

In using γ-iron oxide, a ratio of divalent iron to trivalent iron preferably ranges from 0 to 20 atom %, and more preferably from 5 to 10 atom %. A ratio of a cobalt atom to an iron atom is preferably from 0 to 15 atom %, and more preferably from 2 to 8 atom %.

It is preferable to optimize the pH of the ferromagnetic powder by combination with a binder to be used. The pH range of the ferromagnetic powder is from 4 to 12, and preferably from 6 to 10. If desired, the ferromagnetic powder may be subjected to a surface treatment with from 0.1 to 10% by weight of Al, Si, or P, or an oxide thereof based on the ferromagnetic powder. Such a surface treatment reduces an adsorption of a lubricant, e.g., fatty acids, to 100 mg/m$^2$ or less. Existence of soluble inorganic ions, e.g., Na, Ca, Fe, Ni, and Sr, observed in some ferromagnetic powders cause no adverse influence to characteristics as long as their concentration is below 500 ppm.

The void of the ferromagnetic powder is preferably as low as possible, preferably not more than 20% by volume, and more preferably not more than 5% by volume. The shape of the ferromagnetic powder is not limited as long as the above-defined requirements with respect to particle size are satisfied and may be an acicular form, a particulate form, a grain form, or a tabular form. In order to control SFD of the ferromagnetic powder to 0.6 or smaller, it is necessary to narrow the Hc distribution of the powder. This can be achieved by, for example, optimization of particle size distribution of goethite, prevention of sintering of γ-hematite, and making cobalt deposition slower than conventionally employed in the preparation of Co-doped iron oxide. With respect to SFD, reference can be made to C. Denis Mee and Eric D. Daniel, *Magnetic recording*, pub. by MvGraw-Hill, Inc. (1987).

In addition, tabular hexagonal ferromagnetic powders having an axis of easy magnetization in the direction perpendicular to the plate can also be used in the present invention. Examples of tabular hexagonal ferromagnetic powders include barium ferrite, strontium ferrite, lead ferrite, calcium ferrite, cobalt ferrite, and hexagonal Co powder. More specifically, the hexagonal tabular ferrite includes barium ferrite and strontium ferrite of magnetoplumbite type and barium ferrite or strontium ferrite of magnetoplumbite type locally containing a spinel phase. Particularly preferred are barium ferrite and strontium ferrite. In order to control coercive force, the above-mentioned hexagonal ferrite having added thereto Co—Ti, Co—Ti—Zr, Co—Ti—Zn, Ni—Ti—Zn, Ir—Zn, etc. can be used.

In addition, tabular hexagonal ferrites, e.g., barium ferrite and strontium ferrite, and hexagonal Co powder can also be used as a ferromagnetic powder. Barium ferrite to be used has a particle diameter of from 0.001 to 1 μm, a thickness/diameter ratio of from ½ to ¹/₂₀, a specific gravity of from 4 to 6 g/cc, and a specific surface area of from 1 to 60 m$^2$/g.

Carbon black which can be used in the upper magnetic layer, in particular, includes furnace black for rubbers, thermal black for rubbers, color black, and acetylene black. Carbon black to be used preferably has a specific surface area of from 5 to 500 m$^2$/g, a DBP oil absorption of from 10 to 400 ml/100 g, a particle size of from 5 to 300 mμ, a pH of from 2 to 10, a water content of from 0.1 to 10% by weight, and a tapped density of from 0.1 to 1 g/cc. Specific examples of commercially available carbon black which can be used in the present invention are BLACKPEARLS 2000, 1300, 1000, 900, 800, and 700 and VULCAN XC-72 (all produced by Cabot Corp.); #80, #60, #55, #50, and #35 (all produced by Asahi Carbon); #2400B, #2300, #900, #1000, #30, #40, and #10 (all produced by Mitsubishi Chemical Corporation); CONDUCTEX SC and RAVEN 150, 50, 40, and 15 (all produced by Columbian Carbon Co., Ltd. ). Carbon black having been surface treated with a dispersing agent, for example, resin-grafted carbon black, or carbon black having its surface partly graphitized may be employed. Carbon black may previously be dispersed in a binder before it is added to a non-magnetic coating composition. The above-described carbon black species may be used either individually or in combination thereof. Carbon black, if used, is preferably added in an amount of from 0.1 to 30% by weight based on the ferromagnetic powder in the layer.

Carbon black functions to prevent static charge, to reduce coefficient of friction, to screen light, and to improve film strength. These performances of carbon black vary depending on the particular species selected. Accordingly, the kind, amount or combination of carbon black species to be used in the lower non-magnetic layer and the upper magnetic layer can be selected appropriately depending on the purpose sought while taking into consideration the above-mentioned various characteristics, e.g., particle size, oil absorption, conductivity, and pH. For example, as noted above, carbon black having high conductivity may be used in the lower non-magnetic layer for static charge prevention, and carbon black of large size may be used in the upper magnetic layer for reduction of coefficient of friction. In choosing carbon black for use in the present invention, Carbon Black Kyokai (ed.), *Carbon Black Binran* can be referred to.

Abrasives which are usually used in the upper magnetic layer, in particular, include known materials usually having a Mohs hardness of 6 or more, e.g., α-alumina (α ratio: 90% or more), β-alumina, silicon carbide, chromium oxide, cerium oxide, α-iron oxide, corundum, artificial diamond, silicon nitride, silicon carbide, titanium carbide, titanium oxide, silicon dioxide, boron nitride, and the like, either alone or in a combination of two or more thereof. A complex of these abrasives (an abrasive having been surface-treated with another different abrasive) may be employed. These abrasives may contain elements other than the main constituent elements in a proportion of up to 10% by weight. The abrasive preferably has a particle size of from 0.01 to 2 μm. If desired, a plurality of abrasives different in particle size may be used in combination, or a single kind of an abrasive having a broad size distribution can be used to the same effect. The abrasive preferably has a tapped density of from 0.3 to 2 g/cc, a water content of from 0.1 to 5% by weight, a pH of from 2 to 11, and a specific surface area of from 1 to 30 m$^2$/g. The shape of the abrasive may be any of an acicular shape, a spherical shape, and a cubic shape. An abrasive partly having an angular shape is preferred in view of abrasive performance.

Specific examples of usable abrasives are AKP-20, KP-30, AKP-50, and HIT-50 (all produced by Sumitomo Chemical Co., Ltd.); G5, G7, and S-1 (all produced by Nippon Chemical Industrial Co., Ltd.); and 100Ed and 140Ed (both produced by Toda Kogyo K.K.).

The abrasive may previously be dispersed in a binder and then added to a magnetic coating composition. The amount of the abrasive in the upper magnetic layer preferably ranges from 5 or more particles per 100 μm$^2$.

Binders which can be used in the lower non-magnetic layer and the upper magnetic layer of the present invention include conventionally known thermoplastic resins, thermosetting resins and reactive resins, and mixtures thereof. The thermoplastic resins to be used have a glass transition temperature of from −100° to 150° C., a number average molecular weight of from 1000 to 200,000, and preferably from 10,000 to 100,000, and a degree of polymerization of from about 50 to 1000. Examples of such thermoplastic resins include polymers and copolymers comprising vinyl chloride, vinyl acetate, vinyl alcohol, maleic acid, acrylic acid, an acrylic ester, vinylidene chloride, acrylonitrile, methacrylic acid, a methacrylic ester, styrene, butadiene, ethylene, vinyl butyral, vinyl acetal, a vinyl ether, and the like; polyurethane resins, and various rubbery resins. The thermosetting resins and reactive resins include phenol resins, epoxy resins, polyurethane curing resins, urea resins, melamine resins, alkyd resins, acrylic reactive resins, formaldehyde resins, silicone resins, epoxy-polyamide resins, a mixture of a polyester resin and an isocyanate prepolymer, a mixture of a polyester polyol and a polyisocyanate, and a mixture of a polyurethane and a polyisocyanate.

For the details of these binder resins, *Plastic Handbook* published by Asakura Shoten can be referred to. A known electron-curable resin may be used in the magnetic and non-magnetic layers. With respect to specific examples of the electron-curable resin and the processes for producing them, reference can be made to JP-A-62-256219. The above-mentioned binder resins can be used either individually or in a combination thereof. A preferred combined binder system comprises a polyurethane resin, at least one of a vinyl chloride resin, a vinyl chloride-vinyl acetate resin, a vinyl chloride-vinyl acetate-vinyl alcohol resin, and a vinyl chloride-vinyl acetate-maleic anhydride resin and, if desired, a polyisocyanate.

The polyurethane resin may have a conventional structure and includes polyester polyurethane, polyether polyurethane, polyether polyester polyurethane, polycarbonate polyurethane, polyester polycarbonate polyurethane, and polycaprolactone polyurethane.

If desired, all the above-mentioned binders may have bonded thereto one or more polar groups, e.g., $SO_3M^1$, $COOM^1$, $OSO_3M^1$, $P=O(OM^2)(OM^3)$, $-OP=O(OM^2)(M^3)$, $-NR_4X$ (wherein $M^1$, $M^2$ and $M^3$ each represents a hydrogen atom, Li, Na, K, $-NR_4$ or $-NHR_3$; R represents a hydrogen atom or an alkyl group; and X represents a halogen atom), OH, $NR_2$, $N^+R_3$ (wherein R represents a hydrocarbon group), an epoxy group, SH, and CN, by copolymerization or addition reaction to thereby improve dispersibility and durability. Such a polar group is incorporated in an amount of from $10^{-1}$ to $10^{-8}$ mol/g, and preferably from $10^{-2}$ to $10^{-6}$ mol/g.

The vinyl chloride copolymers preferably include epoxy-containing vinyl chloride copolymers, such as those comprising a vinyl chloride repeating unit, an epoxy-containing repeating unit and, if desired, a repeating unit containing a polar group, e.g., $-SO_3M$, $-OSO_3M$, $-COOM$, and $-PO(OM)_2$, wherein M is a hydrogen atom or an alkali metal. Epoxy-containing vinyl chloride copolymers comprising an epoxy-containing repeating unit and a repeating unit containing $-SO_3Na$ are preferred.

The repeating unit containing a polar group is present in the copolymer in a proportion usually of from 0.01 to 5.0 mol %, and preferably of from 0.5 to 3.0 mol %. The epoxy-containing repeating unit is present in an amount usually of from 1.0 to 30 mol %, and preferably of from 1 to 20 mol %, based on the copolymer or in an amount usually of from 0.01 to 0.5 mol, and preferably of from 0.01 to 0.3 mol, per mol of the vinyl chloride repeating unit.

If the epoxy-containing repeating unit content is lower than 1 mol % based on the copolymer or lower than 0.01 mol per mol of the vinyl chloride repeating unit, there is a tendency that release of hydrogen chloride from the vinyl chloride copolymer cannot be prevented effectively. If the repeating unit content is more than 30 mol % based on the copolymer, or more than 0.5 mol per more of the vinyl chloride repeating unit, hardness of the copolymer is insufficient, and use of such a vinyl chloride resin sometimes causes reduction in running durability.

If the content of the repeating unit containing the specific polar group is less than 0.01 mol %, dispersibility of the ferromagnetic powder tends to be insufficient. If it exceeds 5.0 mol %, the copolymer tends to show hygroscopicity, resulting in reduction in weather resistance.

The above-describe vinyl chloride copolymer usually has a number average particle size of from 15,000 to 60,000.

The vinyl chloride copolymer containing an epoxy group and a specific polar group, e.g.,, $-SO_3Na$, can be prepared by mixing a monomer having a reactive double bond and epoxy group with a monomer having a reactive double bond and a polar group, e.g., $-SO_3Na$, at a low temperature and polymerizing the mixture in the presence of vinyl chloride under pressure at a temperature of 100° C. or lower.

Examples of the monomer having a reactive double bond and an epoxy group usually include glycidyl (meth)acrylate.

Examples of the monomer having a reactive double bond and a polar group include 2-(meth)acrylamide-2-methylpropanesulfonic acid or a sodium salt thereof, vinylsulfonic acid and its sodium or potassium salt, (meth)acrylic acid-2-ethyl sulfonate and a sodium or potassium salt thereof, maleic acid, maleic anhydride, (meth)acrylic acid, and (meth)acrylic acid-2-phosphate.

The epoxy-containing vinyl chloride copolymer may also be prepared by utilizing a method for introducing a polar group into a polymer, in which a polyhydric vinyl chloride copolymer is prepared from, for example, vinyl chloride and vinyl alcohol, and the resulting copolymer is reacted with a compound having a polar group and a chlorine atom (dehydrochlorination reaction).

Examples of the compound having a polar group and a chlorine atom include $ClCH_2CH_2SO_3M$, $ClCH_2CH_2OSO_3M$, $ClCH_2COOM$, and $ClCH_2PO(OM)_2$, wherein M is as defined above In this case, epichlorohydrin is usually used for introduction of an epoxy group.

The vinyl chloride copolymer may further contain other monomers, such as vinyl ethers (e.g., methyl vinyl ether, isobutyl vinyl ether, lauryl vinyl ether), α-monoolefins (e.g., ethylene, propylene), (meth)acrylic esters having a functional group (e.g., methyl (meth)acrylate, hydroxyethyl (meth)acrylate), unsaturated nitrites (e.g., (meth) acrylonitrile), aromatic vinyl compounds (e.g., styrene, α-methylstyrene), and vinyl esters (e.g., vinyl acetate, vinyl propionate)

Specific examples of commercially available binder resins which can be used in the present invention are VAGH, VYHH, VMCH, VAGF, VAGD, VROH, VYES, VYNC, VMCC, XYHL, XYSG, PKHH, PKHJ, PKHC, and PKFE (all produced by Union Carbide Co., Ltd.); MPR-TA, MPR-TA5, MPR-TAL, MPR-TSN, MPR-TMF, MPR-TS, and MPR-TM (all produced by Nisshin Chemical Industry Co., Ltd.); 1000W, DX80, DX81, DX82, and DX83 (all produced by Denki Kagaku Co., Ltd.); MR110, MR100, and 400X110A (all produced by Nippon Zeon Co., Ltd.); Nippollan N2301, N2302, and N2304 (all produced by Nippon Polyurethane Co., Ltd.); Pandex T-5105, T-R3080, and T-5201, Varnok D-400 and D-210-80, and Crysvon 6109 and 7209 (all produced by Dainippon Ink Co., Ltd.); Vylon UR8200, UR8300, RV530, and RV280 (all produced by Toyobo Co., Ltd.); Daipheramine 4020, 5020, 5100, 5300, 9020, 9022, and 7020 (all produced by Dainichi Seika Co., Ltd.); MX5004 (produced by Mitsubishi Chemical Corporation); Sunprene SP-150 (produced by Sanyo Kasei Co., Ltd.); and Salan F310 and F210 (both produced by Asahi Kasei Kogyo Kabushiki Kaisha).

The binder is used in the upper magnetic layer in an amount of from 5 to 50% by weight, and preferably from 10 to 30% by weight, based on the ferromagnetic powder. It is preferable to use a combination of 5 to 30% by weight of a vinyl chloride resin, 2 to 20% by weight of a polyurethane resin, and 2 to 20% by weight of a polyisocyanate, based on the ferromagnetic powder.

The binder is used in the lower non-magnetic layer in a total amount of from 5 to 50% by weight, and preferably from 10 to 35% by weight, based on the non-magnetic powder. It is preferable to use a combination of 3 to 30% by weight of a vinyl chloride resin, 3 to 30% by weight of a polyurethane resin, and 0 to 20% by weight of a polyisocyanate compound, each based on the non-magnetic powder.

Where an epoxy-containing resin having a molecular weight of more than 30,000 is used in an amount of from 3 to 30% by weight based on the non-magnetic powder, resins other than the epoxy-containing resin can be used in an amount of from 3 to 30% by weight based on the non-magnetic powder. A polyurethane resin can be used in an amount of from 3 to 30% by weight, and a polyisocyanate compound can be used in an amount of from 0 to 20% by weight, each based on the non-magnetic powder. The epoxy group content preferably ranges from $4 \times 10^{-6}$ to $16 \times 10^4$ eq/g based on the total weight of the binder (inclusive of a curing agent).

The polyurethane resin used as a binder preferably has a glass transition temperature of from $-50°$ to $100°$ C., an elongation at break of from 100 to 2000%, a breaking stress of from 0.05 to 10 kg/cm$^2$, and a yield point of from 0.05 to 10 kg/cm$^2$.

The amount of the binder, the proportion of a vinyl chloride resin, a polyurethane resin, a polyisocyanate or other resins in the total binder, the molecular weight of the binder, the polar group content of the binder, and various physical properties of the binder may be varied among the upper magnetic layer and the lower non-magnetic layer as needed.

The polyisocyanate which can be used in the present invention includes isocyanate compounds, e.g., tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate; a reaction product between such an isocyanate compound and a polyhydric alcohol; and a polyisocyanate compound obtained by condensation of an isocyanate compound. These isocyanate compounds are commercially available under trade names of Coronate L, Coronate HL, Coronate 2030, Coronate 2031, Millionate MR, and Millionate MTL (all produced by Nippon Polyurethane Co., Ltd.); Takenate D-102, Takenate D-110N, Takenate D-200, and Takenate D-202 (all produced by Takeda Chemical Industries, Ltd.); and Desmodule L, Desmodule IL, Desmodule N, and Desmodule HL (all produced by Sumitomo Bayer Co., Ltd.). These compounds are used in both the lower non-magnetic layer and the upper magnetic layer either individually or in a combination of two or more thereof, taking advantage of a difference in curing reactivity.

Other additives which can be used in the present invention include those having lubricating effects, antistatic effects, dispersing effects, and/or plasticizing effects. Examples of such additives are molybdenum disulfide, tungsten disulfide, graphite, boron nitride, graphite fluoride, silicone oil, silicone having a polar group, fatty acid-modified silicone, fluorine-containing silicone, fluorine-containing alcohols, fluorine-containing esters, polyolefins, polyglycols, alkylphosphoric esters and alkali metal salts thereof, alkylsulfuric esters and alkali metal salts thereof, polyphenyl ether, fluorine-containing alkylsulfuric esters and alkali metal salts thereof, monobasic fatty acids having from 10 to 24 carbon atoms (which may have an unsaturated bond or may be branched) and metal salts thereof (e.g., Li, Na, K, and Cu salts), mono-, di-, tri-, tetra-, penta- or hexahydric alcohols having from 12 to 22 carbon atoms (which may have an unsaturated bond or may be branched), alkoxy alcohols having from 12 to 22 carbon atoms, mono-, di- or tri-fatty acid esters of a monobasic fatty acid having from 10 to 24 carbon atoms (which may have an unsaturated bond or may be branched) and a mono- to hexahydric alcohol having from 2 to 12 carbon atoms (which may have an unsaturated bond or may be branched), fatty acid esters of a monoalkyl ether of an alkylene oxide polymer, fatty acid amides having from 8 to 22 carbon atoms, and aliphatic amines having from 8 to 22 carbon atoms. Specific examples of these fatty acid ester additives are lauric acid, myristic acid, palmitic acid, stearic acid, behenic acid, butyl stearate, oleic acid, linoleic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol.

Surface active agents which can also be used include nonionic surface active agents, such as alkylene oxides, glycerin derivatives, glycidol derivatives, and alkylphenol ethylene oxide adducts; cationic surface active agents, such as cyclic amines, ester amides, quaternary ammonium salts, hydantoin derivatives, heterocyclic compounds, and phosphonium or sulfonium compounds; anionic surface active agents containing an acid radical, such as carboxylic acids, sulfonic acids, phosphoric acids, sulfuric esters, and phosphoric esters; and amphoteric surface active agents, such as amino acids, aminosulfonic acids, sulfuric or phosphoric esters of aminoalcohols, and alkyl betaines. The details of these surface active agents are described in *Kaimen Kasseizai Binran* published by Sangyo Tosho K.K.

These lubricants, antistatic agents, surface active agents, and the like, do not need to be 100% by weight pure and may contain impurities, such as isomers, unreacted matters, by-products, decomposition products, and the like, in a proportion preferably below 30% by weight, and more preferably below 10% by weight.

The kind and amount of the additives, such as a lubricant and a surface active agent, are appropriately selected for each of the lower non-magnetic layer and the upper magnetic layer. For example, fatty acids are used with their melting points being varied between the two layers so as to inhibit bleeding; esters are used with their boiling points or polarity being varied between the two layers so as to inhibit bleeding; the amount of the surface active agent is adjusted to improve coating stability; and the amount of the lubricant in the lower non-magnetic layer is increased to improve lubricating effects.

All or part of the additives may be added in any stage of the preparation of the coating compositions. For example, the additives may be mixed with a ferromagnetic powder before kneading; be added during kneading of a ferromagnetic powder, a binder, and a solvent; be added during or after dispersing; or be added immediately before coating.

Typical examples of useful commercially available lubricants include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, hardened castor oil fatty acids, NAA-42, NAA-44, Cation SA, Cation MA, Cation AB, Cation BB, Nymeen L-210, Nymeen L-202, Nymeen S-202, Nonion E-208, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monoguri MB, Nonion DS-60, Anon BF, Anon LG, butyl stearate, butyl laurate, and erucic acid (all produced by Nippon Oils & Fats Co., Ltd.); oleic acid (produced by Kanto Kagaku K.K.); FAL-205 and FAL-123 (both produced by Takemoto Yushi K.K.); Enujerubu LO, Enujerubu IPM, and Sansosyzer E4030 (all produced by New Japan Chemical Co., Ltd.); TA-3, KF-96, KF-96L, KF-96H, KF 410, KF 420, KF 965, KF 54, KF 50, KF 56, KF-907, KF-851, X-22-819, X-22-822, KF-905, KF-700, KF-393, KF-857, KF-860, KF-865, X-22-980, KF-101, KF-102, KF-103, X-22-3710, X-22-3715, KF-910, and KF-3935 (all produced by Shin-Etsu Chemical Industry Co., Ltd.); Armide P, Armide C, and Armoslip CP (all produced by Lion Ahmer); Duomin TDO (produced by Lion Fat & Oil Co., Ltd.); BA-41G (produced by Nisshin Seiyu K.K.); Profan 2012E, Newpole PE 61, Ionet MS-400, Ionet MO-200, Ionet DL-200, Ionet DS-300, Ionet DS-1000, and Ionet DO-200 (all produced by Sanyo Chemical Industries Co., Ltd.).

Organic solvents which can be used in the present invention include ketones, e.g., acetone, methyl ethyl ketone, methyl isobutyl ketone, diisobutyl ketone, cyclohexanone, isophorone, and tetrahydrofuran; alcohols, e.g., methanol, ethanol, propanol, butanol, isobutyl alcohol, isopropyl alcohol, and methylcyclohexanol; esters, e.g., methyl acetate, butyl acetate, isobutyl acetate, isopropyl acetate, ethyl lactate, and glycol acetate; glycol ethers, e.g., glycol dimethyl ether, glycol monoethyl ether, and dioxane; aromatic hydrocarbons, e.g., benzene, toluene, xylene, cresol, and chlorobenzene; chlorinated hydrocarbons, e.g., methylene chloride, ethylene chloride, carbon tetrachloride, chloroform, ethylene chlorohydrin, and dichlorobenzene; N,N-dimethylformamide, and hexane; either individually or in combinations thereof at an arbitrary mixing ratio. These organic solvents do not need to be 100% by weight pure and may contain impurities, such as isomers, unreacted matters, by-products, decomposition products, oxides, water content, etc. in a proportion preferably below 30% by weight, and more preferably below 10% by weight. If desired, the kind and amount of the organic solvents to be used may be varied between the upper and lower layers according to the purpose sought. For example, a highly volatile solvent may be used in the lower non-magnetic layer to improve surface properties; a solvent having high surface tension (e.g., cyclohexanone and dioxane) may be used in the upper magnetic layer to improve coating stability; or a solvent having a high solubility parameter may be used in the upper magnetic layer to improve packing.

The non-magnetic support has a thickness of from 1 to 100 µm, and preferably from 4 to 80 µm. The lower non-magnetic layer has a thickness of from 0.5 to 10 µm, and preferably from 1 to 5 µm. The upper magnetic layer has a thickness of not more than 1.0 µm, preferably from 0.05 to 1.0 µm, more preferably from 0.05 to 0.6 µm, and most preferably from 0.05 to 0.3 µm. The upper magnetic layer of the present invention may be constituted of two or more layers. In the case, the total thickness of the layers should not be more than 1.0 µm The total thickness of the upper magnetic layer and the lower non-magnetic layer is from 1/100 to 2 times the thickness of the non-magnetic support. For the purpose of improving adhesion between the non-magnetic support and the lower non-magnetic layer, there may be provided a subbing layer having a thickness of from 0.01 to 2 µm, and preferably from 0.05 to 0.5 µm. A back coat may be provided on the non-magnetic support on the side opposite to the magnetic layer to a thickness of from 0.1 to 2 µm, and preferably from 0.3 to 1.0 µM. The subbing layer and the back coat layer can be formulated from conventional compositions.

The non-magnetic support includes known films of polyesters, e.g., polyethylene terephthalate and polyethylene naphthalate, polyolefins, cellulose triacetate, polycarbonate, polyamide, polyimide, polyamide-imide, polysulfone, aramide, and aromatic polyamide. The support may be subjected to a pretreatment, such as corona discharge treatment, plasma treatment, treatment for easy adhesion, heat treatment, and dusting.

In order to accomplish the objects of the present invention, the non-magnetic support should have a center-line average roughness (Ra) of not more than 0.03 µm, preferably not more than 0.02 µm, and more preferably not more than 0.01 µm. Besides having a small Ra, the non-magnetic support is preferably free from coarse projections of 1 µm or greater.

The surface roughness is arbitrarily controllable by adjusting the size and amount of fillers to be added. Fillers include an oxide or carbonate of Ca, Si, or Ti and organic fine powders, e.g., acrylic resin powders.

The non-magnetic support preferably has an F-5 value (a modulus of elasticity at 5% elongation) ranging from 5 to 50 $kg/mm^2$ in its longitudinal direction (running direction) and from 3 to 30 $kg/mm^2$ in its width direction. The F-5 value in the longitudinal direction is generally higher than that in the width direction, but this does not apply when it is required to particularly increase the strength in the width direction.

A percent thermal shrinkage of the non-magnetic support in both longitudinal and width directions is preferably not more than 3%, and more preferably not more than 1.5%, at 100° C.×30 minutes and not more than 1%, and more preferably not more than 0.5%, at 80° C.×30 minutes. The non-magnetic support preferably has a breaking strength of from 5 to 100 $kg/mm^2$ in both longitudinal and width directions and a modulus of elasticity of from 100 to 2000 $kg/mm^2$.

A magnetic coating composition for the magnetic recording medium of the present invention is prepared by a process essentially comprising a kneading step and a dispersing step. A mixing step may be inserted before and/or after each of the kneading step and the dispersing step. Each step may be conducted in two or more separate stages. All the materials to be used in the present invention, e.g., a ferromagnetic powder, a binder, carbon black, an abrasive, an antistatic agent, a lubricant, and a solvent, may be added in the beginning of or during any step. Each material may be added in two or more separate portions. For example, a separate portion of polyurethane may be added to each of the kneading step, the dispersing step, and a mixing step for viscosity adjustment after dispersing.

While conventional techniques for producing magnetic recording media can be made use of in the present invention, it is preferable to use a kneading apparatus having a high kneading force, such as a continuous kneader and a pressure kneader, in the kneading step for obtaining a high Br. In using a continuous kneader or a pressure kneader, a ferromagnetic powder, a part (preferably at least 30%) or the whole amount of a binder, and 15 to 500 parts by weight of a solvent per 100 parts by weight of the ferromagnetic powder are kneaded. For the details of the kneading step, reference can be made in JP-A-1-106338 and JP-A-64-79274.

The magnetic recording medium according to the present invention can be produced with higher efficiency by utilizing a simultaneous coating system as disclosed in JP-A-62-212933. In particular, the following coating systems are recommended.

1. Layer (a) (lower non-magnetic layer) is coated with a coating device generally employed for magnetic coatings, e.g., a gravure coater, a roll coater, a blade coater, and an extrusion coater. While the thus coated layer is wet, layer (b) (upper magnetic layer) is coated thereon by means of an extrusion coater disclosed in JP-B-1-46186, JP-A-60-238179, and JP-A-2-265672.
2. Layers (a) and (b) are coated substantially simultaneously by means of a single coating head having two slits as disclosed in JP-A-63-88080, JP-A-2-17921, and JP-A-2-265672.
3. Layers (a) and (b) are coated substantially simultaneously by means of an extrusion coater equipped with a back-up roll as disclosed in JP-A-2-174965.

In order to prevent agglomeration of the ferromagnetic powder which leads to reductions in electromagnetic characteristics, it is recommended to add a shear to the coating composition inside the coating head.

In the present invention, the coating compositions for layers (a) and (b) are coated on a non-magnetic support according to a wet-on-wet coating system in which coating of one layer is immediately followed by coating of another layer while the first layer is in a wet state (successive coating) or a plurality of layers are simultaneously coated by extrusion coating (simultaneous coating). For the details of the wet-on-wet coating system, JP-A-61-139929 can be referred to. The "wet state" is the state that a coated composition is odhered to hands at a touch and it may be the state that the coated composition contains more than 10% that of a solvent added in the coating composition before coating.

An example of the above-described successive coating system is illustrated in FIG. 2. Running flexible support 1 made of, e.g., polyethylene terephthalate is pre-coated with coating composition 2 by means of coating apparatus 3. Immediately thereafter, the coated surface is smoothed by means of smoothing roll 4. While the precoat is wet, coating composition 5 is coated thereon by means of extrusion coater 6.

An example of the above-described simultaneous extrusion coating system is illustrated in FIG. 3. Coating compositions 2, 5 for layers (a) and (b), respectively, are simultaneously coated on flexible support 1 by means of extrusion coater 8.

After layers (a) and (b) are coated, the layers are subjected to magnetic orientation, drying, and smoothing to obtain a magnetic recording medium.

Powerful magnetic orientation is required for the production of the magnetic recording medium of the present invention. A combination of a solenoid of 1000 G or higher and cobalt magnet of 2000 G or higher is preferably used for magnetic field application. It is preferable to conduct moderate drying before magnetic orientation so that the orientation after drying can be optimized.

For calendering, heat-resistant plastic rolls made of, e.g., epoxy resins, polyimide, polyamide, or polyimide-amide, are employed. Smoothing may also be carried out by using metallic rolls. The calendering temperature is preferably 70° C. or higher, and more preferably 80° C. or higher. The linear pressure is preferably 200 kg/cm or more, and more preferably 300 kg/cm or more, and the linear velocity ranges from 20 to 700 m/min. After the calendering treatment is carried out, the magnetic recording medium may be subjected to a heat treatment at a temperature of 40 to 80° C. to accelerate curing of the magnetic layer, the non-magnetic layer and a back layer if any.

A coefficient of fraction of both sides of the magnetic recording medium of the present invention against a pole of SUS 420J is preferably not more than 0.5, and more preferably not more than 0.3. A surface resistivity of layer (b) preferably ranges from $10^4$ to $10^{11}$ Ω/sq. A surface resistivity of layer (a), if coated alone, preferably ranges from $10^4$ to $10^8$ Ω/sq. A back layer preferably has a surface resistance of from $10^3$ to $10^9$.

Both layers (a) and (b) preferably has a void of not more than 30% by volume, and more preferably not more than 20% by volume. The smaller the void, the better for achieving high output. For some purposes, however, it is better to control the void above a certain value. For instance, to have a large void is often favorable for running durability in the case of magnetic recording media for data recording which are required to withstand repeated use. It is easy for one skilled in the art to control the void within a preferred range for the particular purpose.

Layer (b) preferably has a modulus of elasticity at 0.5% elongation of from 100 to 2000 kg/mm$^2$ in both longitudinal and width directions and a breaking strength of from 1 to 30 kg/cm$^2$. The magnetic recording medium preferably has a modulus of elasticity of from 100 to 1500 kg/mm$^2$ in both longitudinal and width directions, a residual elongation of not more than 0.5%, and a percent thermal shrinkage of not more than 1%, more preferably not more than 0.5%, and most preferably not more than 0.1%, at any temperature below 100° C.

The amount of a residual solvent in layer (b) is preferably not more than 100 mg/m$^2$, and more preferably not more than 10 mg/m$^2$. The residual solvent in layer (b) is preferably less than that in layer (a).

As magnetic characteristics, the magnetic recording medium of the present invention has a squareness ratio (Rs) in the running direction of not less than 0.70, preferably not less than 0.80, and more preferably not less than 0.90, as measured in a magnetic field of 5 KOe. An Rs in the two directions perpendicular to the running direction is preferably 80% or less that of the running direction. An SFD of the magnetic layer is preferably not more than 0.6.

As could be expected, layers (a) and (b) may have different physical properties according to purposes sought for each layer. For example, the modulus of elasticity of layer (b) may be increased to improve running durability and, at the same time, the modulus of elasticity of layer (a) is made lower than that of layer (b) to improve contact with a recording head.

While the magnetic recording medium according to the present invention basically comprises a non-magnetic support having thereon layer (a) and layer (b). If desired, layer (b) may be composed of two or more magnetic layers according to the layer structure of conventional multi-layered magnetic layer. For example, the uppermost magnetic layer may have a higher coercive force than the lower magnetic layer and contain a ferromagnetic powder having a smaller average major axis length or crystallite size. Also, layer (a) may be composed of two or more non-magnetic layers.

The present invention is now illustrated in greater detail with reference to Examples, but it should be understood that the present invention is not construed as being limited thereto. All the parts, percents, and ratios are given by weight unless otherwise specified.

EXAMPLE 1 AND COMPARATIVE EXAMPLE 1

| Coating Composition for Layer (a): | |
| --- | --- |
| Particle $TiO_2$ (average particle size: 0.09 μm) | 100 parts |
| Carbon black (average particle size: 20mμ) | 5 parts |
| Vinyl chloride copolymer (containing —$SO_3Na$ and epoxy group; molecular weight: 50000) | 8 parts |
| Polyurethane resin (containing —$SO_3Na$; molecular weight: 45000) | 5 parts |
| α-Alumina (average particle size: 0.2 μm) | 5 parts |
| Cyclohexanone | 150 parts |
| Methyl ethyl ketone | 50 parts |

The above components were mixed and dispersed in a sand mill for 4 hours, and 5 parts of polyisocyanate ("Coronate L" produced by Nippon Polyurethane Co., Ltd.), 1 part of stearic acid, and 1 part of butyl stearate were added thereto to prepare a coating composition for layer (a).

| Coating Composition for Layer (b): | | |
| --- | --- | --- |
| Ferromagnetic powder: Fe/Ni/Co alloy (93/3/3; others: Zn, Cr, etc.; Hc; 1600 Oe; saturation magnetization $\sigma_s$: 135 emu/g; major axis length: 0.18 μm; acicular ratio: 9) | 100 | parts |
| Vinyl chloride copolymer (containing —$SO_3Na$ and epoxy group) | 10 | parts |
| Polyurethane resin (containing —$SO_3Na$, molecular weight: 45000) | 5 | parts |
| α-Alumina (average particle size: 0.2 μm) | 5 | parts |
| Cyclohexanone | 150 | parts |
| Methyl ethyl ketone | 200 | parts |

The above components were mixed and dispersed in a sand mill for 6 hours. To the dispersion were added 5 parts of polyisocyanate (Coronate L), 5 parts of stearic acid, and 10 parts of butyl stearate to prepare a coating composition for layer (b).

A 9.8 μm thick polyethylene terephthalate film was coated with the above-prepared coating compositions for layers (a) and (b) to a dry thickness of 3.0 μm and 0.3 μm, respectively, by simultaneous wet-on-wet coating using two doctor blades set at different gaps. The magnetic powder was orientated with a permanent magnetic, and the coated layers were dried. On the opposite side of the support was provided a back layer containing carbon black. The both sides of the coated film were calendered. The resulting film was cut to a width of 3.81 mm to prepare digital audio tape (DAT). The resulting sample was designated 1-1.

Samples 1-2 to 1-9 and Comparative Samples 1'-1 to 1'-6 were prepared in the same manner as for Sample 1-1, except for making alterations according to Table 1 (alterations to layer (b)) and Table 2 (alterations to layer (a)) shown below.

An average dry thickness (d) of layer (b), a standard deviation (σ) of d, and an average thickness variation ($^\Delta$d) were determined according to the methods described above. The results obtained are shown in Tables 1 and 2.

Electrophotographic characteristics and coating defects (pinholes) of each of the resulting tape samples were evaluated according to the following test methods, and the results obtained are shown in Table 3 below. In carrying out the electrophotographic tests, a DAT deck "DTC-1000" produced by Sony Corporation was used.

Reproduction Output:

Signals of a single frequency 4.7 MHz were recorded, and the reproduced signals were put into a spectrum analyzer, "HP-3585A". The peak of the signals was read out.

C/N Ratio:

A noise spectrum was prepared at the measurement of reproduction output by means of a spectral analyzer "HP-3585A". A C/N ratio was obtained from a ratio of the reproduction output to the noise level apart from the central recording frequency (4.7 MHz) by 0.1 MHz.

Block Error Rate (BER):

A block error rate is a number of error flags per 10000 tracks.

$$BER = \frac{\text{Error Flag}}{10000 \times 128 \text{ Blocks}}$$

DAT has a signal processing system of coding analog signals into digital signals. One signal comprises 8 bits, and one block comprises 32 signals×8 pits=256 bits. Accordingly, one track is constituted by 128 blocks.

Signals of two tracks, i.e., 128×2 blocks, were put in memory and shuffled, and the errors were detected. A counter "HP5328A" produced by Hewlett Pockard Co. was connected to a standard personal computer.

Dropout:

Signals of a single frequency 4.7 MHz were input, and dropouts 0.5 μsec in length were counted with a dropout counter on a threshold level −10 dB.

Pinholes:

A magnetic layer of a sample before formation of a back layer was observed with transmitted white light with naked eye to count the number of pinholes per 100 $m^2$.

TABLE 1

| | Layer (b) Ferromagnetic Powder | | | | | | | | | |
| --- | --- | --- | --- | --- | --- | --- | --- | --- | --- | --- |
| Sample No. | d (μm) | d/λ | $^\Delta$d (μm) | $^\Delta$d/d | σ (μm) | Ra (nm) | λ/Ra | Kind | Major Axis Length (μm) | Diameter (μm) |
| 1-1 | 0.70 | 0.45 | 0.10 | 0.33 | 0.11 | 4.8 | 139.58 | Fe—Ni | 0.18 | |

TABLE 1-continued

Layer (b)
Ferromagnetic Powder

| Sample No. | d (μm) | d/λ | Δd (μm) | Δd/d | σ (μm) | Ra (nm) | λ/Ra | Kind | Major Axis Length (μm) | Diameter (μm) |
|---|---|---|---|---|---|---|---|---|---|---|
| 1-2 | 0.30 | 1.04 | 0.15 | 0.21 | 0.07 | 6.0 | 111.67 | Fe—Ni | 0.18 | |
| 1-3 | 1.00 | 1.49 | 0.18 | 0.15 | 0.08 | 5.5 | 121.82 | Fe—Ni | 0.18 | |
| 1-4 | 1.00 | 1.49 | 0.18 | 0.15 | 0.06 | 8.0 | 83.75 | Fe—Ni | 0.18 | |
| 1-5 | 0.65 | 0.97 | 0.25 | 0.38 | 0.04 | 7.0 | 95.71 | Fe—Ni | 0.18 | |
| 1-6 | 0.65 | 0.97 | 0.07 | 0.11 | 0.02 | 4.5 | 148.99 | Fe—Ni | 0.18 | |
| 1-7 | 0.50 | 0.75 | 0.22 | 0.44 | 0.07 | 6.7 | 100.00 | Fe—Ni | 0.18 | |
| 1-8 | 0.70 | 1.04 | 0.11 | 0.16 | 0.06 | 5.5 | 121.82 | Ba ferrite | | 0.05 |
| 1-9 | 1.00 | 1.49 | 0.12 | 0.08 | 0.10 | 4.2 | 159.52 | Fe—Ni | 0.18 | |
| 1'-1 | 3.30 | 4.93 | — | — | — | 4.0 | 167.50 | Fe—Ni | 0.18 | |
| 1'-2 | 0.50 | 0.75 | 0.20 | 0.40 | 0.25 | 16.0 | 41.88 | Fe—Ni | 0.18 | |
| 1'-3 | 0.60 | 0.90 | 0.35 | 0.58 | 0.25 | 5.0 | 134.00 | Fe—Ni | 0.18 | |
| 1'-4 | 0.60 | 0.90 | 0.50 | 0.83 | 0.26 | 18.0 | 37.22 | Fe—Ni | 0.18 | |
| 1'-6 | 0.70 | 1.04 | 0.22 | 0.31 | 0.01 | 10.0 | 67.00 | Fe—Ni | 0.18 | |

TABLE 2

Layer (a)
Non-Magnetic Powder

| Sample No. | Thickness (μm) | Kind | Shape | Average Particle Size (μm) | Average Particle Size/λ | Major Axis Length (μm) | Acicular Ratio | Plate Diameter (μm) | Aspect Ratio | Coating System |
|---|---|---|---|---|---|---|---|---|---|---|
| 1-1 | 3.00 | TiO$_2$ | particulate | 0.09 | 0.13 | | | | | simultaneous wet-on-wet |
| 1-2 | 2.50 | " | " | 0.09 | 0.13 | | | | | simultaneous wet-on-wet |
| 1-3 | 2.10 | " | " | 0.09 | 0.13 | | | | | simultaneous wet-on-wet |
| 1-4 | 0.80 | " | " | 0.09 | 0.13 | | | | | simultaneous wet-on-wet |
| 1-5 | 2.50 | alumina | " | 0.15 | 0.22 | | | | | simultaneous wet-on-wet |
| 1-6 | 2.50 | α ferrite | acicular | | | 0.60 | 8.00 | | | simultaneous wet-on-wet |
| 1-7 | 2.50 | BN | tabular | | | | | 0.70 | 9.00 | simultaneous wet-on-wet |
| 1-8 | 2.50 | TiO$_2$ | particulate | 0.09 | 0.13 | | | | | simultaneous wet-on-wet |
| 1-9 | 2.00 | " | " | 0.09 | 0.13 | | | | | simultaneous wet-on-wet |
| 1'-1 | — | — | — | | | | | | | single layer |
| 1'-2 | 0.40 | TiO$_2$ | particulate | 0.09 | 0.13 | | | | | simultaneous wet-on-wet |
| 1'-3 | 2.50 | red oxide | " | 0.25 | 0.37 | | | | | simultaneous wet-on-wet |
| 1'-4 | 2.50 | α ferrite | acicular | | | 1.50 | 18.0 | | | simultaneous wet-on-wet |
| 1'-6 | 2.50 | " | " | 0.09 | 0.13 | | | | | successive wet-on-wet |

Note:
*Layer (b) was coated after layer (a) was coated and dried.

TABLE 3

| Sample No. | Reproduction Output[1] (dB) | C/N Ratio[2] (dB) | BER[3] | DO | Pinholes (/100 m²) |
|---|---|---|---|---|---|
| 1-1 | 4.50 | 3.50 | 7 | 60 | 0.00 |
| 1-2 | 5.00 | 5.50 | 4 | 70 | 0.00 |
| 1-3 | 3.90 | 4.80 | 6 | 85 | 0.00 |
| 1-4 | 3.00 | 2.80 | 1 | 50 | 0.00 |
| 1-5 | 4.00 | 2.60 | 3 | 90 | 0.00 |
| 1-6 | 5.20 | 6.30 | 2 | 80 | 0.00 |
| 1-7 | 4.70 | 5.20 | 6 | 30 | 0.00 |
| 1-8 | 3.80 | 4.50 | 9 | 95 | 0.00 |
| 1-9 | 1.50 | 1.80 | 100 | 120 | 0.00 |
| 1'-1 | 0.00 | 0.00 | 200 | 150 | 0.00 |
| 1'-2 | −2.0 | −1.50 | 9000 | 220 | 5.00 |
| 1'-3 | 1.00 | −0.50 | 2000 | 65 | 0.00 |
| 1'-4 | −2.3 | −0.36 | 30000 | 180 | 0.00 |
| 1'-6 | 2.50 | 2.80 | 3000 | 1200 | 2000 or more |

Note:
[1] The result of Sample 1'-1 was taken as a standard (0.00 dB).
[2] The result of Sample 1'-1 was taken as a standard (0.00 dB).
[3] × $10^6$/m²

The shortest recording medium λ of the above prepared DAT tapes is 0.67 μm. This being applied to $\lambda/4 \leq d \leq 3\lambda$, a thickness of layer (b) is in a range of from 0.17 to 2.01 μm. Accordingly, the thickness of layer (b) according to the present invention ranges from 0.17 to 1.0 μm. $\Delta d \leq d/2$ leads to $\Delta d/d \leq 0.5$.

Samples 1-1 to 1-3 have different thickness ratios of layer (a) to layer (b) with the thickness of layer (b) being fixed. The thickness of layer (b) in Sample 1-1 is nearly the lower limit of the above range; that in Sample 1-2 is in the middle of the above range; and that in Sample 1-3 is nearly the upper limit of the above range. In Sample 1-4, the thickness of layer (a) is reduced near to the lower limit. Samples 1-5 through 1-7 are different in kind of the non-magnetic powder in layer (a), proving that the kind of non-magnetic powders has an influence on Ra within the scope of the present invention. Sample 1-8 is an example of using barium ferrite as a ferromagnetic powder. Sample 1-9 in which the thickness of layer (b) is near to the upper limit shows deterioration in characteristics as compared with other systems according to the present invention.

Comparative Sample 1'-1 has only layer (b) on the support. Comparative Sample 1'-2 having layer (a) thickness reduced is inferior in coating properties and Ra. Comparative Sample 1'-3 using a coarse red oxide powder (average particle size: 0.25 μm, greater than λ/4=0.1675) has a large Δd and is therefore inferior in C/N ratio. Comparative Sample 1'-4 using an acicular red oxide powder having a long major axis has a large Δd and is therefore inferior in Ra. Comparative Sample 1'-5 in which the thickness of layer (b) is lower than the lower limit is inferior in various characteristics. Comparative Sample 1'-6 is an example prepared by coating layer (b) after drying layer (a) and suffers from development of many pinholes.

Each of Samples 1-1 to 1-8 satisfying the conditions of d, Δd, σ, and Ra is superior to any comparative samples in reproduction output, C/N ratio, BER, dropout, and coating properties.

It has now been proved that coating defects appearing in mere reduction in thickness of a magnetic layer can be prevented by simultaneous wet-on-wet coating of a magnetic layer whose thickness is reduced not to exceed three times the shortest recording wavelength. Further, it is seen that optimization of the magnetic layer thickness in relation to the shortest recording wavelength according the particular recording system employed brings about an improvement in reproduction output. Furthermore, control of thickness variation of the magnetic layer having a reduced thickness and smoothing the surface of the magnetic layer bring about an improvement in C/N ratio.

Thus, the present invention provides a coated type magnetic recording medium exhibiting excellent electromagnetic characteristics comparable to metallic thin film type magnetic recording media while eliminating production problems and inferior reliability on preservation accompanying the conventional metallic thin film type magnetic recording media.

EXAMPLE 2 AND COMPARATIVE EXAMPLE 2

| Coating Composition for Layer (a): | |
|---|---|
| Rutile $TiO_2$ (average particle size: 0.035 μm; $TiO_2$ content: ≧90%; BET specific surface area: 35 to 45 m²/g; DBP absorption: 27 to 38 g/100 g; pH: 6.5 to 8) | 90 parts |
| Carbon black (average particle size: 16 mμ; DBP absorption: 80 ml/100 g; pH: 8.0; BET specific surface area: 250 m²/g; volatile content: 1.5%) | 10 parts |
| Vinyl chloride-vinyl acetate-vinyl alcohol copolymer (86:13:1; —$N(CH_3)_3{}^+Cl^-$ content: 5 × $10^{-6}$ eq/g; polymerization degree: 400) | 12 parts |
| Polyester polyurethane resin (neopentyl-glycol/caprolactone polyol/diphenyl-methane-4,4'-diisocyanate (MDI) = 0.9/2.6/1; —$SO_3Na$ content: 1 × $10^{-4}$ eq/g) | 5 parts |
| Butyl stearate | 1 part |
| Stearic acid | 1 part |
| Methyl ethyl ketone | 200 parts |
| Cyclohexanone | 80 parts |

The above components were kneaded in a continuous kneader and dispersed in a sand mill. To the dispersion were added 1 part of polyisocyanate and 40 parts of butyl acetate, followed by filtration through a filter having an average pore size of 1 μm to prepare a coating composition for layer (a).

| Coating Composition for Layer (b): | |
|---|---|
| Ferromagnetic powder: Fe/Zn/Ni alloy (92/4/4; Hc: 1600 Oe; BET specific surface area: 60 m²/g; crystallite size: 195 Å; average major axis length: 0.20 μm; acicular ratio: 10; $\sigma_s$: 130 emu/g) | 100 parts |
| Vinyl chloride copolymer (—$SO_3Na$ content: 1 × $10^{-4}$ eq/g; polymerization degree: 300) | 12 parts |
| Polyester polyurethane resin (neopentyl-glycol/caprolactone polyol/MDI = 0.9/2.6/1; —$SO_3Na$ content: 1 × $10^{-4}$ eq/g) | 3 parts |
| α-Alumina (average particle size: 0.2 μm) | 2 parts |
| Carbon black (average particle size: 0.10 μm) | 8 parts |
| Butyl stearate | 1 part |
| Stearic acid | 2 parts |
| Methyl ethyl ketone | 200 parts |

The above components were kneaded in a continuous kneader and dispersed in a sand mill. To the dispersion were added 3 parts of polyisocyanate and 40 parts of butyl acetate, followed by filtration through a filter having an average pore size of 1 μm to prepare a coating composition for layer (b).

The coating composition for layer (a) was coated on a 7 μm thick polyethylene naphthalate film support having a centerline average surface roughness of 0.01 μm to a dry thickness of 3 μm. Immediately thereafter while layer (a) was wet, the coating composition for layer (b) was coated thereon to a dry thickness of 0.5 μm (successive wet-on-wet coating). While layers (a) and (b) were wet, the ferromagnetic powder in layer (b) was orientated by applying a magnetic field using a cobalt magnet having a magnetic force of 3000 G and a solenoid having a magnetic force of 1500 G. After drying, the coated film was calendered through 7 stages of metallic rolls at 90° C. and cut to a width of 8 mm to prepare a 8 mm-video tape sample. The resulting sample was designated 2-1.

Samples 2-2 to 2-10 and Comparative Samples 2'-1 to 2'-7 were prepared in the same manner as for Sample 2-1, except for making alterations shown in Tables 4 and 5 below. Each sample was evaluated according to the following test methods, and the results obtained are shown in Tables 4 and 5.

Volume Ratio (Packing) of Inorganic Powder in Layer (a)

A sample was sliced with a diamond cutter to prepare a specimen having a thickness of about 0.1 μm. The specimen was photographed under TEM. The number of inorganic powder particles per μm² was counted, and the number of the particles contained per unit volume was calculated taking the thickness of the specimen into consideration. Then, the volume per particle obtained from the same micrograph was multiplied by the number of the particles per unit volume to obtain a volume ratio of the inorganic powder according to equation:

Volume Ratio (%)=4π/3(D/2)³(n/t)×100 wherein D is a particle diameter (μm) obtained from the micrograph; n is a number of particles per unit area (μm²) obtained from the micrograph; and t is a thickness (μm) of the specimen.

Volume Ratio of Powders in Layer (b)

A density of a ferromagnetic powder can be obtained from:

$dM = Bm/4\pi\sigma_s$ wherein Bm is a residual magnetic flux density (gauss); dM is a ferromagnetic powder density (g/cc); and $\sigma_s$ is a magnetization of a ferromagnetic powder.

A volume ratio of a ferromagnetic powder in layer (b) can be obtained by dividing the above-described powder density by a specific gravity of the powder.

A volume ratio of other powders in layer (b) can be obtained by calculating the respective density from the above-described composition formulation and dividing by the respective specific gravity.

A powder volume ratio in layer (b) can be calculated by adding together these values.

Average Particle Size of Inorganic Powder

An average major axis length was measured with TEM.

Crystallite Size of Ferromagnetic Powder

Obtainable from a half-value width of the X-ray diffraction pattern of the (1,1,0) face and (2,2,0) face.

Surface Roughness $R_{rms}$

Obtainable by scanning over an area of 6 μm×6 μm with a scanning tunnel microscope (STM) "Nanoscope II" manufactured by Digital Instrument Co. at a tunnel current of 10 A and a bias voltage of 400 mV. Calculation was made according to equation:

$$R_{rms} = \left(\frac{1}{l}\int_0^l y^2 dx\right)^{1/2}$$

wherein l is a measured length.

Standard Deviation of d (σ)

Measured in the same manner as described in Example 1.

7 MHz Output

Signals of 7 MHz were recorded on a sample tape using a 8 mm video deck "FUJI X8" manufactured by Fuji Photo Film Co., Ltd. The output signals were determined with an oscilloscope. 8-mm Tape "SAG P6-120" produced by Fuji Photo Film Co., Ltd. was used as a reference sample.

Pinholes

A magnetic layer of a sample before formation of a back layer was observed with transmitted white light with naked eye to count the number of pinholes per 100 m². A satisfactory level is 1 per 100 m².

TABLE 4

| | Sample No. | | | | | | | |
|---|---|---|---|---|---|---|---|---|
| | 2-1 | 2-2 | 2-3 | 2-4 | 2-5 | 2'-1 | 2'-2 | 2'-3 |
| Layer (a): Inorganic Powder: | | | | | | | | |
| Kind | TiO₂ | TiO₂ | TiO₂ | TiO₂ | TiO₂ | TiO₂ | TiO₂ | TiO₂ |
| Average particle size (μm) | 0.04 | 0.08 | 0.01 | 0.04 | 0.04 | 0.1 | 0.006 | 0.04 |
| Volume ratio (%) | 45.35 | 45.35 | 45.35 | 45.35 | 45.35 | 45.35 | 45.35 | 45.35 |
| Amount added (part) | 90 | 90 | 90 | 90 | 90 | 90 | 90 | 90 |
| Carbon Black (part) | 10 | 10 | 10 | 10 | 10 | 10 | 10 | 10 |
| Layer (b): | | | | | | | | |
| Crystallize size of ferromagnetic powder | 0.02 | 0.02 | 0.02 | 0.02 | 0.02 | 0.02 | 0.02 | 0.02 |

TABLE 4-continued

|  | Sample No. | | | | | | | |
| --- | --- | --- | --- | --- | --- | --- | --- | --- |
|  | 2-1 | 2-2 | 2-3 | 2-4 | 2-5 | 2'-1 | 2'-2 | 2'-3 |
| ($\mu$m) | | | | | | | | |
| Thickness d ($\mu$m) | 0.5 | 0.5 | 0.5 | 0.3 | 1 | 0.5 | 0.5 | 1.2 |
| $\Delta$d ($\mu$m) | 0.11 | 0.09 | 0.09 | 0.12 | 0.13 | 0.26 | 0.27 | 0.21 |
| Size Ratio* | 2 | 4 | 0.5 | 2 | 2 | 5 | 0.3 | 2 |
| Coating System | successive wet-on-wet coating system | | | | | | | |
| Evaluation: | | | | | | | | |
| $R_{rms}$ (nm) | 6.8 | 7.1 | 7.2 | 6.8 | 6.5 | 17.3 | 18 | 8.2 |
| d/$R_{rms}$ | 73.5 | 70.4 | 69.4 | 44.1 | 153.8 | 28.9 | 27.8 | 146.3 |
| 7 MHz Output (dB) | 7.5 | 7.1 | 7 | 7.9 | 7 | 2.2 | 0.2 | 4.5 |
| Pinholes (/100 m$^2$) | 0 | 0 | 0 | 0 | 0 | 0 | 0 | 0 |

Note: *Ratio of inorganic powder average particle size to ferromagnetic powder crystallite size

TABLE 5

|  | Sample 2'-4 | Sample 2-6 | Sample 2-7 | Sample 2'-5 | Sample 2-8 | Sample 2'-6 | Sample 2'-7 | Sample 2-9 | Sample 2-10 |
| --- | --- | --- | --- | --- | --- | --- | --- | --- | --- |
| Layer (a): | | | | | | | | | |
| Inorganic Powder: | | | | | | | | | |
| Kind |  | TiO$_2$ | TiO$_2$ | TiO$_2$ | TiO$_2$ | TiO$_2$ | TiO$_2$ | TiO$_2$ | $\alpha$-Al$_2$O$_3$ |
| Average particle size ($\mu$m) |  | 0.04 | 0.04 | 0.04 | 0.04 | 0.04 | 0.04 | 0.04 | 0.05 |
| Volume ratio (%) |  | 48.87 | 39.50 | 38.38 | 20.97 | 19.62 | 63.24 | 57.78 | 46.50 |
| Amount added (part) |  | 100 | 60 | 55 | 15 | 12 | 300 | 200 |  |
| Carbon Black (part) |  | 0 | 40 | 45 | 5.5 | 6 | 10 | 10 | 10 |
| Layer (b): | | | | | | | | | |
| Crystallize size of ferromagnetic powder ($\mu$m) | 0.02 | 0.02 | 0.02 | 0.02 | 0.02 | 0.02 | 0.02 | 0.02 | 0.02 |
| Thickness d ($\mu$m) | 0.5 | 0.5 | 0.5 | 0.5 | 0.5 | 0.5 | 0.5 | 0.5 | 0.5 |
| $\Delta$d ($\mu$m) | — | 0.11 | 0.18 | 0.28 | 0.27 | 0.31 | — | 0.10 | 0.12 |
| Size Ratio* | — | 2 | 2 | 2 | 2 | 2 | 2 | 2 | 2.5 |
| Coating System | single layer | successive wet-on-wet coating system | | | | | | | |
| Evaluation: | | | | | | | | | |
| $R_{rms}$ (nm) | 20.0 | 6.2 | 15 | 18.3 | 7.2 | 22 | failure of coating | 7.1 | 6.6 |
| d/$R_{rms}$ | 25.0 | 80.6 | 33.3 | 273 | 69.4 | 22.7 |  | 70.4 | 75.8 |
| 7 MHz Output (dB) | −1.5 | 7.8 | 5.2 | 1.2 | 7.3 | −0.5 |  | 6.6 | 7.7 |
| Pinholes (/100 m$^2$) | 154 | 1 | 0 | 0 | 0 | 0 |  | 0 | 0 |

Note:
*The same as the footnote of Table 4.

As can be seen from the results in Tables 4 and 5, every sample of the present invention, in which the average particle size of the inorganic powder in layer (a) is from ½ to 4 times the crystallite size of the ferromagnetic powder in layer (b), has a uniform magnetic layer with such excellent surface properties as having a small surface roughness $R_{rms}$ a d/$R_{rms}$ ratio of 30 or more, and a $\sigma$ of 0.2 $\mu$m or less, achieves a high reproduction output, and is free from pinholes. To the contrary, Comparative Samples 2'-1 having a size ratio (inorganic powder average particle size/ferromagnetic powder crystallite size) greater than the prescribed range has a large $R_{rms}$ and shows no improvement in reproduction output. Comparative Example 2'-3 whose magnetic layer has a large thickness as 1.2 $\mu$m is slightly inferior in reproduction output. Comparative Example 2'-4 is a single-layered magnetic recording medium having no non-magnetic lower layer. Comparative Example 2'-5 having a small inorganic powder content has a large $R_{rms}$ and a $\sigma$ of 0.2 or more and shows no improvement in electromagnetic characteristics. Comparative Example 2'-6 having too a small inorganic powder volume ratio has a large $R_{rms}$, failing to obtain improved electromagnetic characteristics. Comparative Sample 2'-7 encountered a failure of coating due to too a high inorganic powder volume ratio.

EXAMPLE 3

Coating Composition for Layer (a)

The same as in Sample 2-1 of Example 2.

Coating Composition for Layer (b):

| | |
| --- | --- |
| Co-Doped $\gamma$-Fe$_2$O$_3$ (Hc: 700 Oe: BET | 100 parts |

-continued

| Coating Composition for Layer (b): | |
|---|---|
| specific surface area: 42 m²/g<br>crystallite size: 300 Å; $\sigma_s$: 75 emu/g) | |
| Vinyl chloride copolymer (—SO$_3$Na content: 1 × 10$^{-5}$ eq/g; polymerization degree: 300) | 9 parts |
| Fine abrasive particles (Cr$_2$O$_3$; average particle size: 0.3 μm) | 7 parts |
| Toluene | 30 parts |
| Methyl ethyl ketone | 30 parts |

The above components were kneaded in a kneader for about 1 hour. To the mixture were added the following components, followed by further dispersing in a kneader for about 2 hours.

| | |
|---|---|
| Polyester polyurethane resin (neopentyl-glycol/caprolactone polyol/MDI = 0.9/2.6/1; —SO$_3$Na content: 1 × 10$^{-4}$ eq/g; average molecular weight: 35000) | 5 parts |
| Toluene | 200 parts |
| Methyl ethyl ketone | 200 parts |

To the dispersion were further added the following components, followed by further dispersing in a sand grinder.

| | |
|---|---|
| Carbon black (average particle size: 20 to 30 mμ; "Ketjenblack EC" produced by Akizo Chemie Nederland B.V.) | 5 parts |
| Coarse abrasive grains (α-alumina; "AKP-12" produced by Sumitomo Chemical Co., Ltd.; average particle size: 0.5 μm) | 2 parts |

Finally, the following composition was added to the dispersion, followed by further dispersing in a sand grinder to prepare a coating composition for layer (b).

| | |
|---|---|
| Polyisocyanate (Coronate L) | 6 parts |
| Tridecyl stearate | 6 parts |

The coating composition for layer (a) was coated on a 75 μm thick polyethylene terephthalate film support to a dry thickness of 1.5 μm, and the coating composition for layer (b) was then coated thereon to a dry thickness of 0.5 μm while layer (a) was wet. The back side of the support was coated in the same manner. The coated film was subjected to calendering to obtain a magnetic recording medium.

The resulting magnetic recording medium was punched out to obtain a disc of 3.5 in. in diameter. The disc was put in a 3.5 in. cartridge previously having a liner therein, and the cartridge was fitted with prescribed members to obtain a 3.5 in. floppy disc. The resulting sample was designated 3-1.

Samples 3-2 to 3-5 and Comparative Samples 3'-1 to 3'-3 were prepared in the same manner as for Sample 3-1, except for making the alterations shown in Table 6 below. Each sample was evaluated as follows, and the results obtained are shown in Table 6.

Volume Ratio (Packing) of Inorganic Powder in Layer (a)

The same as in Example 2.

Average Particle Size of Inorganic Powder

The same as in Example 2.

Crystallite Size of Ferromagnetic Powder

Obtainable from the x-ray diffraction pattern of the (4.4.0) face and (2.2.0) face.

Surface Roughness $R_{rms}$

The same as in Example 2.

Standard Deviation of d (σ)

The same as in Example 1.

Innermost Periphery 2F Output

Relatively expressed by taking the initial 2F output of Sample 3-1 was 100%. A drive "PD 211" manufactured by Toshiba was used.

TABLE 6

| | Sample No. | | | | | | | |
|---|---|---|---|---|---|---|---|---|
| | 3-1 | 3-2 | 3-3 | 3-4 | 3-5 | 3'-1 | 3'-2 | 3'-3 |
| Layer (a):<br>Inorganic Powder: | | | | | | | | |
| Kind | TiO$_2$ | TiO$_2$ | TiO$_2$ | TiO$_2$ | TiO$_2$ | TiO$_2$ | TiO$_2$ | TiO$_2$ |
| Average particle size (μm) | 0.04 | 0.09 | 0.02 | 0.04 | 0.04 | 0.13 | 0.01 | 0.04 |
| Volume ratio (%) | 45.35 | 45.35 | 45.35 | 45.35 | 45.35 | 45.35 | 45.35 | 45.35 |
| Amount added (part) | 90 | 90 | 90 | 90 | 90 | 90 | 90 | 90 |
| Carbon Black (part) | 10 | 10 | 10 | 10 | 10 | 10 | 10 | 10 |
| Layer (b): | | | | | | | | |
| Crystallize size of ferromagnetic powder (μm) | 0.03 | 0.03 | 0.03 | 0.03 | 0.03 | 0.03 | 0.03 | 0.03 |
| Thickness d (μm) | 0.5 | 0.5 | 0.5 | 0.3 | 1 | 0.5 | 0.5 | 1.2 |
| $^\Delta$d (μm) | 0.09 | 0.08 | 0.11 | 0.061 | 0.21 | 0.31 | 0.28 | 0.12 |
| Size Ratio* | 1.33 | 3.00 | 0.67 | 1.33 | 1.33 | 4.33 | 0.33 | 1.33 |
| Coating system | successive wet-on-wet coating system | | | | | | | |
| Evaluation: | | | | | | | | |

TABLE 6-continued

| | Sample No. | | | | | | | |
|---|---|---|---|---|---|---|---|---|
| | 3-1 | 3-2 | 3-3 | 3-4 | 3-5 | 3'-1 | 3'-2 | 3'-3 |
| $R_{rms}$ (nm) | 7.5 | 8.1 | 7.6 | 8.5 | 7.3 | 17.2 | 18.9 | 7.6 |
| $d/R_{rms}$ | 66.7 | 61.7 | 65.8 | 35.3 | 137.0 | 29.1 | 26.5 | 157.9 |
| Relative 2F Output (%) | 100 | 95 | 101 | 94 | 92 | 75 | 68 | 72 |

Note:
*The same as the footnote of Table 4.

As is apparent from Table 6, every sample of the present invention, in which the average particle size of the inorganic powder in layer (a) is from ½ to 4 times the crystallite size of the ferromagnetic powder in layer (b), has a uniform magnetic layer with such excellent surface properties as having a small surface roughness $R_{rms}$, a $d/R_{rms}$ ratio of 30 or more, and a σ of 0.2 µm or less, achieves a high reproduction output, and is free from pinholes. To the contrary, Comparative Sample 3'-1 having a size ratio (inorganic powder average particle size/ferromagnetic powder crystallite size) greater than the prescribed range has a large $R_{rms}$ and shows no improvement in reproduction output. Comparative Sample 3'-2 having the size ratio smaller than the prescribed range also has a large $R_{rms}$ and shows no improvement in reproduction output. Comparative Sample 3'-3 whose magnetic layer has a large thickness as 1.2 µm is slightly inferior in reproduction output.

EXAMPLE 4

Magnetic recording medium samples (Samples 4-1 to 4-9, Comparative Samples 4'-1 to 4'-6, and Reference Example 4"-1) were prepared in the same manner as for Sample 2-1 of Example 2, except for making alterations particularly to the ratio of inorganic powder average particle size to ferromagnetic powder major axis length as shown in Tables 7 and 8 below. Each sample was evaluated in the same manner as in Example 2. In addition, a squareness ratio was determined as follows. The results obtained are shown in Tables 7 and 8.

Squareness Ratio (Rs)

A Br/Bm ratio in the coating direction was measured in a magnetic field of 5 kOe by means of a vibrating sample magnetometer ("VNM" manufactured by Toei Kogyo K.K.).

TABLE 7

| | Sample No. | | | | | | | |
|---|---|---|---|---|---|---|---|---|
| | 4-1 | 4-2 | 4-3 | 4-4 | 4-5 | 4'-1 | 4'-2 | 4'-3 |
| Layer (a): | | | | | | | | |
| Inorganic Powder: | | | | | | | | |
| Kind | $TiO_2$ | $TiO_2$ | $TiO_2$ | $TiO_2$ | $TiO_2$ | $TiO_2$ | $TiO_2$ | |
| Average particle size (µm) | 0.035 | 0.065 | 0.035 | 0.035 | 0.035 | 0.008 | 0.035 | |
| Volume ratio (%) | 45.35 | 45.35 | 45.35 | 39.50 | 48.87 | 45.35 | 45.35 | |
| Amount added (part) | 90 | 90 | 90 | 60 | 100 | 90 | 90 | |
| Carbon Black (part) | 10 | 1o | 10 | 40 | 0 | 10 | 10 | |
| Layer (b): | | | | | | | | |
| Major axis length of ferromagnetic powder (µm) | 0.2 | 0.2 | 0.2 | 0.2 | 0.2 | 0.2 | 0.2 | 0.2 |
| Thickness d (µm) | 0.5 | 0.5 | 1 | 0.5 | 0.5 | 0.5 | 1.3 | 0.5 |
| $^\Delta$d (µm) | 0.077 | 0.075 | 0.074 | 0.077 | 0.085 | 0.31 | 0.09 | — |
| Size Ratio* | 0.175 | 0.325 | 0.175 | 0.175 | 0.175 | 0.4 | 0.175 | 0 |
| Coating System | successive wet-on-wet coating system | | | | | | | single layer |
| Evaluation: | | | | | | | | |
| $R_{rms}$ (nm) | 6.6 | 6.8 | 5.4 | 15 | 7.2 | 25 | 8.8 | 33 |
| $d/R_{rms}$ | 75.8 | 73.5 | 185 | 33.3 | 69 | 20 | 147 | 15.2 |
| Rs | 0.84 | 0.81 | 0.86 | 0.79 | 0.76 | 0.66 | 0.81 | 0.81 |
| 7 MHz Output (dB) | 6.8 | 6.5 | 6.5 | 5.9 | 6.8 | 4.4 | 3.5 | |
| Pinholes (/100 m²) | 0 | 0 | 0 | 0 | 0 | 0 | 0 | 153 |

Note:
*Ratio of inorganic powder average particle size to ferromagnetic powder major axis length.

TABLE 8

| | Sample No. | | | | | | | |
|---|---|---|---|---|---|---|---|---|
| | 4'-4 | 4-6 | 4"-1 | 4-7 | 4-8 | 4-9 | 4'-5 | 4'-6 |
| Layer (a) | | | | | | | | |
| Inorganic Powder: | | | | | | | | |
| Kind | $TiO_2$ | $\alpha\text{-}Fe_2O_3$ | | $\alpha\text{-}Al_2O_3$ | $BaSO_4$ | $SiO_2$ | | $TiO_2$ |
| Average particle size ($\mu$m) | 0.035 | 0.04 | | 0.06 | 0.033 | 0.02 | | 0.035 |
| Volume ratio (%) | 45.35 | 42.37 | | 46.50 | 44.98 | 53.33 | 34.84 | 38.88 |
| Amount added (part) | 90 | 90 | | 90 | 90 | 90 | 0 | 55 |
| Carbon Black (part) | 10 | 10 | | 10 | 10 | 10 | 100 | 45 |
| Layer (b): | | | | | | | | |
| Major axis length of ferromagnetic powder ($\mu$m) | 0.2 | 0.2 | 0.2 | 0.2 | 0.2 | 0.2 | 0.2 | 0.2 |
| Thickness d ($\mu$m) | 0.5 | 0.5 | 2.5 | 0.5 | 0.5 | 0.5 | 0.5 | 0.5 |
| $\Delta$d ($\mu$m) | 0.01 | 0.055 | — | 0.09 | 0.18 | 0.05 | 0.29 | 0.33 |
| Size Ratio* | 0.175 | 0.2 | — | 0.3 | 0.165 | 0.1 | 0.175 | 0.175 |
| Coating System | successive wet-on-dry | successive wet-on-wet | single layer | successive wet-on-wet | successive wet-on-wet | successive wet-on-wet | successive wet-on-wet | successive wet-on-wet |
| Evaluation: | | | | | | | | |
| $R_{rms}$ (nm) | 15.5 | 14.3 | 9.5 | 8.8 | 11.5 | 9.6 | 55.3 | 48.2 |
| $d/R_{rms}$ | 32.3 | 35 | 2600 | 57 | 43 | 52 | 9 | 10.3 |
| Rs | 0.88 | 0.82 | 0.77 | 0.77 | 0.75 | 0.71 | 0.68 | 0.69 |
| 7 MHz Output (dB) | 6.8 | 6.5 | 6.5 | 5.9 | 6.8 | 4.4 | 3.5 | −2.2 |
| Pinholes (/100 m$^2$) | 0 | 0 | 0 | 0 | 0 | 0 | 0 | 153 |

Note:
*The same as the footnote of Table 7.

It is apparent from Tables 7 and 8 that every sample of the present invention, in which the average particle size of the inorganic powder in layer (a) is not more than $\frac{1}{3}$ the major axis length of the ferromagnetic powder in layer (b), has a uniform magnetic layer with such excellent surface properties as having a $d/R_{rms}$ ratio of 30 or more and a $\Delta$d of not more than d/2, achieves a high reproduction output, and is free from pinholes. To the contrary, Comparative Samples 4'-1 having a size ratio (inorganic powder average particle size/ferromagnetic powder major axis length) greater than the prescribed range has a large $\Delta$d and shows no improvement in reproduction output. Comparative Sample 4'-3 having a single layer structure lacks film thickness and is seriously inferior in coating properties and electromagnetic characteristics. Comparative Sample 4'-4 which was prepared by coating layer (b) after drying of layer (a) fails to obtain improvements in coating properties. Reference Sample 4"-1, an example having a single magnetic layer structure having a large thickness d, exhibits satisfactory coating properties but shows no improvement in electromagnetic characteristics. Comparative Sample 4'-5 using no inorganic powder in layer (a) suffers from a considerable interfacial variation between layers (a) and (b) (i.e., $\Delta$d is high) and therefore has poor electromagnetic characteristics. Comparative Sample 4'-6 has a low volume ratio of the inorganic powder in layer (a) and a slightly increased $\Delta$d and therefore poor electromagnetic characteristics.

EXAMPLE 5

A magnetic recording medium was prepared in the same manner as for Sample 3-1, except for replacing the Co-doped $\gamma\text{-}Fe_2O_3$ of the formulation for layer (b) with the following ferromagnetic powder. The resulting sample was designated 5-1.

Ferromagnetic Powder

Hexagonal barium ferrite
Average plate diameter: 0.05 $\mu$m
Average aspect ratio: 4
BET specific surface area: 39 m$^2$/g
Hc: 1100 Oe Samples 5-2 to 5-3 and Comparative Samples 5'-1 to 5'-2 were prepared in the same manner as for Sample 5-1, except for making alterations particularly to the size ratio (inorganic powder average particle size/ferromagnetic powder average plate diameter) as shown in Table 9 below.

Each of these samples was evaluated in the same manner as in Example 3. In addition, the following properties were also determined. The results obtained are shown in Table 9.

Squareness Ratio (Rs) in Vertical Direction

A Br/Bm ratio in the direction perpendicular to the coated surface was obtained with a vibrating sample magnetometer.

$D_{50}$

A recording density ($D_{50}$) (kfci) which makes the output 50% of that of long wavelength recording reproduction was obtained. $D_{50}$ affords an indication of the highest possible recording density which may be reached with a particular recording device used.

TABLE 9

| | Sample No. | | | | |
|---|---|---|---|---|---|
| | 5-1 | 5'-1 | 5'-2 | 5-2 | 5-3 |
| Layer (a): | | | | | |
| Inorganic powder: | | | | | |
| Kind | $TiO_2$ | $TiO_2$ | $TiO_2$ | $TiO_2$ | $TiO_2$ |
| Average particle size ($\mu$m) | 0.035 | 0.06 | | 0.035 | 0.06 |
| True specific gravity | 4.3 | 4.3 | | 4.3 | 4.3 |
| Volume ratio (%) | 45.80 | 45.80 | | 41.89 | 45.80 |
| Amount added (part) | 90 | 90 | | 70 | 90 |
| Carbon Black (part) | 10 | 10 | | 30 | 10 |
| Layer (b): | | | | | |
| plate diameter ($\mu$m) | 0.05 | 0.05 | 0.05 | 0.05 | 0.09 |
| d ($\mu$m) | 0.5 | 0.5 | 1.2 | 0.5 | 0.5 |
| $\Delta$d ($\mu$m) | 0.12 | 0.29 | 0 | 0.10 | 0.15 |
| Size Ratio** | 0.7 | 1.2 | 0 | 0.7 | 0.66666 |
| Coating System | successive wet-on-wet | successive wet-on-wet | single layer | successive wet-on-wet | successive wet-on-wet |
| Evaluation: | | | | | |
| $R_{rms}$ (nm) | 8.7 | 18.8 | 12.3 | 11.6 | 12.9 |
| $d/R_{rms}$ | 57 | 26.6 | 975 | 43.1 | 38.8 |
| Rs | 0.72 | 0.55 | 0.75 | 0.72 | 0.71 |
| Rs in vertical direction | 0.75 | 0.72 | 0.65 | 0.73 | 0.71 |
| $D_{50}$ (kfci) | 40 | 25 | 15 | 38 | 42 |
| Pinholes (/100 m$^2$) | 0 | 0 | 0 | 0 | 0 |

Note:
*Ferromagnetic powder
**Ratio of inorganic powder average particle size to ferromagnetic powder plate diameter As can be seen from Table 9, since the inorganic powder used in layer (a) of the samples of the present invention has an average particle diameter smaller than the average plate diameter of the tabular ferromagnetic powder in layer (b), a uniform magnetic layer having a $\Delta$d of not more than d/2 and having a high squareness ratio in the vertical direction can be formed. Therefore, these samples have a high $D_{50}$ and is free from pinholes. To the contrary, Comparative Sample 5'-1, in which the inorganic powder has an average particle size greater than the average plate diameter of the ferromagnetic powder, has a large $\Delta$d, showing no improvement on $D_{50}$. Comparative Sample 5'-2, which is an example of a single layer structure having no lower non-magnetic layer, has a poor $D_{50}$.

EXAMPLE 6

| Coating Composition for Layer (a): | |
|---|---|
| Rutile $TiO_2$ (average particle size: 0.035 $\mu$m; $TiO_2$ content: 90%; BET specific surface area: 40 m$^2$/g; DBP absorption: 27 to 38 g/100 g; pH: 7) | 80 parts |
| Carbon black (average particle size: 16 m$\mu$; DBP absorption: 80 ml/100 g; pH: 8.0; BET specific surface area: 250 m$^2$/g; volatile content: 1.5%) | 20 parts |
| Vinyl chloride-vinyl acetate-vinyl alcohol copolymer (86:13:1; —N(CH$_3$)$_3$$^+$Cl$^-$ content: 5 × 10$^{-6}$ eq/g; polymerization degree: 400) | 12 parts |
| Polyester polyurethane resin (neopentyl-glycol/caprolactone polyol/MDI = 0.9/2.6/1; —SO$_3$Na content: 1 × 10$^{-4}$ eq/g) | 5 parts |
| Butyl stearate | 1 part |
| Stearic acid | 1 part |

| -continued | |
|---|---|
| Coating Composition for Layer (a): | |
| Methyl ethyl ketone | 100 parts |
| Cyclohexanone | 50 parts |
| Toluene | 50 parts |

The above components were kneaded in a continuous kneader and dispersed in a sand mill. To the dispersion were added 1 part of polyisocyanate and- 40 parts of butyl acetate, followed by filtration through a filter having an average pore size of 1 $\mu$m to prepare a coating composition for layer (a).

| Coating Composition for Layer (b): | |
|---|---|
| Ferromagnetic powder: Fe/Zn/Ni alloy (92/4/4; Hc 1600 Oe; BET specific surface area: 60 m$^2$/g; crystallite size: 195 Å; average major axis length: 0.20 $\mu$m; acicular ratio: 10; $\sigma_s$: 130 emu/g; surface treating agent: Al$_2$O$_3$, SiO$_2$) | 100 parts |
| Vinyl chloride copolymer (—SO$_3$Na content: 1 × 10$^{-4}$ eq/g; polymerization degree: 300) | 12 parts |
| Polyester polyurethane resin (neopentyl-glycol/caprolactone polyol/MDI = 0.9/2.6/1; —SO$_3$Na content: 1 × 10$^{-4}$ eq/g) | 3 parts |
| α-Alumina (average particle size: 0.3 $\mu$m) | 2 parts |
| Carbon black (average particle size: 0.10 $\mu$m (100 m$\mu$) | 0.5 parts |
| Butyl stearate | 1 part |
| Stearic acid | 2 parts |
| Methyl ethyl ketone | 90 parts |
| Cyclohexanone | 50 parts |
| Toluene | 60 parts |

The above components were kneaded in a continuous kneader and dispersed in a sand mill. To the dispersion were added 3 parts of polyisocyanate and 40 parts of butyl acetate, followed by filtration through a filter having an average pore size of 1 μm to prepare a coating composition for layer (b).

The coating composition for layer (a) was coated on a 7 μm thick polyethylene terephthalate film support having a centerline average surface roughness of 0.01 μm to a dry thickness of 2 μm. Immediately thereafter while layer (a) was wet, the coating composition for layer (b) was coated thereon to a dry thickness of 0.5 μm (successive wet-on-wet coating). While layers (a) and (b) were wet, the ferromagnetic powder in layer (b) was orientated by applying a magnetic field using a cobalt magnet having a magnetic force of 3000 G and a solenoid having a magnetic force of 1500 G. After drying, the coated film was calendered through 7 stages of metallic rolls at 90° C. and cut to a width of 8 mm to prepare a 8 mm-video tape sample. The resulting sample was designated 6-1.

Samples 6-2 to 6-12 and Comparative Samples 6'-1 to 6'-3 were prepared in the same manner as for Sample 6-1, except for making alterations shown in Tables 10 and 11 below. Electromagnetic characteristics of the resulting samples were evaluated in the same manner as in the foregoing examples. In addition, centerline surface roughness (Ra) of layer (b) was measured over an area of about 250 μm×250 μm according to a MIRAU method by means of "TOPO 3D" manufactured by WYKO K.K. Spherical corrections and cylindrical corrections were made at about 650 nm. The results obtained are shown in Tables 10 and 11. The relative running speed of the 8 mm VTR used for testing was 38 m/sec, and the 7 MHz recording wavelength was 0.54 μm. Accordingly, λ/50 was 10.8 nm.

TABLE 10

| | Sample No. | | | | | | |
|---|---|---|---|---|---|---|---|
| | 6-1 | 6-2 | 6-3 | 6-4 | 6-5 | 6-6 | 6-7 |
| Layer (a): | | | | | | | |
| Inorganic powder | $TiO_2$ rutile | $TiO_2$ rutile | $TiO_2$ rutile | $TiO_2$ rutile | $TiO_2$ rutile | $TiO_2$ rutile | $TiO_2$ rutile |
| Surface coat: | | | | | | | |
| $Al_2O_3$ (%) | 10 | 0 | 0 | 5 | 0 | 5 | 0 |
| $SiO_2$ (%) | 0 | 5 | 0 | 3 | 0 | 1 | 3 |
| $ZrO_2$ (%) | 0 | 0 | 5 | 0 | 1 | 1 | 0.5 |
| Main component (%) | 90 | 90 | 91 | 90 | 88 | 91 | 85 |
| $Al_2O_3$/surface coat | 1.000 | 0.000 | 0.000 | 0.625 | 0.833 | 0.000 | 0.588 |
| Thickness (μm) | 2.5 | 2.5 | 2.5 | 2.5 | 2.5 | 2.5 | 2.5 |
| Layer (b): | | | | | | | |
| d (μm) | 0.5 | 0.5 | 0.5 | 0.5 | 0.5 | 0.5 | 0.5 |
| σ (μm) | 0.09 | 0.10 | 0.08 | 0.06 | 0.05 | 0.11 | 0.15 |
| $^\Delta$d (μm) | 0.16 | 0.11 | 0.18 | 0.08 | 0.21 | 0.21 | 0.12 |
| Coating System | successive wet-on-wet coating | | | | | | |
| Ra (nm) | 3.5 | 7.6 | 4.1 | 3.5 | 3.2 | 8.8 | 2.7 |
| 7 MHz Output (dB) | 6.5 | 6.6 | 5.5 | 6.6 | 6.7 | 6.3 | 6.4 |
| C/N (dB) | 6.1 | 6 | 5.9 | 6 | 5.9 | 6.1 | 6.1 |

TABLE 11

| | Sample No. | | | | | | | |
|---|---|---|---|---|---|---|---|---|
| | 6'-1 | 6-8 | 6'-2 | 6'-3 | 6-9 | 6-10 | 6-11 | 6-12 |
| Layer (a): | | | | | | | | |
| Inorganic powder | $TiO_2$ rutile | $TiO_2$ rutile | $TiO_2$ rutile | $TiO_2$ rutile | $TiO_2$ anatase | α-hematite | $BaSO_4$ | ZnO |
| Surface coat: | | | | | | | | |
| $Al_2O_3$ (%) | 0 | 10 | 10 | 10 | 10 | 8 | 5 | 5 |
| $SiO_2$ (%) | 0 | 0 | 0 | 0 | 0 | 2 | 5 | 3 |
| $ZrO_2$ (%) | 0 | 0 | 0 | 0 | 0 | 0 | 0 | 0 |
| Main component (%) | 98 | 90 | 90 | 90 | 90 | 90 | 90 | 90 |
| $Al_2O_{3/surface\ coat}$ | 0.000 | 1.000 | 1.000 | 1.000 | 1.000 | 0.800 | 0.500 | 0.625 |
| Thickness (μm) | 2.5 | 2.5 | 2.5 | 2.5 | 2.5 | 2.5 | 2.5 | 2.5 |
| Layer (b): | | | | | | | | |
| d (μm) | 0.5 | 1 | 1.2 | 0.5 | 1 | 0.5 | 0.5 | 0.5 |
| σ (μm) | 0.22 | 0.18 | 0.41 | | 0.11 | 0.06 | 0.06 | 0.05 |

TABLE 11-continued

| | Sample No. | | | | | | | |
|---|---|---|---|---|---|---|---|---|
| | 6'-1 | 6-8 | 6'-2 | 6'-3 | 6-9 | 6-10 | 6-11 | 6-12 |
| $\Delta d$ ($\mu$m) | 0.28 | 0.22 | 0.46 | — | 0.21 | 0.15 | 0.08 | 0.16 |
| Coating System | successive wet-on-wet | successive wet-on-wet | successive wet-on-wet | successive wet-on-dry | successive wet-on-wet | successive wet-on-wet | successive wet-on-wet | successive wet-on-wet |
| Ra (nm) | 12.1 | 5.5 | 3.6 | failure of sample preparation | 8.9 | 4.3 | 6.3 | 9.1 |
| 7 MHz Output (dB) | 2.5 | 5.7 | 4.5 | — | 6 | 5.9 | 5.8 | 6 |
| C/N (dB) | 2.1 | 5.9 | 3.8 | — | 5.8 | 5.5 | 5.5 | 6 |

As is apparent from Tables 10 and 11, the inorganic particles used in Samples 6-1 to 6-12 have improved dispersibility owing to the surface coat comprising $Al_2O_3$, $SiO_2$, $ZrO_2$, etc. to thereby achieve a low Ra, not more than $\lambda/50$ (10.8 nm), and exhibit satisfactory electromagnetic characteristics. Having no surface coat on the inorganic powder, Comparative Sample 6'-1 has poor dispersibility and, as a result, has high Ra, $\sigma$, and $\Delta d$ and deteriorated electromagnetic characteristics. Comparative Sample 6'-2 has poor electromagnetic characteristics due to the large thickness of the magnetic layer. Comparative Sample 6'-3 could not be prepared because of a failure of successive wet-on-dry coating.

EXAMPLE 7

Coating Composition for Layer (a):

The same as for Sample 6-1 of Example 6.
Coating Composition for Layer (b):

| Co-Substituted barium ferrite (BET specific surface area: 35 m$^2$/g; average particle size: 0.06 $\mu$m; aspect ratio: 5) | 100 parts |
| Vinyl chloride copolymer (—SO$_3$Na content: 1 × 10$^{-5}$ eq/g; polymerization degree: 300) | 9 parts |
| Fine abrasive grain (Cr$_2$O: average particle size: 0.3 $\mu$m) | 7 parts |
| Toluene | 30 parts |
| Methyl ethyl ketone | 30 parts |

The above components were kneaded in a kneader for about 1 hour. To the resulting mixture was added the following composition, followed by further dispersing in a kneader for about 2 hours.

| Polyester polyurethane resin (neopentyl glycol/caprolactone polyol/MDI = 0.9/2.6/1; —SO$_3$Na content: 1 × 10$^{-4}$ eq/g; average molecular weight: 35000) | 5 parts |
| Methyl ethyl ketone | 200 parts |
| Cyclohexanone | 100 parts |
| Toluene | 80 parts |

Then, the following components were further added thereto, followed by dispersing in a sand grinder at 2000 rpm for about 2 hours.

| Carbon black (average particle size: 20 to 30 m$\mu$; "Ketjenblack EC" produced by Akizo Chemie Nederland B.V.) | 5 parts |
| Coarse abrasive grains ($\alpha$-alumina; "AKP-12" produced by Sumitomo Chemical Co., Ltd.; average particle size: 0.5 $\mu$m) | 2 parts |

Finally, the following composition was added to the dispersion, followed by further dispersing in a sand grinder to prepare a coating composition for layer (b).

| Polyisocyanate (Coronate L) | 6 parts |
| Tridecyl stearate | 6 parts |

The coating composition for layer (a) was coated on a 75 $\mu$m thick polyethylene terephthalate film support to a dry thickness of 1.5 $\mu$m, and the coating composition for layer (b) was then coated thereon to a dry thickness of 0.5 $\mu$m while layer (a) was wet. The back side of the support was coated in the same manner. The coated film was subjected to calendering to obtain a magnetic recording medium.

The resulting magnetic recording medium was punched out to obtain a disc of 3.5 in. in diameter. The disc was put in a 3.5 in. cartridge previously having a liner therein, and the cartridge was fitted with prescribed members to obtain a 3.5 in. floppy disc. The resulting sample was designated 7-1.

Samples 7-2 to 7-7 and Comparative Sample 7'-1 were prepared in the same manner as for Sample 7-1, except for making the alterations shown in Table 12 below.

Each sample was evaluated in terms of surface roughness Ra in the same manner as in Example 6 and in terms of initial innermost periphery 2F output. The initial 2F output was relatively expressed by taking that of Sample 7-1 was 100%. A drive "PD 211" manufactured by Toshiba was used. The recording wavelength was 1.428 $\mu$m, leading to $\lambda/50$ = 28.5 nm. The results obtained are shown in Table 12.

TABLE 12

| | Sample No. | | | | | | | |
|---|---|---|---|---|---|---|---|---|
| | 7-1 | 7-2 | 7-3 | 7-4 | -7-5 | 7-6 | 7-7 | 7'-1 |
| Layer (a): | | | | | | | | |
| Inorganic powder | $TiO_2$ rutile | $TiO_2$ rutile | $TiO_2$ rutile | $TiO_2$ rutile | $TiO_2$ rutile | $TiO_2$ rutile | $TiO_2$ rutile | $TiO_2$ rutile |
| Surface coat: | | | | | | | | |
| $Al_2O_3$ (%) | 10 | 0 | 0 | 5 | 5 | 0 | 5 | 0 |
| $SiO_2$ (%) | 0 | 5 | 0 | 3 | 0 | 1 | 3 | 0 |
| $ZrO_2$ (%) | 0 | 0 | 5 | 0 | 1 | 1 | 0.5 | 0 |
| Main component (%) | 90 | 90 | 91 | 90 | 88 | 91 | 85 | 98 |
| $Al_2O_3$/surface coat | 1.000 | 0.000 | 0.000 | 0.625 | 0.833 | 0.000 | 0.588 | 0.000 |
| Thickness (μm) | 2.5 | 2.5 | 2.5 | 2.5 | 2.5 | 2.5 | 2.5 | 2.5 |
| Layer (b): | | | | | | | | |
| d (μm) | 0.5 | 0.5 | 0.5 | 0.5 | 0.5 | 0.5 | 0.5 | 0.5 |
| σ (μm) | 0.09 | 0.06 | 0.07 | 0.05 | 0.08 | 0.07 | 0.06 | 0.25 |
| $^Δ$d (μm) | 0.11 | 0.16 | 0.16 | 0.13 | 0.09 | 0.21 | 0.18 | 0.28 |
| Coating System | | | | successive wet-on-wet coating | | | | |
| Ra (nm) | 16 | 18 | 22 | 8.3 | 9.0 | 12 | 25 | 31 |
| Initial 2F Output (%) | 100 | 98 | 103 | 95 | 96 | 1o1 | 102 | 86 |

As is seen from Table 12, similar to Example 6, the inorganic particles used in the samples according to the present invention have improved dispersibility owing to the surface coat comprising $Al_2O_3$, $SiO_2$, $ZrO_2$, etc. to thereby achieve a low Ra and exhibit satisfactory electromagnetic characteristics. Having no surface coat on the inorganic powder, Comparative Sample 7'-1 has poor dispersibility and, as a result, has high Ra, σ, and Δd and deteriorated electromagnetic characteristics.

EXAMPLE 8

| Coating Composition for Layer (a): | |
|---|---|
| Rutile $TiO_2$ (average particle size: 0.035 μm; $TiO_2$ content: ≧90%; BET specific surface area: 40 m²/g; DBP absorption: 27 to 38 g/100 g; pH: 7) | 80 parts |
| Carbon black (average particle size: 16 mμ; DBP absorption: 80 ml/100 g; pH: 8.0; BET specific surface area: 250 m²/g; volatile content: 1.5%) | 20 parts |
| Vinyl chloride-vinyl acetate-vinyl alcohol copolymer (86:13:1; —N(CH$_3$)$_3$$^+$Cl$^-$ content: 5 × 10$^{-6}$ eq/g; polymerization degree: 400) | 12 parts |
| Polyester polyurethane resin (neopentyl-glycol/caprolactone polyol/MDI = 0.9/2.6/1) —SO$_3$Na content: 1 × 10$^{-4}$ eq/g) | 5 parts |
| Butyl stearate | 1 part |
| Stearic acid | 1 part |
| Methyl ethyl ketone | 200 parts |

The above components were kneaded in an open kneader and dispersed in a sand mill. To the dispersion were added 1 part of polyisocyanate and 40 parts of butyl acetate, followed by filtration through a filter having an average pore size of 1 μm to prepare a coating composition for layer (a).

| Coating Composition for Layer (b): | |
|---|---|
| Ferromagnetic powder: Fe/Zn/Ni alloy (92/4/4; Hc: 1600 Oe; BET specific surface area: 60 m²/g; crystallite size: 195 Å; average major axis length: 0.20 μm; acicular ratio: 7; σ$_s$: 128 emu/g) | 100 parts |
| Vinyl chloride copolymer (—SO$_3$Na content: 1 × 10$^{-4}$ eq/g; polymerization degree: 300) | 12 parts |
| Polyester polyurethane resin (neopentyl-glycol/caprolactone polyol/MDI = 0.9/2.6/1; —SO$_3$Na content: 1 × 10$^{-4}$ eq/g) | 3 parts |
| α-Alumina (average particle size: 0.2 μm) | 2 parts |
| Carbon black (average particle size: 0.10 μm (100 mμ) | 0.5 parts |
| Butyl stearate | 1 part |
| Stearic acid | 2 parts |
| Methyl ethyl ketone | 200 parts |

The above components were kneaded in an open kneader and dispersed in a sand mill. To the dispersion were added 3 parts of polyisocyanate and 40 parts of butyl acetate, followed by filtration through a filter having an average pore size of 1 μm to prepare a coating composition for layer (b).

The coating composition for layer (a) was coated on a 7 μm thick polyethylene terephthalate film support having a centerline average surface roughness of 0.01 μm to a dry thickness of 3 μm. Immediately thereafter while layer (a) was wet, the coating composition for layer (b) was coated thereon to a dry thickness of 0.5 μm (successive wet-on-wet coating). While layers (a) and (b) were wet, the ferromagnetic powder in layer (b) was orientated by applying a magnetic field using a cobalt magnet having a magnetic force of 3000 G and a solenoid having a magnetic force of 1500 G. After drying, the coated film was calendered through 7 stages of metallic rolls at 90° C. and cut to a width of 8 mm to prepare a 8 mm-video tape sample. The resulting sample was designated 8-1.

Samples 8-2 to 8-6 and Comparative Samples 8'-1 to 8'-4 were prepared in the same manner as for Sample 8-1, except for making alterations to the formulation of layer (b) as shown in Table 13 and to the formulation of layer (a) as shown in Table 14 below. In the preparation of Sample 8-4 and Comparative Sample 8'-1, the coating composition for layer (b) was prepared by using a continuous kneader in order to increase the packing of the ferromagnetic powder.

Each of the resulting samples was evaluated as follows. The results obtained are shown in Table 15 below.

7 MHz Output

Signals of 7 MHz were recorded on a sample tape using a 8 mm video deck "FUJI X8" manufactured by Fuji Photo Film Co., Ltd. The output signals were determined with an oscilloscope. A 8 mm tape "SAG P6-120" produced by Fuji Photo Film Co., Ltd. was used as a reference sample.

C/N

7 MHz signals were recorded on a sample tape using a 8 mm video deck "FUJI X8". The noise generated at 6 MHz on reproduction of the recorded signals was measured with a spectrum analyzer, and a ratio of the reproduction output to the noise was obtained.

Percent Thermal Shrinkage

An about 100 mm long sample tape was preserved in a thermostat at 70° C. for 48 minutes without any tension, and the percent change in length before and after the preservation was measured with a comparator.

Skewness

Color bar signals were recorded on a sample tape, and the recorded tape was preserved in a thermostat at 70° C. for 48 hours. After taking out the sample therefrom and confirming that the sample temperature returned to room temperature, the recorded signals were reproduced. Skewness was determined from the change of color bar signals on the reproduced image. One color bar corresponded to 7.48 $\mu$sec.

Running Durability

A sample tape in a cassette P6-120 was played 100 passes on ten 8 mm-video decks "FUJI X8" in an atmosphere of 23° C. and 70% RH. A reduction in output during 100 passes was measured, and the degree of contamination in the inside of the deck was observed after running. Running durability was evaluated according to the following rating system:

Good . . . Five or less contaminated parts are observed.

Medium . . . More than 5 contaminated parts are observed, but causing no jamming.

Bad . . . More than 5 contaminated parts are observed, causing jamming.

"Good to medium" means performance intermediate between "good" and "medium".

TABLE 13

Formulation of Layer (b)

| | Sample No. | | | | | | | | |
|---|---|---|---|---|---|---|---|---|---|
| | 8-1 | 8-2 | 8-3 | 8-4 | 8'-1 | 8'-2 | 8-5 | 8'-3 | 8-6 |
| d ($\mu$m) | 0.5 | 0.5 | 0.5 | 0.5 | 0.5 | 0.5 | 1 | 1.2 | 0.1 |
| $\sigma$ ($\mu$m) | 0.11 | 0.12 | 0.11 | 0.08 | 0.26 | 0.28 | 0.09 | 0.21 | 0.15 |
| Composition (part): | | | | | | | | | |
| Ferromagnetic powder | 100 | 100 | 100 | 100 | 100 | 100 | 100 | 100 | 100 |
| Vinyl chloride Copolymer | 12 | 12 | 12 | 12 | 12 | 12 | 12 | 12 | 12 |
| Urethane | 3 | 3 | 3 | 5 | 5 | 3 | 3 | 3 | 3 |
| Isocyanate | 3 | 3 | 3 | 5 | 5 | 3 | 3 | 3 | 3 |
| $\alpha$-Alumina | 2 | 2 | 8 | 10 | 10 | 2 | 2 | 2 | 2 |
| Ferromagnetic Powder: | | | | | | | | | |
| Bm (gauss) | 3200 | 3000 | 3200 | 3200 | 3200 | 3200 | 3200 | 3200 | 3200 |
| $\sigma_s$ (emu/g) | 130 | 130 | 129 | 121 | 121 | 130 | 130 | 130 | 130 |
| dM (g/cc) | 1.96 | 1.96 | 1.85 | 2.10 | 2.10 | 1.96 | 1.96 | 1.96 | 1.96 |
| Ferromagnetic Powder Volume Ratio (%) | 33.77 | 33.77 | 31.91 | 36.28 | 36.28 | 33.77 | 33.77 | 33.77 | 33.77 |
| $\alpha$-Alumina Volume Ratio (%) | 0.98 | 0.98 | 3.70 | 5.26 | 5.26 | 0.98 | 0.98 | 0.98 | 0.98 |
| Total Powder Volume Ratio (%) | 34.75 | 34.75 | 35.61 | 41.55 | 41.55 | 34.75 | 34.75 | 34.5 | 34.75 |

TABLE 14

Formulation of Layer (a)

| | Sample No. | | | | | | | | |
|---|---|---|---|---|---|---|---|---|---|
| | 8-1 | 8-2 | 8-3 | 8-4 | 8'-1 | 8'-2 | 8-5 | 8'-3 | 8-6 |
| Thickness ($\mu$m) | 2.5 | 2.5 | 2.5 | 2.5 | 2.5 | 2.5 | 2 | 1.8 | 2.5 |
| $TiO_2$ Average Particle Size ($\mu$m) | 0.035 | 0.035 | 0.035 | 0.035 | 0.035 | 0.035 | 0.035 | 0.035 | 0.035 |
| Composition (part): | | | | | | | | | |
| $TiO_2$ | 80 | 100 | 100 | 90 | 90 | 75 | 100 | 100 | 100 |
| Carbon black | 20 | 0 | 0 | 10 | 10 | 25 | 0 | 0 | 0 |
| Vinyl Chloride Copolymer | 12 | 12 | 24 | 20 | 30 | 12 | 12 | 12 | 12 |
| Polyurethane Resin | 5 | 5 | 11 | 15 | 20 | 5 | 5 | 5 | 5 |
| Isocyanate | 1 | 5 | 12 | 15 | 15 | 1 | 5 | 5 | 5 |
| Density (g/cc) | 2.2 | 2.198 | 2.201 | 2.155 | 2.174 | 2.195 | 2.198 | 2.198 | 2.198 |
| $TiO_2$ Volume Ratio (%) | 35.51 | 42.90 | 35.65 | 30.79 | 28.23 | 33.22 | 42.90 | 42.90 | 42.90 |
| Carbon Black Volume Ratio (%) | 20.05 | 0.00 | 0.00 | 7.72 | 7.08 | 25.00 | 0.00 | 0.00 | 0.00 |
| Total Powder Volume Ratio (%) | 55.56 | 42.90 | 35.65 | 38.51 | 35.32 | 58.22 | 42.90 | 42.90 | 42.90 |

TABLE 15

| | Sample No. | | | | | | | | |
|---|---|---|---|---|---|---|---|---|---|
| | 8-1 | 8-2 | 8-3 | 8-4 | 8'-1 | 8'-2 | 8-5 | 8'-3 | 8-6 |
| Difference in Powder Volume Ratio* (%) | 20.81 | 8.14 | 0.04 | -3.04 | -6.23 | 23.47 | 8.14 | 8.14 | 8.14 |
| $^\Delta$d ($\mu$m) | 0.18 | 0.11 | 0.16 | 0.16 | 0.09 | 0.12 | 0.22 | 0.21 | 0.09 |
| Evaluation: | | | | | | | | | |
| Percent Thermal Shrinkage (%) | 0.21 | 0.25 | 0.32 | 0.36 | 0.45 | 0.21 | 0.3 | 0.25 | 0.2 |
| Skewness | 22.05 | 26.25 | 33.6 | 37.8 | 47.25 | 22.1 | 31 | 26.4 | 21 |
| 7 MHZ Output (dB) | 6.7 | 6.6 | 6.2 | 6 | 2.8 | 3.6 | 5.8 | 1.5 | 6.3 |
| C/N (dB) | 2.1 | 2 | 1.8 | 1.8 | 1.7 | 2.2 | 1.6 | 1 | 2 |
| Running Durability | good to medium | good | good | good | good | bad | good | medium | good to medium |

Note:
*(Total powder ratio of layer (a)) - (total powder ratio of layer (b))

The results in Table 15 reveal that each of the samples according to the present invention has a smaller skewness, a smaller σ, and a smaller Δd as compared with the comparative samples and therefore exhibits satisfactory reproduction output, C/N, and running durability. Comparative Sample 8'-1 has a small powder volume ratio in layer (a), giving a small powder volume ratio difference (-6.23%). As a result, it has a high percent thermal shrinkage (0.45%), a large skewness, and a large σ. On the contrary, Comparative Sample 8'-2 has a very high powder volume ratio in layer (a), giving a large powder volume ratio difference (23.47%). It has a large σ and a large Δd and is therefore inferior in running durability, though showing an improvement on skewness. Comparative Sample 8'-3 is inferior in electromagnetic characteristics due to the large thickness of layer (b) thereof (1.2 $\mu$m).

It has now been proved that control of percent thermal shrinkage of a magnetic recording medium at 70° C.×48 hrs is effective to reduce skewness while assuring satisfactory running durability, C/N, and reproduction output. A coated type magnetic recording medium having an extremely thin magnetic layer and still exhibiting such excellent characteristics can be produced in large quantity without being accompanied with coating defects.

EXAMPLE 9

| Coating Composition for Layer (a): | |
|---|---|
| Rutile $TiO_2$ (average particle size: 0.035 $\mu$m; $TiO_2$ content: ≧90%; BET specific surface area: 40 m$^2$/g; DBP absorption: 27 to 38 g/100 g; pH: 7) | 80 parts |
| Carbon black (average particle size: 16 m$\mu$; DBP absorption: 80 ml/100 g; pH: 8.0; BET specific surface area: 250 m$^2$/g; volatile content: 1.5%) | 20 parts |
| Vinyl chloride-vinyl acetate-vinyl alcohol copolymer (86:13:1; —N(CH$_3$)$_3$$^+$Cl$^-$ content 5 × 10$^{-6}$ eq/g; polymerization degree: 400) | 12 parts |

| Coating Composition for Layer (a): | |
|---|---|
| Polyester polyurethane resin (neopentyl-glycol/caprolactone polyol/MDI = 0.9/2.6/1; —SO$_3$Na content: 1 × 10$^{-4}$ eq/g) | 5 parts |
| Butyl stearate | 1 part |
| Stearic acid | 1 part |
| Methyl ethyl ketone | 200 parts |

The above components were kneaded in a continuous kneader and dispersed in a sand mill. To the dispersion were added 1 part of polyisocyanate and 40 parts of butyl acetate, followed by filtration through a filter having an average pore size of 1 μm to prepare a coating composition for layer (a).

| Coating composition for Layer (b): | |
|---|---|
| Ferromagnetic powder: Fe/Zn/Ni alloy (92/4/4; Hc: 1600 Oe; BET specific surface area: 60 m$^2$/g; crystallite size: 195 Å; average major axis length: 0.20 μm; acicular ratio: 10; σ$_s$: 130 emu/g) | 100 parts |
| Vinyl chloride copolymer (—SO$_3$Na content: 1 × 10$^{-4}$ eq/g; polymerization degree: 300) | 12 parts |
| Polyester polyurethane resin (neopentyl-glycol/caprolactone polyol/MDI = 0.9/2.6/1; —SO$_3$Na content: 1 × 10$^{-4}$ eq/g) | 3 parts |
| α-Alumina (average particle size: 0.3 μm) | 2 parts |
| Carbon black (average particle size: 0.10 μm (100 mμ) | 0.5 pats |
| Butyl stearate | 1 part |
| Stearic acid | 2 parts |
| Methyl ethyl ketone | 200 parts |

The above components were kneaded in a continuous kneader and dispersed in a sand mill. To the dispersion were added 3 parts of polyisocyanate and 40 parts of butyl acetate, followed by filtration through a filter having an average pore size of 1 μm to prepare a coating composition for layer (b).

The coating composition for layer (a) was coated on a 7 μm thick polyethylene terephthalate film support having a centerline average surface roughness of 0.01 μm to a dry thickness of 2 μm. Immediately thereafter while layer (a) was wet, the coating composition for layer (b) was coated thereon to a dry thickness of 0.5 μm (successive wet-on-wet coating). While layers (a) and (b) were wet, the ferromagnetic powder in layer (b) was orientated by applying a magnetic field using a cobalt magnet having a magnetic force of 3000 G and a solenoid having a magnetic force of 1500 G. After drying, the coated film was calendered through 7 stages of metallic rolls at 90° C. and cut to a width of 8 mm to prepare a 8 mm-video tape sample. The resulting sample was designated 9-1.

Samples 9-2 to 9-7 and Comparative Samples 9'-1 to 9'-4 were prepared in the same manner as for Sample 9-1, except for making alterations as shown in Tables 16 and 17 below.

Sample 9-8 was prepared in the same manner as for Sample 9-1, except for using the following composition for layer (b)

| Coating Composition for Layer (b): | |
|---|---|
| Ferromagnetic powder: Ba ferrite (Hc: Oe; BET specific surface area: m$^2$/g; crystallite size: Å; average plate diameter: μm; aspect ratio: ; σ$_s$: emu/g) | 100 parts |
| Vinyl chloride copolymer (—SO$_3$Na content: 1 × 10$^{-4}$ eq/g; polymerization degree: 300) | 12 parts |
| Polyester polyurethane resin (neopentyl-glycol/caprolactone polyol/MDI = 0.9/2.6/1; —SO$_3$Na content: 1 × 10$^{-4}$ eq/g) | 3 parts |
| α-Alumina (average particle size: 0.3 μm) | 5 parts |
| Carbon black (average particle size: 0.10 μm (100 mμ) | 0.5 parts |
| Butyl stearate | 1 part |
| Stearic acid | 2 parts |
| Methyl ethyl ketone | 200 parts |

Each of the resulting samples was evaluated according to the following test methods, and the results obtained are shown in Tables 16 and 17.

SMD, STD, Stiffness Ratio (SMD/STD)

A 8 mm wide and 50 mm long specimen punched out of a sample tape was made into a loop. A force required for causing a displacement of 5 mm into the inner diameter direction at a rate of displacement of 5 mm/sec was measured for each of machine direction and transverse directions by the use of a loop stiffness tester manufactured by Toyo Seiki K.K. From the thus obtained SMD and STD values is obtained a stiffness ratio, SMD/STD.

Envelope Flatness

7 MHz signals were recorded on a tape sample by using a 8-mm video deck "FUJI X8". On reproduction of the signals, the output signals were observed with an oscilloscope. An envelope flatness is a difference between the maximum output and the minimum output in one field.

7 MHz Output

7 MHz signals were recorded on a tape sample by using a 8 mm video deck "FUJI X8". On reproduction of the signals, the reproduction outputs of 7 MHz signals were observed with an oscilloscope. A 8-mm tape "SAG P6-120" produced by Fuji Photo Film Co., Ltd. was used as a reference sample.

C/N

7 MHz signals were recorded on a sample tape using a 8-mm video deck "FUJI X8". The noise generated at 6 MHz on reproduction of the recorded signals was measured with a spectrum analyzer, and a ratio of the reproduction output to the noise was obtained.

Running Durability

A sample tape in a cassette P6-120 was played 100 passes on ten 8 mm-video decks "FUJI X8" in an atmosphere of 23° C. and 70% RH. A reduction in output during 100 passes was measured. Running durability was evaluated according to the following rating system:

Good . . . Output reduction within 2 dB

Medium . . . Output reduction of from 2 to 4 dB

Bad . . . Output reduction of more than 4 dB or occurrence of jamming

Pinholes

A magnetic layer of a sample before formation of a back layer was observed with transmitted white light with naked eye to count the number of pinholes per 100 m². A satisfactory level is 1 per 100 m².

improved contact with a head and reduced envelope flatness. It also seen that these samples are free from coating defects and have a small σ so that they are excellent in running durability, output, and C/N ratio. Using carbon having a Mohs hardness of 2 in layer (a), Comparative Sample 9'-1 has a low STD, failing to obtain a prescribed SMD/STD

TABLE 16

|  | Sample No. | | | | | |
| --- | --- | --- | --- | --- | --- | --- |
|  | 9-1 | 9-2 | 9'-1 | 9-3 | 9'-2 | 9-4 |
| Layer (a) Inorganic Powder: | | | | | | |
| Kind | TiO$_2$ | silica | carbon | TiO$_2$ | TiO$_2$ | TiO$_2$ |
| Mohs Hardness | 7 | 6 | 2 | 7 | 7 | 7 |
| Average Particle Size (μm) | 0.035 | 0.05 | 0.02 | 0.07 | 0.1 | 0.035 |
| Layer (a) Thickness (μm) | 2.5 | 2.5 | 2.5 | 2.5 | 2.5 | 2 |
| Layer (b) Ferromagnetic Powder | Fe—Ni | Fe—Ni | Fe—Ni | Fe—Ni | Fe—Ni | Fe—Ni |
| Layer (b) Thickness d (μm) | 0.5 | 0.5 | 0.5 | 0.5 | 0.5 | 1 |
| σ (μm) | 0.08 | 0.11 | 0.25 | 0.09 | 0.21 | 0.15 |
| $^\Delta$d (μm) | 0.16 | 0.16 | 0.27 | 0.13 | 0.28 | 0.35 |
| Support Thickness (μm) | 10 | 10 | 10 | 10 | 10 | 10 |
| Total Tape Thickness (μm) | 13.5 | 13.5 | 13.5 | 13.5 | 13.5 | 13.5 |
| Coating System | successive wet-on-wet coating | | | | | |
| Evaluation: | | | | | | |
| STD (mg) | 82 | 75 | 46 | 80 | 65 | 83 |
| SMD (mg) | 110 | 105 | 90 | 105 | 125 | 111 |
| Stiffness Ratio | 1.34 | 1.40 | 1.96 | 1.31 | 1.92 | 1.34 |
| Envelope Flatness (dB) | −0.3 | −0.5 | −2.5 | −0.2 | −2.2 | −0.1 |
| 7 MHz Output (dB) | 6.5 | 6.4 | 1.2 | 6.3 | 2.1 | 6.6 |
| C/N (dB) | 7.8 | 6.9 | 2.1 | 7.5 | 3.5 | 7.7 |
| Running Durability | good | good | bad | medium | good | good |
| Pinholes (/100 m²) | 0 | 0 | 0 | 0 | 0 | 0 |

TABLE 17

|  | Sample No. | | | | |
| --- | --- | --- | --- | --- | --- |
|  | 9-5 | 9'-3 | 9-4 | 9-5 | 9-7 |
| Layer (a) Inorganic Powder: | | | | | |
| Kind | TiO$_2$ |  | TiO$_2$ | α-Al$_2$O$_3$ | TiO$_2$ |
| Mohs Hardness | 7 |  | 7 | 9 | 7 |
| Average Particle Size (μm) | 0.035 |  | 0.035 | 0.05 | 0.035 |
| Layer (a) Thickness (μm) | 2.8 |  | 1.8 | 2.5 | 2.8 |
| Layer (b) Ferromagnetic Powder | Fe—Ni | Fe—Ni | Fe—Ni | Fe—Ni | Ba ferrite |
| Layer (b) Thickness d (μm) | 0.2 |  | 1.2 | 0.5 | 0.2 |
| σ (μm) | 0.10 | — | 0.12 | 0.08 | 0.09 |
| $^\Delta$d (μm) | 0.06 | — | 0.25 | 0.22 | 0.05 |
| Support Thickness (μm) | 10 | 12.5 | 10 | 10 | 10 |
| Total Tape Thickness (μm) | 13.5 | 13 | 13.5 | 13.5 | 13.5 |
| Coating System | successive wet-on-wet | single layer | successive wet-on-wet | successive wet-on-wet | successive wet-on-wet |
| Evaluation: | | | | | |
| STD (mg) | 81 | failure of sample preparation | 83 | 92 | 90 |
| SMD (mg) | 106 |  | 110 | 115 | 95 |
| Stiffness Ratio | 1.31 |  | 1.33 | 1.25 | 1.06 |
| Envelope Flatness (dB) | −0.1 |  | −0.1 | −0.1 | −0.5 |
| 7 MHz Output (dB) | 7.1 |  | 1.5 | 7.1 | 5.5 |
| C/N (dB) | 8.5 |  | 1.2 | 8 | 6.8 |
| Running Durability | good |  | good | good | good |
| Pinholes (/100 m²) | 0 | 550 | 0 | 0 | 0 |

As can be seen from Tables 16 and 17, the samples according to the present invention having its SMD/STD ratio controlled within a range of from 1.0 to 1.9 exhibit ratio and to improve envelope flatness, σ, and running durability. Using an inorganic powder having a large average particle size, Comparative Sample 9'-2 shows no improvement in envelope flatness or σ. In the preparation of Comparative Sample 9'-3, which is an example of using no lower layer, the magnetic layer suffered from coating defects, giving no sample for evaluation. Since Comparative Example 9'-4 has a thick magnetic layer (1.2 μm), it achieved improvements in envelope flatness and running durability, though inferior in electromagnetic characteristics.

EXAMPLE 10

A polyethylene terephthalate film support (thickness: 10 μm; F5 value: 20 kg/mm² in MD, 14 kg/mm² in TD; Young's modulus: 750 kg/mm² in MD, 470 kg/mm² in TD) (hereinafter abbreviated as PET support) or a polyethylene terenaphthalate film support (thickness: 7 μm; F5 value: 22 kg/mm² in MD, 18 kg/mm² in TD; Young's modulus: 750 kg/mm² in MD, 750 kg/mm² in TD) (hereinafter abbreviated as PEN support) was used.

| Coating composition for Subbing Layer: | |
|---|---|
| —SO$_3$Na-Containing polyester resin (Tg: 65° C.; Na content: 4600 ppm) | 100 parts |
| Cyclohexanone | 9900 parts |

The above composition was stirred in a dispersing stirrer for 12 hours, and the resulting coating composition was coated on the PET or PEN support with a bar coater to a dry thickness of 0.1 μm.

| Coating Composition for Layer (a): | |
|---|---|
| Rutile TiO$_2$ (average particle size: 0.035 μm; TiO$_2$ content: ≧90%; surface treating agent: Al$_2$O$_3$; BET specific surface area: 35 to 45 m²/g; true specific gravity: 4.1; pH: 6.5 to 8.0) | 85 parts |
| Carbon black (average particle size: 16 mμ; DBP absorption: 80 ml/100 g; pH: 8.0; BET specific surface area: 250 m²/g; coloring power: 143%) | 5 parts |
| Vinyl chloride copolymer (—SO$_3$Na content: 8 × 10$^{-5}$ eq/g; containing —OH and epoxy groups; Tg: 71° C.; polymerization degree: 300; Mn: 12000; Mw: 38000) | 13 parts |
| Polyurethane resin (—SO$_3$Na content: 8 × 10$^{-5}$ eq/g; —OH content: 8 × 10$^{-5}$ eq/g; Tg: 38° C.; Mw: 50000) | 5 parts |
| Cyclohexane | 100 parts |
| Methyl ethyl ketone | 100 parts |

The above components were mixed and dispersed in a sand mill for 4 hours. To the mixture were added 5 parts of polyisocyanate (Coronate L), 1 part of oleic acid, 1 part of stearic acid, and 1.5 part of butyl stearate to prepare a coating composition for layer (a).

| Coating Composition of Layer (b): | |
|---|---|
| Ferromagnetic powder: Fe/Co/Ni alloy (92:6:2; Hc: 1600 Oe; σ$_s$: 119 emu/g; major axis length: 0.13 μm; acicular ratio: 7; crystallite size: 172 Å; water content: 0.6%) | 100 parts |
| Vinyl chloride copolymer (—SO$_3$Na | 13 parts |

| Coating Composition of Layer (b): | |
|---|---|
| content: 8 × 10$^{-5}$ eq/g; containing —OH and epoxy group; Tg: 71° C.; polymerization degree: 300; number average molecular weight (Mn): 12000; weight average molecular weight (Mw): 38000) | |
| Polyurethane resin (—SO$_3$Na content: 8 × 10$^{-5}$ eq/g; —OH content: 8 × 10$^{-5}$ eq/g; Tg: 38° C.; Mw: 50000) | 5 parts |
| α-Alumina (average particle size: 0.15 μm; BET specific surface area: 8.7 m²/g; pH: 8.2; water content: 0.06%) | 12 parts |
| Cyclohexanone | 150 parts |
| Methyl ethyl ketone | 150 parts |

The above components were mixed and dispersed in a sand mill for 6 hours. To the mixture were added 5 parts of polyisocyanate (Coronate L), 1 part of oleic acid, 1 part of stearic acid, and 1.5 part of butyl stearate to prepare a coating composition for layer (b).

On the subbing layer side of the support was simultaneously coated with the coating compositions for layers (a) and (b) by use of two doctor blades set at different gaps to form layer (a) having a dry thickness of 3.0 μm and layer (b) having a dry thickness of 0.3 μm. The ferromagnetic powder in layer (b) was orientated with a permanent magnet of 3500 G and a solenoid of 1600 G. After drying, the coated film was supercalendered through metallic rolls at 80° C. and cut to a width of 8 mm to prepare a 8 mm-video tape sample.

| Coating Composition for Back Layer: | |
|---|---|
| Carbon black (BET specific surface area: 220 m²/g; average particle size: 17 mμ; DBP absorption: 75 ml/100 g; volatile content: 1.5%; pH: 8.0; bulk density: 15 lbs/ft³) | 100 parts |
| Nitrocellulose "RS1/2" | 100 parts |
| Polyester polyurethane "Nippollan" (produced by Nippon Polyurethane Co., Ltd.) | 30 parts |
| Dispersing agent: | |
| Copper oleate | 10 parts |
| Copper phthalocyanine | 10 parts |
| Barium sulfate (precipitated) | 5 parts |
| Methyl ethyl ketone | 500 parts |
| Toluene | 500 parts |

The above components were preliminarily kneaded and then kneaded in a roll mill. To 100 parts of the resulting dispersion were added 100 parts of carbon black (BET specific surface area: 200 m²/g; average particle size: 200 mμ; DBP absorption: 36 ml/100 g; pH: 8.5) and 0.1 part of α-Al$_2$O$_3$ (average particle size: 0.2 μm), and the mixture was dispersed in a sand grinder, followed by filtration. To 100 parts of the resulting dispersion were further added 120 parts of methyl ethyl ketone and 5 parts of polyisocyanate to prepare a coating composition for a back layer.

The resulting coating composition was coated on the non-magnetic support on the side opposite to layer (b) with a bar coater to a dry thickness of 0.5 μm. The resulting magnetic recording medium was cut to a width of 8 mm to prepare a 8-mm video tape. The sample using a PET support was designated sample 10-1, and that using a PEN support Sample 10-2.

Each of Samples 10-1 and 10-2 was evaluated according to the following test methods.

1) TEM Observations

A sample was sliced with a diamond cutter to prepare an about 0.1 μm thick specimen. The specimen was photographed with TEM. The interface between layers (a) and (b) and the surface of layer (b) were marked, and the thickness of layer (b) was measured with an image analyzer "IBAS II" to obtain an average d and a standard deviation σ.

As a result, layer (b) had an average dry thickness d of 0.45 μm. A layer (b) thickness suitable for practical use was proved to be not more than 1 μm, and particularly not more than 0.6 μm. The standard deviation σ of the layer (b) thickness variation was found to be not more than 0.08 μm. A practically useful σ was proved to be not more than 0.2 μm, and particularly not more than 0.1 μm. The same measurements on Sample 2-4 gave d=0.28 μm, and σ=0.06 μm.

The above-prepared sample was stretched to have layer (b) released from the support, and layer (b) was scraped off with a cutter blade. The thus removed layer (b) weighing 500 mg was refluxed in 100 ml of a 1N NaOH/methanol solution for 2 hours to hydrolyze the binders. The supernatant liquor was removed with the ferromagnetic powder of greater specific gravity being precipitated. The solid was washed three times with water and then three times with tetrahydrofuran, followed by drying in a vacuum drier at 50° C. The resulting ferromagnetic powder was dispersed in collodion and observed under TEM (×60000). The ferromagnetic powder was found to have a major axis length of 0.13 μm and an acicular ratio of 10. The same measurements revealed that the ferromagnetic-powder used in Sample 2-2 had a major axis length of 0.25 μm and an acicular ratio of 15. It was proved that a major axis length should be not more than 0.4 μm, and preferably not more than 0.3 μm, for practical use and that an acicular ratio should fall within a range of from 2 to 20, and preferably from 2 to 15, for practical use.

2) Atomic Force Microscope (AFM)

Surface roughness $R_{rms}$ was obtained by scanning the surface of layer (b) with "Nanoscope II" manufactured by Digital Instrument Co. over an area of 6 μm×6 μm at a tunnel current of 10 nA and a bias voltage of 400 mV.

As a result, $R_{rms}$ was 6 nm. It was proved that $R_{rms}$ should no not more than 20 nm, and preferably not more than 10 nm, for practical use. The data of Example 2 can also be referred to.

3) Surface Roughness Tester

Surface roughness was measured using 3d-MIRAU. Centerline surface roughness (Ra), $R_{rms}$, and peak-to-valley value of layer (b) over an area of about 250 μm×250 μm were measured according to a MIRAU method by means of "TOPO 3D" manufactured by WYKO K.K. Spherical corrections and cylindrical corrections were made at a measuring wavelength of about 650 nm. This testing system is a non-contact roughness tester utilizing interference of light.

As a result, Ra was 2.7 nm. It was proved that a practically useful Ra is from 1 to 4 nm, and particularly from 2 to 3.5 nm. $R_{rms}$ was 3.5 nm. A practically useful $R_{rms}$ is from 1.3 to 6 nm, and particularly from 1.5 to 5 nm. P-V value was between 20 and 30 nm. A practically useful P-V value is not more than 80 nm, and particularly from 10 to 60 nm.

4) Vibrating Sample Magnetometer

Magnetic characteristics of the sample were measured at Hm of 5 kOe with VSM manufactured by Toei Kogyo K.K. The result were Hc: 1620 Oe; Hr (90°): 1800 Oe; Br/Bm: 0.82; SFD: 0.583. For practical use, it was proved that Hc should be from 1500 to 2500 Oe, and preferably from 1600 to 2000 Oe; Hr (90°) should be from 1000 to 2800 Oe, and preferably from 1200 to 2500 Oe; Br/Bm should be at least 0.75, and preferably at least 0.8; and SFD should be 0.7 or less, and preferably 0.6 or less.

The same measurements on the samples prepared in Example 4 gave similar results.

5) X-Ray Diffraction

X-ray diffractometry was conducted using the ferromagnetic powder sampled from layer (b) in (1) above. The magnetic tape was directly set on an X-ray diffractometer. A crystallite size of the ferromagnetic powder was obtained from the half-width value of the diffraction pattern of the faces (1,1,0) and (2,2,0). As a result, the crystallite size was 180 Å. For practical use, a crystallite size is preferably not more than 400 Å, and more preferably from 100 to 300 Å. The same measurements on Sample 6-2 gave 280 Å.

6) Tensile Test

Young's modulus, yield stress, and yield elongation of the magnetic tape were measured with a tensile tester "STM-T-50BP" manufactured by Toyo Baldwin K.K. in an atmosphere of 23° C. and 70% RH at a rate of pulling of 10%/min.

As a result, the sample had a Young's modulus of 700 kg/mm$^2$, a yield stress of from 6 to 7 kg/mm$^2$, and a yield elongation of 0.8%. For practical use, a Young's modulus preferably ranges from 400 to 2000 kg/mm$^2$, and more preferably from 500 to 1500 kg/mm$^2$; a yield stress preferably ranges from 3 to 20 kg/mm$^2$, and more preferably from 4 to 15 kg/mm$^2$; a yield elongation preferably ranges from 0.2 to 8%, and more preferably from 0.4 to 5%.

7) Stiffness in Flexure, Loop Stiffness

Stiffness in flexure was expressed in terms of a force (mg) required for giving a 5 mm displacement to a 8 mm wide and 50 mm long sample in a loop form with use of a loop stiffness tester at a rate of displacement of about 3.5 mm/sec.

As a result, the 8 mm wide p6-120 tape having a thickness of 10.5 μm had a stiffness between 40 and 60 mg. With a thickness of 10.5±1 μm, a preferred stiffness is from 20 to 90 mg, and particularly from 30 to 70 mg, for practical use. With a thickness of 11.5 μm or more, a preferred stiffness is from 40 to 200 mg. With a thickness of 9.5 μm or less, a preferred stiffness is from 10 to 70 mg.

8) Elongation at Failure

Elongation at cracking was measured at 23° C. and 70% RH. A 10 cm long specimen was pulled at both ends thereof at a rate of 0.1 mm/sec while microscopically observing the surface of layer (b). The elongation (%) at which 5 or more clear cracks developed on the surface of layer (b) was measured.

As a result, the sample had an elongation at cracking of 4%. The same measurement on Sample 8-4 gave a result of 12%. It was proved that a preferred elongation at cracking is not more than 20%, and particularly not more than 10%, for practical use.

9) ESCA

Cl/Fe spectrum α and N/Fe spectrum β were measured with an X-ray photoelectric spectrophotometer (manufactured by Perkin-Elmer Co.) at 300 W using an Mg anode as an X-ray source. After washing away the lubricant in the sample with n-hexane, the sample was set in an X-ray photoelectric spectrophotometer at a distance of 1 cm from the X-ray source. After 5 minutes from evacuation, Cl-2P spectrum, N-1S spectrum, and Fe-2P (3/2) spectrum were integrated for 10 minutes. A pass energy was fixed at 100 eV. An integrated intensity ratio of the Cl-2P spectrum to the Fe-2P (3/2) spectrum was calculated to obtain α. An integrated intensity ratio of the N-1S spectrum to the Fe-2P (3/2) spectrum was calculated to obtain β.

As a result, α was 0.45, and β was 0.07. The same measurements on Sample 3-5 gave α of 0.32 and β of 0.10. It was proved that a practically preferred range of α is from 0.3 to 0.6, and particularly from 0.4 to 0.5, and that of β is from 0.03 to 0.12, and particularly from 0.04 to 0.1.

10) Dynamic Viscoelastometer

Dynamic viscoelasticity of the sample was measured at 110 Hz with a dynamic viscoelastometer "Rheovibron" manufactured by Toyo Baldwin Co. The peak temperature at E" was taken as Tg. This measurement system comprises adding vibration to one end of the tape and measuring the vibration transmitted to the other end.

It was found, as a result, that Tg was 73° C.; E' (50° C.) was $4 \times 10^{10}$ dyne/cm$^2$; and E" (50° C.) was $1 \times 10^{11}$. It was proved that a practically preferred range of Tg is from 40 to 120° C., and particularly from 50 to 110° C., that of E' (50° C.) is from $0.8 \times 10^{11}$ to $11 \times 10^{11}$ dyne/cm$^2$, and particularly from $1 \times 10^{11}$ to $9 \times 10^{11}$ dyne/cm$^2$, and that of E" (50° C.) is from $0.5 \times 10^{11}$ to $8 \times 10^{11}$ dyne/cm$^2$, and particularly from $0.7 \times 10^{11}$ to $5 \times 10^{11}$ dyne/cm$^2$.

11) Adhesive Strength

Adhesive tape produced by 3M was adhered onto a 8 mm wide sample, and a 180° peel strength between the support and the magnetic layer was measured at 23° C. and 70% RH.

As a result, the adhesive strength was 50 g. The same measurement on Sample 3-1 gave an adhesive strength of 25 g. It was proved that an adhesive strength is preferably 10 g or more, and particularly 20 g or more, for practical use.

12) Wearability

The sample was placed on a slide glass with both ends thereof fixed with adhesive tape, and a steel ball 6.25 mm in diameter was slid thereon under a load of 50 g. In this case, the ball was once slid over a distance of 20 mm at a speed of 20 mm/sec and then moved to a fresh magnetic layer surface, where the same sliding was repeated 20 times. Thereafter, the sliding surface of the steel ball was observed with a microscope (×40) to obtain its diameter, assuming the sliding surface being a circle. The abrasion wear was calculated from the measured diameter.

As a result, the abrasion wear was found to be $0.7 \times 10^{-5}$ to $1.1 \times 10^{-5}$ mm$^3$. The result of the same measurement on Sample 3-2 was $4 \times 10^{-5}$ mm$^3$. For practical use, the abrasion wear was from $0.1 \times 10^{-5}$ to $5 \times 10^{-5}$ mm$^3$, and particularly from $0.4 \times 10^{-5}$ to $2 \times 10^{-5}$ mm$^3$.

13) Scanning Electron Microscope (SEM)

Five micrographs were taken of the surface of layer (b) with SEM "S-900" manufactured by Hitachi, Ltd. (×5000). The average number of abrasive grains was found to be $0.2/\mu m^2$. That of Sample 4-6 was found to be $0.4/\mu m^2$. It was proved that a practically usually number of abrasive grains is at least $0.1/\mu m^2$, and particularly from 0.12 to 0.5 /$\mu m^2$.

14) Gas Chromatography (GC)

A specimen having an area of 20 cm$^2$ was heated to 120° C., and the residual solvent was measured with a gas chromatograph "GC-14A" manufactured by Shimazu Seisakusho Ltd.

As a result, the residual solvent was 8 mg/m$^2$. The result of the same measurement on Sample 1-1 was 18 mg/m$^2$. It was found that a residual solvent is preferably not more than 50 mg/m$^2$, and particularly not more than 20 mg/m$^2$, for practical use.

15) Sol Fraction

A weight ratio of tetrahydrofuran-soluble solid contents of the magnetic layer to the magnetic layer was found to be 7%. That of Sample 1-1 was 5%. It was proved that a sol fraction is preferably not more than 15%, and particularly not more than 10%, for practical use.

16) Magnetic Development Pattern

Short wave recording at 1 MHz was conducted on the 8 mm magnetic recording tape by using a video tape recorder "EVO-9500" produced by Sony Corporation. The recorded tape was trimmed to obtain only the recorded portion measuring 5 mm in width and subjected to magnetic development by treating with a solution of Ferricolloid (produced by Taiho Kogyo K.K.; particle size: about 100 ÅA) and then soaked in a ligroin solution for 24 hours. The thus treated tape was photographed with a differential interference microscope produced by Nippon Kogaku K.K. at a magnification of 10 with blue interference color. Visual observation of the micrographs revealed that no black or white line appears on those samples whose magnetic layer has an even thickness, but an increase in variation of the magnetic layer thickness is attended by appearance of black or white lines. These lines correspond to the portion suffering from unevenness of thickness. It is desirable that the number of such black and white lines within 5 mm width should be 5 or less. Further, the difference in density between the white lines and black lines as measured with a microdensitometer is preferably not more than 0.2, and more preferably not more than 0.1.

17) Coefficient of Friction ($\mu$)

The 8 mm tape was run in contact with a rod of SUS 420J (diameter: 4 mm) under a tension of 20 g (T1) at a lap angle of about 180° C. The tension (T2) necessary for running the tape at a speed of 14 mm/sec was measured. The coefficient of friction ($\mu$) was obtained according to equation:

$$\mu = (1/\pi) \cdot \ln(T1/T2)$$

As a result, $\mu$ on the magnetic surface was 0.3. For practical use, $\mu$ on the magnetic surface preferably ranges from 0.15 to 0.4, and more preferably from 0.2 to 0.35. $\mu$ on the back layer was 0.2. It was proved that $\mu$ on the back side is preferably from 0.15 to 0.4, and more particularly from 0.2 to 0.35, for practical use.

The coefficient of friction is chiefly influenced by the magnetic substance, abrasive, carbon black, lubricants, and dispersing agents used.

18) Contact Angle

A drop of water or methylene iodide was put on the magnetic layer, and the contact angle was measured with a microscope.

The contact angle with water was 90°, and that with methylene iodide was 20°. For practical use, it was proved that a contact angle with water is preferably from 60° to 130°, and particularly from 80° to 120°, and that with methylene chloride is preferably from 10° to 90°, and particularly from 10° to 70°.

These contact angles are decided particularly by the lubricating agent or dispersing agent used.

19) Surface Free Energy

Surface free energy of the magnetic layer and the back layer was measured according to the method described in JP-A-3-119531, D. K. Owens, *J. Appl. Polymer Sci.*, Vol. 13 (1969), and J. Panzer, *J. Colloid & Interfacial Sci.*, Vol. 44, No. 1.

As a result, the surface free energies of the magnetic layer and the back layer were both 40 dyne/cm. It was proved that a practically preferred surface free energy was from 10 to 100 dyne/cm.

The surface free energy is decided particularly by lubricating agents or dispersing agents used.

20) Surface Resistivity

A 8 mm wide specimen was set over a pair of electrodes having a cross section of a quarter of a circle 10 mm in radius, placed 8 mm apart, and surface resistivity was measured with a digital surface resistivity meter "TR-8611 A" manufactured by Takeda Riken K.K.

The surface resistivity both of the magnetic layer and the back layer was $1 \times 10^6$ Ω/sq. It was found that the surface resistivity is preferably not more than $1 \times 10^9$ Ω/sq, and particularly not more than $1 \times 10^8$ Ω/sq, for practical use.

The surface resistivity is decided by ferromagnetic powders, binders, carbon black, etc. used.

Samples 10-1 and 10-2 were compared with commercially available 8-mm video tapes according to the above-mentioned test methods or commonly employed methods, and the results obtained are shown in Table 18. Standards for rating the results were as follows.

| Jitter: | |
|---|---|
| Good . . . | less than 0.2 μsec |
| Bad . . . | 0.2 μsec or more |
| Preservation Stability: | |
| Good . . . | No rust occurred after preservation at 60° C. and 90% RH for 10 days. |
| Bad . . . | Rust occurred after preservation at 60° C. and 90% RH for 10 days. |
| Running Durability: | |
| Good . . . | No jamming lasting 30 seconds or longer occurred during 50 passes on a 8-min video deck. |
| Bad . . . | Jamming lasting 30 seconds or longer occurred during 50 passes on a 8-mm video deck. |
| Scratch Resistance: | |
| Good . . . | No scratches were visually perceived after 10 minutes running in a still mode. |
| Bad . . . | Scratches were visually perceived after 10 minutes running in a still mode. |

TABLE 18

| | Sample 10-1 | Sample 10-2 | Single-Coated Metal Tape[1] | Deposited Tape[2] |
|---|---|---|---|---|
| Electromagnetic Characteristics: | | | | |
| 7 MHz Output (dB) | 5.5 | 6.0 | 3.0 | 6.2 |
| C/N (dB) | 4.3 | 4.5 | 2.0 | 4.1 |
| Color S/N (dB) | 2.5 | 2.6 | 2.5 | −3.0 |
| Video S/N (dB) | 2.1 | 2.3 | 1.5 | 0.5 |
| Durability: | | | | |
| Dropout | 40 | 30 | 30 | 580 |
| BER ($\times 10^{-5}$) | 4 | 2 | 50 | 80 |
| Jitter | good | good | good | bad |
| Still | ≧30 min | ≧30 min | ≧30 min | ≧30 min |
| Head Wear (μm/100 hr) | 1.2 | 1.4 | 2.0 | 0.2 |
| Preservation Stability (60° C., 90% RH) | good | good | good | bad |
| Running Durability | good | good | good | bad |
| Scratch Resistance | good | good | good | medium to bad |

Note:
[1]: Product of Fuji Photo Film Co., Ltd.; Lot No. 407209M
[2]: Product of Sony Corporation; Lot No. 709011CD

EXAMPLES 11

Example 11 relates to means (A).

| Coating Composition for Layer (a-A): | |
|---|---|
| Inorganic powder α-Fe$_2$O (average particle size: 0.27 μm; BET specific surface area: 18 m$^2$/g; pH: 5.5) | 80 parts |
| Carbon black (average primary particle diameter: 16 mμ; DBP absorption: 80 ml/100 g; pH: 8.0; BET specific surface area: 250 m$^2$/g; volatile content: 1.5%) | 20 parts |
| Vinyl chloride-vinyl acetate-vinyl alcohol (86:13:1) copolymer (polar group (—N(CH$_3$)$_3^+$Cl$^{-1}$) content: $5 \times 10^{-6}$ eq/g; degree of polymerization: 400) | 12 parts |
| Polyester polyurethane resin (neopentyl glycol/caprolactone polyol/diphenylinethane-4,4',-diisocyanate (MDI) = 0.9/2.6/1; —SO$_3$Na content: $1 \times 10^{-4}$ eq/g) | 5 parts |
| Butyl stearate | 1 part |
| Stearic acid | 1 part |
| Copper oleate | 1 part |
| Methyl ethyl ketone | 200 parts |

The above components were kneaded in a continuous kneader and dispersed in a sand mill. Five parts of polyisocyanate were added to the dispersion, and 40 parts of butyl acetate was further added. The dispersion was filtered through a filter having an average pore size of 1 μm to prepare a coating composition for lower non-magnetic layer (a-A). An α-Fe$_2$O$_3$ to carbon black ratio in the composition was 8/2.

Coating Composition for Layer (a-B)

A coating composition for lower non-magnetic layer (a-B) was prepared in the same manner as for the coating composition for layer- (a-A), except for increasing the amount of butyl acetate to 350 parts for dilution.

Coating Compositions for Layers (a-C), (a-D), (a-E), and (a-F)

A coating composition for lower non-magnetic layer (a-C), (a-D) or (a-E) was prepared in the same manner as for layer (a-A), except for changing the α-Fe$_2$O$_3$ to carbon black ratio to 9/1, 5/5, or 4/6, respectively.

A coating composition for lower non-magnetic layer (a-F) was prepared in the same manner as for layer (a-A), except for using no carbon black.

Coating Composition for Layer (a-G)

A coating composition for lower non-magnetic layer (a-G) was prepared in the same manner as for layer (a-A), except for using no polyisocyanate.

Coating Composition for Layer (a-H)

A carbon black dispersion was prepared by kneading the following components in a continuous kneader and then dispersing in a sand grinder.

| | |
|---|---|
| Carbon black (average primary particle diameter: 16 m82 ; DBP absorption: 80 ml/100 g; pH: 8.0; BET specific surface area: 250 m$^2$/g; volatile content: 1.5%) | 100 parts |
| Vinyl chloride-vinyl acetate-vinyl alcohol (86:13:1) copolymer (polar group (—N(CH)$_3$$^+$Cl$^-$) content: 5 × 10$^{-6}$ eg/g.; degree of polymerization: 400) | 100 parts |
| Polyester polyurethane resin (neopentyl glycol/caprolactone polyol/MDI = 0.9/2.6/1; —SO$_3$Na content: 1 × 10$^{-4}$ eq/g) | 5 parts |
| Copper oleate | 5 parts |
| Phthalocyanine Blue type dispersing agent | 5 parts |
| Methyl ethyl ketone | 200 parts |

The following components were mixed and then dispersed in a sand grinder.

| | |
|---|---|
| Inorganic powder α-Fe$_2$O$_3$ (average particle size: 0.27 μm; BET specific surface area: 18 m$^2$/g; pH: 5.5) | 80 parts |
| Vinyl chloride-vinyl acetate-vinyl alcohol (86:13:1) copolymer (polar group (—N(CH)$_3$$^+$Cl$^-$) content: 5 × 10$^{-6}$ eq/g; degree of polymerization: 400) | 5 parts |
| Polyester polyurethane resin (neopentyl glycol/caprolactone polyol/MDI = 0.9/2.6/1; —SO$_3$Na content: 1 × 10$^{-4}$ eq/g) | 4 parts |
| Carbon black dispersion prepared above | 83 parts |
| Butyl stearate | 1 part |
| Stearic acid | 1 part |
| Copper oleate | 1 part |
| Methyl ethyl ketone | 200 parts |

To the resulting dispersion was added 6 parts of polyisocyanate to prepare a coating composition of lower non-magnetic layer (a-H).

| Coating Composition for Layer (b-A): | |
|---|---|
| Ferromagnetic metal fine powder (Fe/Zn/Ni = 92/4/4; Hc: 1600 Oe; BET specific surface area: 60 m$^2$/g; crystallite size: 195 Å; particle size (major axis): 0.20 μm; aspect ratio: 10; σ$_2$: 130 emu/g) | 100 parts |
| Vinyl chloride copolymer (—SO$_3$Na content: 1 × 10$^{-4}$ eq/g; degree of polymerization: 300) | 12 parts |
| Polyester polyurethane resin (neopentyl glycol/caprolactone polyol/MDI = 0.9/2.6/1; —SO$_3$Na content: 1 ×0 10$^{-4}$ eq/g) | 3 parts |
| α-Alumina (particle size: 0.3 μm) | 2 parts |
| Carbon black (particle size: 0.10 μm) | 0.5 part |
| Butyl stearate | 1 part |
| Stearic acid | 2 parts |
| Methyl ethyl ketone | 200 parts |

The above components were kneaded in a continuous kneader and then dispersed in a sand mill. To the resulting dispersion was added 6 parts of polyisocyanate, and 40 parts of butyl acetate was further added. The dispersion was filtered through a filter having an average pore size of 1 μm to prepare a coating composition of upper magnetic layer (b-A).

| Coating Composition for Layer (b-B): | |
|---|---|
| Hexagonal barium ferrite (Hc: 1250 Oe; BET specific surface area: 47 m$^2$/g; particle size: 0.05 μm; aspect ratio: 5) | 100 parts |
| Vinyl chloride-vinyl acetate-vinyl alcohol (86:13:1) copolymer (—SO$_3$Na content: 5 × 10$^{-6}$ eq/g; degree of polymerization: 400) | 13 parts |
| Polyester polyurethane resin (neopentyl glycol/caprolactone polyol/MDI = 0.9/2.6/1; —SO$_3$Na content: 1 × 10$^{-4}$ eq/g) | 3 parts |
| α-Alumina (particle size: 0.3 μm) | 2 parts |
| Carbon black (particle size: 80 mμ (0.08 μm) | 0.5 part |
| Butyl stearate | 1 part |
| Stearic acid | 2 parts |
| Methyl ethyl ketone | 200 parts |

The above components were kneaded in a continuous kneader and then dispersed in a sand mill. To the resulting dispersion was added 6 parts of polyisocyanate, and 40 parts of butyl acetate was further added. The dispersion was filtered through a filter having an average pore size of 1 μm to prepare a coating composition of upper magnetic layer (b-B).

Preparation of Sample 11-1

A polyethylene terephthalate film having a thickness of 7 μm and a centerline surface roughness (Ra) of 0.01 μm was coated with the coating composition for layer (a-A) to a dry thickness of 3 μm and immediately thereafter with the coating composition for layer (b-A) to a dry thickness of 0.2 μm by wet-on-wet coating to form layers (a-A) and (b-A). While both layers (a-A) and (b-A) were wet, the ferromagnetic powder in layer (b-A) was orientated by applying a magnetic field using cobalt magnet having a magnetic force of 3000 G and a solenoid having a magnetic force of 1500 G. After drying, the coated film was calendered through 7 stages of metallic rolls at 90° C. and cut to a width of 8 mm to prepare 8 mm-video tape.

Preparation of Samples 11-2 to 11-7 and Comparative Samples 11'-1 to 11'-8

8 mm-Video tape samples were prepared in the same manner as for Sample 11-1, except for changing the coating compositions and the thickness of layers (a) and (b) as shown in Table 19 below. Of these Samples, Comparative Samples 11'-2 and 11'-8 had a single layer structure comprising layer (b) alone. Comparative Samples 11'-3 and 11'-4 were prepared by the so-called wet-on-dry coating method as follows. The coating composition for layer (a) was coated to a dry thickness of 2.7 μm, dried, rolled, and calendered. The thus formed layer (a) was subjected to a curing treatment at 80° C. for 24 hours. The coating composition for layer (b) was then coated thereon to a dry thickness of 0.5 μm, and subjected to orientation, dried, rolled up, and calendered in the same manner as for Sample 11-1.

Performance properties of each of the resulting samples were evaluated according to the following test methods. The results obtained are shown in Table 19. A A10$^4$/A10 ratio of the coating composition for layer (b) is also shown in Table 19.

Preservation Stability

After being preserved at 60° C. and 90% RH (relative humidity) for 48 hours, the sample in a cassette P6-120 was played 10 passes on ten 8 mm-video decks "FUJI X8" manufactured by Fuji Photo Film Co., Ltd. in an atmosphere of 23° C. and 70% RH. A reduction in output during 10 passes was measured. Further, the degree of contamination in the inside of the deck was observed. Preservation stability was evaluated by rating the results according to three grades "good", "medium", and "bad".

Electromagnetic Characteristics 1) 7 MHz Output

Signals of 7 MHz were recorded on a sample by means of FUJI X8, and the output on reproduction was measured with an oscilloscope.

2) C/N

Signals of 7 MHz were recorded on a sample by means of FUJI X8, and the noise generated on reproduction at 6 MHz was measured with a spectrum analyzer to obtain a ratio of reproduced signal to noise.

Contact with Head

Signals of 7 MHz were recorded on a sample by means of FUJI X8, and the envelope wave form before demodulation in reproduction was observed with an oscilloscope. If the output was assured to show a flat wave form, the contact with head was judged "good". If a drop of output was observed anywhere, the contact with head was judged "medium" or "bad" according to the degree of the output drop.

Yield:

The yield of the products was expressed in terms of a percentage of non-defectives produced from one jumbo roll on a P6-120 conversion.

TABLE 19

| | Sample 11-1 | Sample 11-2 | Sample 11-3 | Compara. Sample 11'-1 | Compara. Sample 11'-2 | Compara. Sample 11'-3 | Compara. Sample 11'-4 |
|---|---|---|---|---|---|---|---|
| Layer (b): | | | | | | | |
| Coating Composition | A | A | A | A | A | A | A |
| Thickness (μm) | 0.2 | 0.5 | 1 | 1.3 | 2 | 0.5 | 0.5 |
| Layer (a): | | | | | | | |
| Coating Composition | A | A | A | A | none | A | B |
| α-Fe$_2$O$_3$:Carbon Black Ratio | 8:2 | 8:2 | 8:2 | 8:2 | — | 8:2 | 8:2 |
| Poiyisocyanate (part) | 5 | 5 | 5 | 5 | — | 5 | 5 |
| Coating System | wet-on-wet | wet-on-wet | wet-on-wet | wet-on-wet | single layer | wet-on-dry | wet-on-dry |
| A10$^4$ (dyne/cm$^2$) | 3000 | 3000 | 3000 | 3000 | | 3000 | 3000 |
| A10 (dyne/cm$^2$) | 300 | 300 | 300 | 300 | | 300 | 300 |
| A10$^4$/A10 | 10 | 10 | 10 | 10 | | 10 | 10 |
| Evaluation: | | | | | | | |
| 7 MHz Output (dB) | 3.5 | 3 | 2 | 0.5 | 0.2 | 2.5 | −2 |
| C/N Ratio | 3.2 | 3 | 2.8 | 0.3 | 0.5 | 0.5 | −1.1 |
| Yield (%) | 98 | 100 | 98 | 100 | 100 | 3 | 85 |
| Preservation Stability | good | good | good | good | good | bad | bad |
| Contact with Head | good | good | good | good | good | good | good |

| | Sample 11-4 | Sample 11-5 | Compara. Sample 11'-5 | Compara. Sample 11'-6 | Compara. Sample 11'-7 | Compara. Sample 11'-8 | Sample 11-6 | Sample 11-7 |
|---|---|---|---|---|---|---|---|---|
| Layer (b): | | | | | | | | |
| Coating Composition | A | A | A | A | A | A | B | A |
| Thickness (μm) | 0.5 | 0.5 | 0.5 | 0.5 | 0.5 | 0.5 | 0.5 | 0.2 |
| Layer (a): | | | | | | | | |
| Coating Composition | C | D | E | F | G | none | A | H |
| α-Fe$_2$O$_3$:Carbon Black Ratio | 9:1 | 5:1 | 10:0 | 4:6 | 8:2 | — | 8:2 | 8:2 |
| Polyisocyanate (part) | 5 | 5 | 5 | 5 | 0 | — | 5 | 5 |
| Coating System | wet-on-wet | wet-on-wet | wet-on-wet | wet-on-wet | wet-on-wet | single layer | wet-on-wet | wet-on-wet |
| A10$^4$ (dyne/cm$^2$) | 6000 | 3500 | 10000 | 4000 | 3200 | | 3000 | 4000 |
| A10 (dyne/cm$^2$) | 60 | 1000 | 80 | 1500 | 350 | | 300 | 300 |

TABLE 19-continued

| | | | | | | | | |
|---|---|---|---|---|---|---|---|---|
| A10⁴/A10 | 100 | 3.5 | 125 | 2.7 | 9.1 | | 10 | 13.3 |
| Evaluation: | | | | | | | | |
| 7 MHz Output (dB) | 3.6 | 2.6 | 2.6 | 0.5 | 3.5 | 2.2 | 3 | 3.6 |
| C/N Ratio | 3.5 | 2.5 | 2.5 | 0.1 | 3.2 | 1.5 | 3 | 3.8 |
| Yield (%) | 96 | 97 | 1 | 15 | 99 | 1 | 98 | 98 |
| Preservation Stability | good | good | good | good | bad | good | good | good |
| Contact with Head | good | good | bad | good | good | bad | good | good |

As is apparent from the results in Table 19, any of samples 11-1 through 11-7 falling within means (A) of the present invention had a high output at 7 MHz and a satisfactory C/N and exhibited satisfactory results in all the items of yield, preservation stability and contact with a head. To the contrary, Comparative Sample 11'-1 in which layer (b) has a thickness greater than 1 μm had a reduced output at 7 MHz and a reduced C/N. Comparative Sample 11'-2 having a single layer also had a reduced 7 MHz output and a reduced C/N. Further, Comparative Samples 11'-3 and 11'-4 in which layers (a) and (b) were formed by a wet-on-dry coating system both had a low C/N and unsatisfactory preservation stability. Comparative Samples 11'-5 and 11'-6 whose A10⁴/A10 ratio is out of the range of the present invention had an extremely poor yield in production. Comparative Sample 11'-7 in which layer (a) contained no polyisocyanate underwent serious deterioration during preservation.

EXAMPLE 12

Means (B) of the present invention was examined. Coating compositions for layers (a) and (b) used for sample preparation were prepared as follows.

| Layer (a): | |
|---|---|
| Inorganic powder TiO₂ (TTO-55A produced by Ishihara Sangyo Kaisha, Ltd.) (average primary particle diameter: 0.05 μm; BET specific surface area: 18 m²/g; pH: 7) | 100 parts |
| Carbon black (average primary particle diameter: 18 mμ; DBP absorption: 80 ml/100 g;.pH: 8.0; BET specific surface area: 250 m²/g; volatile content: 1.5%) | 20 parts |
| Vinyl chloride-vinyl acetate-vinyl alcohol (86:13:1) copolymer (polar group (—N(CH₃)₃⁺Cl⁻¹) content: 5 × 10⁻⁶ eq/g; degree of polymerization: 400) | 12 parts |
| Polyester polyurethane resin (neopentyl glycol/caprolactone polyol/MDI = 0.9/2.6/1; —SO₃Na content: 1 × 10⁻⁴ eq/g) | 5 parts |
| Butyl stearate | 1 part |
| Stearic acid | 1 part |
| Methyl ethyl ketone | 200 parts |
| Layer (b): | |
| Ferromagnetic metal fine powder (Fe/Zn/Ni = 92/4/4; Hc: 1600 Oe; BET specific surface area: 60 m²/g; crystallite size: 195 Å; particle size (major axis): 0.20 μm; aspect ratio: 10; σ₂: 130 emu/g) | 100 parts |
| Vinyl chloride copolymer (—SO₃Na content: 1 × 10⁻⁴ eq/g; degree of polymerization: 300) | 12 parts |
| Polyester polyurethane resin | 3 parts |
| (neopentyl glycol/caprolactone polyol/MDI = 0.9/2.6/1; —SO₃Na content: 1 × 10⁻⁴ eq/g) | |
| α-Alumina (particle size: 0.3 μm) | 2 parts |
| Carbon black (particle size: 0.10 μm) | 0.5 part |
| Butyl stearate | 1 part |
| Stearic acid | 2 parts |
| Methyl ethyl ketone | 200 parts |

The above components for each of layers (a) and (b) were kneaded in a continuous kneader and then dispersed in a sand mill. To the resulting dispersions for layer (a) and layer (b) was added 1 part and 3 parts of polyisocyanate, respectively, and 40 parts of butyl acetate was further added to each of the dispersions. The dispersion was filtered through a filter having an average pore size of 1 μm to prepare a coating composition for layer (a) and a coating composition for layer (b). The A10⁴/A10 ratio of these coating compositions is shown in Table 22 below.

Preparation of Sample 12-1

A polyethylene terephthalate film having a thickness of 7 μm and a centerline surface roughness (Ra) of 0.01 μm was coated with the coating composition for layer (a) to a dry thickness of 2 μm and immediately thereafter with the coating composition for layer (b) to a dry thickness of 0.3 μm by wet-on-wet coating to form layers (a) and (b). While both layers were wet, the ferromagnetic powder in layer (b) was orientated by applying a magnetic field using cobalt magnet of 3000 G and a solenoid of 1500 G. After drying, the coated film was calendered through 7 metallic rolls at 90° C. and cut to a width of 8 mm to prepare 8 mm-video tape.

Preparation of Samples 12-2 to 12-5 and Comparative Samples 12'-1 to 12'-5

8 mm-Video tape samples were prepared in the same manner as for Sample 12-1, except for changing the coating compositions and the thickness of layers (a) and (b) as shown in Table 20 below. Comparative Sample 12'-2 was prepared by so-called wet-on-dry coating as follows. The coating composition for layer (a) was coated to a dry thickness of 2.0 μm, dried, rolled, and calendered. The thus formed layer (a) was subjected to a curing treatment at 80° C. for 24 hours, and the coating composition for layer (b) was then coated thereon to a dry thickness of 0.3 μm, subjected to orientation, dried, rolled up, and calendered in the same manner as for Sample 12-1.

Performance properties of each of the resulting samples were evaluated according to the following test methods. The results obtained are shown in Table 20.

Running Durability:

A sample in a cassette P6-120 was played 100 passes on ten 8 mm-video decks "FUJI x8" in an atmosphere of 23° C. and 70% RH. A reduction in output during 100 passes was measured. Further, any contamination in the inside of the deck was observed. Preservation stability was evaluated by rating the results in five grades "good", "good to medium", "medium", "medium to bad", and "bad".

Electromagnetic Characteristics:

Evaluated in the same manner as in Example 11.

Yield:

A percentage of non-defectives after cutting to a width of 8 mm was obtained. In general, a yield of at least 97% is demanded.

TABLE 20

|  | Sample 12-1 | Sample 12-2 | Sample 12-3 | Compara. Sample 12'-1 | Compara. Sample 12'-2 | Compara. Sample 12'-3 | Compara. Sample 12'-4 | Compara. Sample 12'-5 | Sample 12-4 | Sample. 12-5 |
|---|---|---|---|---|---|---|---|---|---|---|
| Thickness of Layer (b) ($\mu$m) | 0.3 | 0.3 | 0.9 | 1.1 | 0.3 | 0.3 | 0.3 | 0.3 | 0.3 | 0.3 |
| Layer (a): | | | | | | | | | | |
| Inorganic Powder: | | | | | | | | | | |
| Kind | $TiO_2$ | $TiO_2$ | $TiO_2$ | $TiO_2$ | $TiO_2$ | $TiO_2$ | $TiO_2$ | $TiO_2$ | $\alpha$-$Al_2O_3$ | $SnO_2$ |
| Size* ($\mu$m) | 0.05 | 0.07 | 0.05 | 0.05 | 0.05 | 0.1 | 0.05 | — | 0.06 | 0.05 |
| Amount (part) | 100 | 100 | 100 | 100 | 100 | 100 | 100 | — | 100 | 100 |
| Carbon Black: | | | | | | | | | | |
| Size* ($\mu$m) | — | — | — | — | — | — | — | 0.05 | — | — |
| Amount (part) | 0 | 0 | 0 | 0 | 0 | 0 | 0 | 100 | 0 | 0 |
| Amount of Poly- isocyanate (part) | 1 | 1 | 1 | 1 | 1 | 1 | 0 | 1 | 1 | 1 |
| Thickness ($\mu$m) | 2 | 2 | 1.4 | 2 | 2 | 2 | 2 | 2 | 2 | 2 |
| A$10^4$ (dyne/$cm^2$) | 6000 | 7000 | 6000 | 6000 | 6000 | 15000 | 5800 | 1200 | 7200 | 7800 |
| A10 (dyne/$cm^2$) | 900 | 800 | 900 | 900 | 900 | 100 | 900 | 500 | 800 | 900 |
| A$10^4$/A10 | 6.67 | 8.75 | 6.67 | 6.67 | 6.67 | 150.00 | 6.44 | 2.40 | 9.00 | 8.67 |
| Coating System | wet-on-wet | wet-on-wet | wet-on-wet | wet-on-wet | wet-on-dry | wet-on-wet | wet-on-wet | wet-on-wet | wet-on-wet | wet-on-wet |
| Evaluation: | | | | | | | | | | |
| 7 MHZ Output (dB) | 5.5 | 5.1 | 4.1 | 0.5 | 5.2 | 0.2 | 4.7 | N.D.** | 5.5 | 5.1 |
| Running Durability | good to medium | good | good to medium | good | — | good | bad | — | good | good |
| Yield (%) | 99 | 99.5 | 99 | 9.8 | 2 | 0.5 | 97 | 0.3 | 99 | 99.5 |

Note:
*Average primary particle diameter
**Non-detectable

As is apparent from the results in Table 20, Samples 12-1 through 12-5 falling within means (B) according to the present invention exhibited excellent results in all the items of 7 MHz output, running durability, and yield of production.

To the contrary, Comparative Sample 12'-1 in which layer (b) has a thickness greater than 1 $\mu$m suffered from a reduction in 7 MHz output. Comparative Sample 12'-2 which was prepared by wet-on-drying coating had a very poor yield. Comparative Samples 12'-3 and 12'-5 having a A$10^4$/A10 ratio out of the range of the present invention both had a low yield and underwent a reduction in 7 MHz output. Further, Comparative Sample 12'-4 in which layer (a) contained no polyisocyanate had considerably reduced running durability.

EXAMPLE 13

Means (C) according to the present invention was examined. Coating compositions for layers (a) and (b) used in sample preparation were prepared as follows.

Layer (a):

| | |
|---|---|
| Co-Doped iron oxide (Hc: 950 Oe; BET specific surface area: 58 $m^2$/g; crystallite size: 250 Å; particle size | 0 or 100 parts |

-continued

| | |
|---|---|
| (major axis): 0.20 $\mu$m; aspect ratio: 8) | |
| Vinyl chloride-vinyl acetate-vinyl alcohol copolymer (polar group (—N(CH$_3$)$_3$$^+$Cl$^{-1}$) content: 5 × $10^{-6}$ eq/g) | 13 parts |
| Polyester polyurethane resin (neopentyl glycol/caprolactone polyol/MDI = 0.9/2.6/1; —SO$_3$Na content: 1 × $10^{-4}$ eq/g) | 11 parts |
| $\alpha$-Iron oxide (acicular; major axis: 0.3 $\mu$m; BET specific surface area: 45 $m^2$/g; pH: 3.5) | see Table 3 |
| $\alpha$-Alumina (particle size: 0.3 $\mu$m) | 5 parts |
| Carbon black (average primary particle diameter: 16 m$\mu$; DBP absorption: 80 ml/100 g; pH: 8.0; BET specific surface area: 250 $m^2$/g; volatile content: 1.5%) | 100 or 500 parts |
| Butyl stearate | 1 part |
| Stearic acid | 2 parts |
| Methyl ethyl ketone | 400 parts |
| Layer (b): | |
| Ferromagnetic metal fine powder (Fe/Zn/Ni = 92/4/4; Hc: 1600 Oe; BET specific surface area: 60 $m^2$/g; | 100 parts |

-continued

| | |
|---|---|
| crystallite size: 195 Å; particle size (major axis): 0.20 μm; aspect ratio: 10; σ$_s$: 130 emu/g) | |
| Vinyl chloride copolymer (—SO$_3$Na content: 1 × 10$^{-4}$ eq/g; degree of polymerization: 300) | 12 parts |
| Polyester polyurethane resin (neopentyl glycol/caprolactone polyol/MDI = 0.9/2.6/1; —SO$_3$Na content: 1 × 10$^{-4}$ eq/g) | 3 parts |
| α-Alumina (particle size: 0.3 μm) | 2 parts |
| Carbon black (particle size: 0.10 μm) | 0.5 part |
| Butyl stearate | 1 part |
| Stearic acid | 2 parts |
| Methyl ethyl ketone | 200 parts |

The above components for each of layers (a) and (b) were kneaded in a continuous kneader and then dispersed in a sand mill. To the resulting dispersions for layer (a) and layer (b) was added 6 parts and 3 parts of polyisocyanate, respectively, and 40 parts of butyl acetate was further added to each of the dispersions. The dispersion was filtered through a filter having an average pore size of 1 μm to prepare a coating composition for layer (a) and a coating composition for layer (b). The A10$^4$/A10 ratio of these coating compositions is shown in Table 21 below.

Preparation of Samples 13-1 to 13-6 and Comparative Samples 13'-1 to 13'-7 and 13'-9

A polyethylene terephthalate film having a thickness of 7 μm and a centerline surface roughness (Ra) of 0.01 μm was coated with the coating composition for layer (a) to a dry thickness of 2 μm and immediately thereafter with the coating composition for layer (b) to a dry thickness of 0.3 μm by wet-on-wet coating to form layers (a) and (b). While both layers were wet, the ferromagnetic powder in layer (b) was orientated by applying a magnetic field using cobalt magnet having a magnetic force of 3000 G and a solenoid having a magnetic force of 1500 G. After drying, the coated film was calendered through 7 metallic rolls at 90° C. and cut to a width of 8 mm to prepare 8 mm-video tape.

In Comparative Sample 13'-4, layers (a) and (b) were formed by wet-on-dry coating as follows. The coating composition for layer (a) was coated to a dry thickness of 2.0 μm, dried, rolled, and calendered. The thus formed layer (a) was subjected to a curing treatment at 80° C. for 24 hours, and the coating composition for layer (b) was then coated thereon to a dry thickness of 0.3 μm, subjected to orientation, dried, rolled up, and calendered in the same manner as described above.

Preparation of Sample 13-7 and Comparative Sample 13'-8

Samples were prepared in the same manner as for Sample 13-1, except for using the following Co-doped γ-Fe$_2$O$_3$ as a ferromagnetic powder in layer (b).

Co-Doped γ-Fe$_2$O$_3$:

Hc: 1400 Oe

BET Specific Surface Area: 45 m$^2$/g

Crystallite Size: 290 Å

Particle Size (major axis): 0.3 μm

Aspect Ratio: 10

σ$_s$: 75 emu/g

Each of Samples 13-1 to 13-7 and Comparative Samples 13'-1 to 13'-9 was evaluated in the same manner as in Example 12. The results obtained are shown in Table 21.

TABLE 21

| | Sample 13-1 | Sample 13-2 | Sample 13-3 | Sample 13-4 | Sample 13-5 | Sample 13-6 | Compara. Sample 13'-1 | Compara. Sample 13'-2 |
|---|---|---|---|---|---|---|---|---|
| Layer (b): | | | | | | | | |
| Hc (Oe) | 1600 | 2000 | 1600 | 1600 | 1250 | 2900 | 1600 | 1000 |
| Bm (gauss) | 3500 | 3500 | 3500 | 3500 | 3500 | 3500 | 3500 | 3500 |
| Thickness (μm) | 0.3 | 0.3 | 0.3 | 0.8 | 0.3 | 0.3 | 1 | 0.3 |
| Ferromagnetic Powder | A* | A* | A* | A* | A* | A* | A* | A* |
| Layer (a): | | | | | | | | |
| Magnetic Iron Oxide (part) | 100 | 100 | 100 | 100 | 100 | 100 | 100 | 100 |
| α-Iron Oxide (part) | 600 | 600 | 250 | 600 | 600 | 600 | 600 | 600 |
| Carbon Black (part) | 100 | 100 | 100 | 100 | 100 | 100 | 100 | 100 |
| Hc (Oe) | 950 | 950 | 950 | 950 | 950 | 950 | 950 | 950 |
| Bm (gauss) | 320 | 320 | 480 | 320 | 320 | 320 | 320 | 320 |
| A10$^4$ (dyne/cm$^2$) | 3000 | 3000 | 4000 | 3000 | 3000 | 3000 | 3000 | 3000 |
| A10 (dyne/cm$^2$) | 250 | 250 | 400 | 250 | 250 | 250 | 250 | 250 |
| A10$^4$/A10 | 12 | 12 | 10 | 12 | 12 | 12 | 12 | 12 |
| Coating System | wet-on-wet | wet-on-wet | wet-on-wet | wet-on-wet | wet-on-wet | wet-on-wet | wet-on-wet | wet-on-wet |
| Evaluation: | | | | | | | | |
| 7 MHz Output (dB) | 6.6 | 7 | 6.5 | 5.3 | 6 | 7.3 | 0.5 | 2.2 |
| Yield (%) | 98 | 95 | 96 | 97 | 99 | 100 | 99 | 98 |

| | Compara Sample 13'-3 | Compara Sample 13'-4 | Compara Sample 13'-5 | Compara Sample 13'-6 | Compara Sample 13'-7 | Sample 13-7 | Compara Sample 13'-8 | Compara Sample 13'-9 |
|---|---|---|---|---|---|---|---|---|
| Layer (b): | | | | | | | | |
| Hc (Oe) | 1600 | 1600 | 1600 | 3300 | 1150 | 1500 | 500 | 1600 |
| Bm (gauss) | 3500 | 3500 | 3500 | 3500 | 3500 | 2100 | 1800 | 4600 |
| Thickness (μm) | 0.3 | 0.3 | 0.3 | 0.3 | 0.3 | 0.3 | 0.3 | 0.3 |

TABLE 21-continued

| Ferromagnetic Powder Layer (a): | A* | A* | A* | A* | A* | B** | B** | A* |
|---|---|---|---|---|---|---|---|---|
| Magnetic Iron Oxide (part) | 0 | 100 | 100 | 100 | 100 | 100 | 100 | 100 |
| α-Iron Oxide (part) | 4000 | 600 | 200 | 650 | 600 | 600 | 600 | 600 |
| Carbon Black (part) | 500 | 100 | 100 | 100 | 100 | 100 | 100 | 100 |
| Hc (Oe) | 950 | 950 | 950 | 950 | 950 | 950 | 950 | 950 |
| Bm (gauss) | 0 | 320 | 560 | 320 | 320 | 320 | 320 | 320 |
| A10$^4$ (dyne/cm$^2$) | 11000 | 3000 | 4000 | 3000 | 3000 | 3000 | 3000 | 3000 |
| A10 (dyne/cm$^2$) | 30 | 250 | 1500 | 250 | 250 | 250 | 250 | 250 |
| A10$^4$/A10 | 366.7 | 12 | 2.7 | 12 | 12 | 12 | 12 | 12 |
| Coating System | wet-on-wet | wet-on-dry | wet-on-wet | wet-on-wet | wet-on-wet | wet-on-wet | wet-on-wet | wet-on-wet |
| Evaluation: | | | | | | | | |
| 7 MHz output (dB) | 6.5 | 6.6 | 0.5 | 2.1 | 1.3 | 5.5 | 2.1 | −1.5 |
| Yield (%) | 25 | 11 | 99 | 99 | 98 | 98 | 99 | 99 |

Note:
A*: Fe—Zn—Ni alloy
B**: Co-Doped γ-Fe$_2$O$_3$

It can be seen from the results in Table 21 that Samples 13-1 through 13-6 according to means (C) of the present invention exhibited an improved output at 7 MHz and an improved yield whereas Comparative Samples 13'-1 to 13'-9 which are out of the scope of the present invention failed to obtain sufficient results in 7 MHz output or yield.

As demonstrated by the foregoing Examples, the present invention conveniently provides a magnetic recording medium having a small magnetic layer thickness while exhibiting excellent durability and electromagnetic characteristics by preparing coating compositions for layers (a) and (b) having controlled thixotropy by adjusting the physical properties of magnetic or non-magnetic powders, the composition, etc., particularly of layer (a), as described herein, and coating the magnetic and non-magnetic coating compositions by wet-on-wet coating, either simultaneously or successively.

EXAMPLE 14

Means (D) according to the present invention was examined. Coating compositions for layers (a) and (b) used for sample preparation were prepared as follows.

| Layer (a): | |
|---|---|
| Non-magnetic powder α-Fe$_2$O$_3$ (TF-100 produced by Toda Kogyo K.K.; average particle size: 0.1 μm; BET specific surface area: 11 m$^2$/g; pH: 5.6) | 80 parts |
| Carbon black (average primary particle diameter: 16 nm; DBP absorption: 80 ml/100 g; pH: 8.0; BET specific surface area: 250 m$^2$/g; volatile content: 1.5%) | 20 parts |
| Vinyl chloride-vinyl acetate-vinyl alcohol (86:13:1 copolymer (polar group (—N(CH$_3$)$_3$$^+$Cl$^{-1}$) content: 5 × 10$^{-6}$ eq/g; degree of polymerization: 400) | 10 parts |
| Polyester polyurethane resin (basic skeleton: 1,4-BD/phthalic acid/HMDI; molecular weight: 10200; OH group: 0.23 × $^{-3}$ eq/g; —SO$_3$Na group: 1 × 10$^{-4}$ eq/g) | 8 parts |
| Butyl stearate | 1 part |
| Stearic acid | 1 part |
| Methyl ethyl ketone | 200 parts |

-continued

| Layer (b): | |
|---|---|
| Ferromagnetic metal fine powder (Fe/Zn/Ni = 92/4/4; Hc: 1600 Oe; BET specific surface area: 60 m$^2$/g; crystallite size: 200 Å; particle size (major axis): 0.20 μm; aspect ratio: 10; σ$_s$: 130 emu/g) | 100 parts |
| Vinyl chloride copolymer (—SO$_3$Na content: 1 × 10$^{-4}$ eq/g; degree of polymerization: 3.00) | 12 parts |
| Polyester polyurethane resin (neopentyl glycol/caprolactone polyol/MDI = 0.9/2.6/1; —SO$_3$Na content: 1 × 10$^{-4}$ eq/g) | 3 parts |
| α-Alumina (particle size: 0.3 μm) | 2 parts |
| Carbon black (particle Size: 0.10 μm) | 0.5 part |
| Butyl stearate | 1 part |
| Stearic acid | 2 parts |
| Methyl ethyl ketone | 200 parts |

The above components for each of layers (a) and (b) were kneaded in a continuous kneader and then dispersed in a sand mill. To the resulting dispersions for layer (a) and layer (b) was added 5 parts and 6 parts of polyisocyanate, respectively, and 40 parts of butyl acetate was further added to each of the dispersions. The dispersion was filtered through a filter having an average pore size of 1 μm to prepare a coating composition for layer (a) and a coating composition for layer (b).

Preparation of Sample 14-1

A polyethylene terephthalate film having a thickness of 7 μm and a centerline surface roughness (Ra) of 0.01 μm was coated with the coating composition for layer (a) to a dry thickness of 2 μm and immediately thereafter with the coating composition for layer (b) to a dry thickness of 0.2 μm by wet-on-wet coating to form layers (a) and (b). While both layers were wet, the ferromagnetic powder in layer (b) was orientated by applying a magnetic field using cobalt magnet of 3000 G and a solenoid of 1500 G. After drying, the coated film was calendered through 7 metallic rolls at 90° C. and cut to a width of 8 mm to prepare 8 mm-video tape.

Preparation of Samples 14-2 to 14-6 and Comparative Samples 14'-1 to 14'-5

Video tape samples were prepared in the same manner as for Sample 14-1, except for changing the amounts of carbon black and α-Fe$_2$O$_3$ in layer (a) (Samples 14-2 and 14-3 and

107

Comparative Samples 14'-1 and 14'-2), decreasing the amount of a hydroxyl group in polyurethane (Comparative Sample 14'-3), changing the particle size of carbon black (Comparative Sample 14'-4), or changing the thickness of layer (b) (Samples 14-4 to 14-6 and Comparative Sample 14'-5). These alterations made are shown in Table 22 below. Further, in Sample 14-4, the following ferromagnetic powder Fe/Zn/Ni was used.

Fe/Zn/Ni=92/4/4

Hc: 1580 Oe

BET Specific Surface Area: 42 m²/g

Crystallite Size: 280 Å

Particle Size (major axis): 0.30 μm

Aspect Ratio: 10

$\sigma_s$: 140 emu/g

Preparation of Comparative Sample 14'-6

A coating composition for layer (b) was prepared as described above, except for increasing the amount of methyl ethyl ketone to 700 parts to decrease the concentration. The same support as used in Sample 14-1 was coated with the coating composition for layer (a). After performing a thorough curing reaction of layer (a), the above-prepared diluted coating composition for layer (b) was then coated thereon to a dry thickness of 0.3 μm, orientated, dried, and calendered to obtain 8 mm-video tape.

Preparation of Comparative Sample 14'-7

A sample was prepared in the same manner as for Sample 14-1, except for using the following ferromagnetic powder in layer (b).

Fe/Zn/Ni=92/4/4

Hc: 1580 Oe

BET Specific Surface Area: 35 m²/g

Crystallite Size: 330 Å

Particle Size (major axis): 0.35 μm

Aspect Ratio: 10

$\sigma_s$: 140 emu/g

Preparation of Sample 14-7

A video tape sample was prepared in the same manner as for Sample 14-1, except for using the following composition as a coating composition for layer (b).

| | |
|---|---|
| Co-Doped iron oxide (Hc: 950 Oe; BET specific surface area: 58 m²/g; crystallite size: 250 Å; particle size (major axis): 0.20 μm; aspect ratio: 8) | 100 parts |
| Vinyl chloride-vinyl acetate-vinyl alcohol (86:13:1) copolymer (polar group (—N(CH$_3$)$_3$$^+$Cl$^{-1}$) content: 5 × 10$^{-6}$ eq/g; degree of polymerization: 400) | 13 parts |
| Polyester polyurethane resin (neopentyl glycol/caprolactone polyol/MDI = 0.9/2.6/1; —SO$_3$Na content:. 1 × 10$^{-4}$ eq/g) | 3 parts |
| α-Alumina (particle size: 0.3 μm) | 2 parts |

108

-continued

| | |
|---|---|
| Carbon black (particle size: 100 mμ (0.1 μm) | 0.5 part |
| Butyl stearate | 1 part |
| Stearic acid | 2 parts |
| Methyl ethyl ketone | 200 parts |

Preparation of Sample 14-8

A sample was prepared in the same manner as for Sample 14-1, except for using the following ferromagnetic powder in layer (b).

Co-doped barium ferrite

Hc: 1800 Oe

BET Specific Surface Area: 35 m²/g

Average Particle Size: 0.05 μm

Aspect Ratio: 5

$\sigma_s$: 68 emu/g

Performance properties of Samples 14-1 to 14-8 and Comparative Samples 14'-1 to 14'-7 were evaluated according to the following test methods. The results obtained are shown in Table 22.

Coating Properties:

The coated layers were observed while in an undried state. A sample in which mixing of layers (a) and (b) at the interface did not occur was rated "good", and a sample in which such mixing took place was rated "bad". Since those samples suffering such mixing of layers were not processed any further, evaluations of 7 MHz output and scratch resistance hereinafter described were not made with respect to those samples.

7 MHz Output:

Evaluated in the same manner as in Example 11.

Scratch Resistance:

The magnetic layer of a sample was scratched with a stainless steel stylus under a load of 15 g. The damage on the magnetic layer was visually observed with the naked eye and rated "good", "medium", and "bad" in the descending order.

Magnetic Flux Density:

A magnetic flux density was measured with a vibrating sample magnetometer (manufactured by Toei Kogyo K.K.) at Hm of 5 kOe.

Major axis of Magnetic Powder:

An average particle diameter of the major axis was obtained by means of a transmission type electron microscope.

Crystallite Size:

Calculated from the half-value width of the X-ray diffraction line of the (4,4,0) face and (2,2,0) face.

TABLE 22

| | Sample 14-1 | Sample 14-2 | Sample 14-3 | Compara. Sample 14'-1 | Compara. Sample 14'-2 | Compara. Sample 14'-3 | Compara. Example 14'-4 | Sample 14-4 |
|---|---|---|---|---|---|---|---|---|
| Metallic Powder | metal | metal | metal | metal | metal | metal | metal | metal |

TABLE 22-continued

| Layer (b): | | | | | | | | |
|---|---|---|---|---|---|---|---|---|
| Major axis of Magnetic Powder ($\mu$m) | 0.2 | 0.2 | 0.2 | 0.2 | 0.2 | 0.2 | 0.2 | 0.3 |
| Crystallite Size of Magnetic Powder (Å) | 200 | 200 | 200 | 200 | 200 | 200 | 200 | 280 |
| Thickness ($\mu$m) | 0.3 | 0.3 | 0.3 | 0.3 | 0.3 | 0.3 | 0.3 | 0.3 |
| Layer (a): | | | | | | | | |
| Particle Size of Carbon Black ($\mu$m) | 16 | 16 | 16 | 16 | 16 | 16 | 25 | 16 |
| Carbon Black/$\alpha$-Fe$_2$O$_3$ | 20/80 | 5/95 | 40/60 | 3/97 | 50/50 | 20/80 | 20/80 | 20/80 |
| OH/molecule-Urethane | 3 | 3 | 3 | 3 | 3 | 2 | 3 | 3 |
| Coating System | wet-on-wet | wet-on-wet | wet-on-wet | wet-on-wet | wet-on-wet | wet-on-wet | wet-on-wet | wet-on-wet |
| Evaluations: | | | | | | | | |
| Coating Properties | good | good | good | bad | good | bad | bad | good |
| 7 MHz Output (dB) | 7 | 5 | 6.1 | — | −2 | — | — | 4 |
| Scratch Resistance | good | good | good | — | good | — | — | good |

| | Sample 14-5 | Sample 14-6 | Compara. Sample 14'-5 | Compara. Samnple 14'-6 | Compara. Sample 14'-7 | Sample 14-7 | Sample 14-8 |
|---|---|---|---|---|---|---|---|
| Metallic Powder | metal | metal | metal | metal | metal | Co-doped $\gamma$-Fe$_2$O$_3$ | BaFe |
| Layer (b): | | | | | | | |
| Major axis of Magnetic Powder ($\mu$m) | 0.2 | 0.2 | 0.2 | 0.2 | 0.35 | 0.25 | 0.05 |
| Crystallite Size of Magnetic Powder (Å) | 200 | 200 | 200 | 200 | 330 | 280 | |
| Thickness ($\mu$m) | 0.5 | 1 | 1.3 | 0.3 | 0.3 | 0.3 | 0.3 |
| Layer (a): | | | | | | | |
| Particle Size of Carbon Black ($\mu$m) | 16 | 16 | 16 | 16 | 16 | 16 | 16 |
| Carbon Black/$\alpha$-Fe$_2$O$_3$ | 20/80 | 20/80 | 20/80 | 20/80 | 20/80 | 20/80 | 20/80 |
| OH/molecule-Urethane | 3 | 3 | 3 | 3 | 3 | 3 | 3 |
| Coating System | wet-on-wet | wet-on-wet | wet-on-wet | wet-on-dry | wet-on-wet | wet-on-wet | wet-on-wet |
| Evaluations: | | | | | | | |
| Coating Properties | good | good | good | — | bad | good | good |
| 7 MHz Output (dB) | 6 | 1 | −1.0 | −1.5 | — | 3 | 3 |
| Scratch Resistance | good | good | good | bad | — | good | good |

As is apparent from the results in Table 22, the samples according to the present invention can be prepared with satisfactory coating properties without involving mixing of the lower and upper layers, and they exhibited a high output of signals 7 MHz and satisfactory scratch resistance. To the contrary, Comparative Sample 14'-1 in which the carbon black to non-magnetic powder ratio is out of the scope of the present invention had insufficient coating properties and underwent a reduction in output. Comparative Samples 14'-3 and 14'-4 in which the hydroxyl group content in the polyurethane was too small or the particle size of carbon black was too large exhibited unsatisfactory coating properties. Further, where the major axis or crystallite size of the ferromagnetic powder was too large as in Comparative Sample 14'-7, the coating properties were also deteriorated.

EXAMPLE 15

Means (E) and (F) according to the present invention were examined as follows.

| Preparation of Sample 15-1 | |
|---|---|
| Layer (a): | |
| Acicular $\alpha$-Fe$_2$O$_3$ (major axis: 0.5 $\mu$m; aspect ratio: 10) | 160 parts |
| Carbon black (average particle size: 20 $\mu$m) | 5 parts |
| Vinyl chloride copolymer (containing —SO$_3$Na and epoxy group) | 8 parts |
| Polyurethane resin (containing —SO$_3$Na, molecular weight: 45000) | 5 parts |
| Cyclohexane | 100 parts |
| Methyl ethyl ketone | 100 parts |

The above components were mixed and dispersed in a sand mill for 4 hours. To the dispersion were added polyisocyanate (Colonate L), 5 parts of stearic acid, and 10 parts of butyl stearate to prepare a coating composition for layer (a).

| Layer (b): | |
|---|---|
| Ferromagnetic powder: Fe/Ni/Co alloy (92/6/2; Hc: 1600 Oe; $\sigma_s$: 135 emu/g; major axis: 0.18 µm; aspect ratio: 9) | 100 parts |
| Vinyl chloride copolymer (containing —SO$_3$Na and epoxy group) | 10 parts |
| Polyurethane resin (containing —SO$_3$Na, molecular weight: 45000) | 5 parts |
| α-Alumina (average particle size: 0.2 µm) | 5 parts |
| Cyclohexanone | 150 parts |
| Methyl ethyl ketone | 150 parts |

The above components were mixed and dispersed in a sand mill for 6 hours. To the dispersion were added 5 parts of stearic acid and 10 parts of butyl stearate to prepare a coating composition of layer (b).

A support was coated with the above-prepared coating compositions for layers (a) and (b) to a dry thickness of 3.0 µm and 0.3 µm, respectively, by wet-on-wet coating using two doctor blades differing in gap size. The magnetic powder was orientated in a magnetic field, the coated layers were dried and calendered. The resulting film was cut to a width of 3.81 mm to prepare digital audio tape (DAT).
Preparation of Samples 15-2 to 15-7 and Comparative Samples 15'-1 to 15'-6

Samples were prepared in the same manner as for Sample 15-1, except for making changes as shown in Table 23 below.

In Samples 15-6 and 15-7, the following barium ferrite was used as a ferromagnetic powder.
Ba Ferrite:

Hc: 1100 Oe $\sigma_s$: 70 emu/g

Plate Diameter: 0.05 µm

Aspect Ratio: 5

Each of Samples 15-1 to 15-7 and Comparative Samples 15'-1 to 15'-6 was evaluated according to the following test methods. The results obtained are shown in Table 23.
Mixed Region:

A sample tape was sandwiched in between epoxy resin articles, cooled in liquid nitrogen, and sliced along the lengthwise and width directions by means of a microtome. The cut surface was observed under a transmission type electron microscope (TEM) at a magnifying power of 50,000. Observations were made as follows.

1) When the shape of particles differs between layer (a) and layer (b), for example, the ferromagnetic powder in layer (b) is acicular with the non-magnetic powder in layer (a) being particulate or flaky, or the ferromagnetic powder in layer (b) is tabular with the non-magnetic powder in layer (a) being particular or acicular, whether there is a mixed region or not was judged from the degree of mixing of particles of different shape.

2) When the particles of layers (a) and (b) have the same shape but differ in average length of the maximum major axis, for example, the ferromagnetic powder in layer (b) and the non-magnetic powder in layer (a) both have an acicular shape but are different in the above-described average diameter, or the ferromagnetic powder in layer (b) is tabular with the non-magnetic powder in layer (a) being flaky, whether there is a mixed region or not was judged from the degree of mixing of particles of different diameter.

3) When the particles of layers (a) and (b) are equal to each other in both particle shape and average diameter, whether there is a mixed region or not was judged by detecting elements inherent to each layer in the vicinity of the interface between layers (a) and (b) according to a microauger electron spectroscopy.

The dry thickness of layer (b) of each sample was measured under TEM observation of a specimen prepared in the same manner as described above.
Output on Reproduction (RF Output):

Signals of constant frequency 4.7 MHz were input, and reproduced signals were recorded by means of a spectrum analyzer HP-3585A. The peak value of the signals was read out and relatively expressed taking the results of Comparative Example 15'-1 as a standard (0 dB).
Block Error Rate (BER):

A block error rate is a number of error flags per 10000 tracks.

$$BER = \frac{\text{Error Flag}}{10000 \times 128 \text{ Blocks}}$$

DAT has a signal processing system of coding analog signals into digital signals. One signal comprises 8 bits, and one block comprises 32 signals×8 pits=256 bits. Accordingly, one track is constituted by 128 blocks.

Signals of two tracks, i.e., 128×2 blocks, were put in memory and shuffled, and the errors were detected. A DAT deck "DTC-1000" produced by Sony Corporation was used, and a counter "HP5328A" produced by Hewlett Packard Co. was connected to a standard personal computer.
Drop Out (DO):

Signals of a single frequency 4.7 MHz were input, and drop outs of a threshold level −10 dB and a length of 0.5 µsec were counted with a drop out counter.

TABLE 23

|  | Sample 15-1 | Sample 15-2 | Sample 15-3 | Sample 15-4 | Sample 15-5 | Sample 15-6 |
|---|---|---|---|---|---|---|
| Layer (b): | | | | | | |
| Ferromagnetic Powder | Fe alloy | Fe alloy | Fe alloy | Fe alloy | Fe alloy | barium ferrite |
| Major axis (µm) | 0.18 | 0.18 | 0.18 | 0.18 | 0.18 | — |
| Plate Diameter (µm) | — | — | — | — | — | 0.1 |
| Thickness (µm) | 0.3 | 0.3 | 0.85 | 0.15 | 0.3 | 0.3 |
| Layer (a): | | | | | | |
| Non-magnetic Powder | αFe$_2$O$_3$ | αFe$_2$O$_3$ | αFe$_2$O$_3$ | αFe$_2$O$_3$ | αAl$_2$O$_3$ | αAl$_2$O$_3$ |
| Aspect Ratio | 10 | 10 | 10 | 10 | 8 | 8 |

TABLE 23-continued

|  | | | | | | |
|---|---|---|---|---|---|---|
| Major axis (μm) | 0.5 | 0.5 | 0.5 | 0.5 | 0.3 | 0.3 |
| Average Particle Size (μm) | — | — | — | — | — | — |
| Thickness (μm) | 3 | 0.8 | 2.5 | 3.5 | 3 | 3 |
| Coating System | wet-on-wet | wet-on-wt | wet-on-wet | wet-on-wet | wet-on-wet | wet-on-wet |
| Mixed Region | not observed | not observed | not observed | not observed | not observed | not observed |
| RF Output (dB) | 4.5 | 2.9 | 3.2 | 3.6 | 4.2 | 3.7 |
| Drop Out | 60 | 70 | 45 | 180 | 60 | 100 |
| BER | $7 \times 10^{-6}$ | $4 \times 10^{-5}$ | $4 \times 10^{-5}$ | $3 \times 10^{-5}$ | $1 \times 10^{-5}$ | $8 \times 10^{-6}$ |

| | Sample 15-7 | Compara. Sample 15'-1 | Compara. Sample 15'-2 | Compara. Sample 15'-3 | Compara. Sample 15'-4 | Compara. Sample 15'-5 | Compara. Sample 15'-6 |
|---|---|---|---|---|---|---|---|
| Layer (b): | | | | | | | |
| Ferromagnetic Powder | barium ferrite | Fe alloy | Fe alloy | Fe alloy | Fe alloy | barium ferrite | Fe alloy |
| Major axis (μm) | — | 0.18 | 0.18 | 0.18 | 0.18 | 0.18 | 0.18 |
| Plate Diameter (μm) | 0.1 | — | — | — | — | — | — |
| Thickness (μm) | 0.3 | 3.3 | 0.3 | 0.3 | 0.3 | 1.2 | 0.3 |
| Layer (a): | | | | | | | |
| Non-magnetic Powder | acicular Ti | — | $\alpha Fe_2O_3$ | particulate alumina | particulate aluinina | $\alpha Fe_2O_3$ | $\alpha Fe_2O_3$ |
| Aspect Ratio | 15 | — | 10 | — | — | 10 | 10 |
| Major axis (μm) | 1.2 | — | 0.5 | — | — | 0.5 | 0.5 |
| Average Particle Size (μm) | — | — | — | 0.3 | 0.3 | — | — |
| Thickness (μm) | 3 | — | 3 | 3 | 3 | 3 | 0.3 |
| Coating System | wet-on-wet | single layer | wet-on-dry | wet-on-wet | wet-on-dry | wet-on-wet | wet-on-wet |
| Mixed Region | not observed | — | observed | observed | observed | observed | observed |
| RF Output (dB) | 3.1 | 0 | 3.8 | −1.5 | 3.3 | 0.8 | −0.8 |
| Drop Out | 80 | 150 | 1200 | 500 | 2000 | 75 | 320 |
| BER | $3 \times 10^{-5}$ | $2 \times 10^{-4}$ | $5 \times 10^{-4}$ | $8 \times 10^{-4}$ | $6 \times 10^{-4}$ | $1 \times 10^{-4}$ | $3 \times 10^{-4}$ |

EXAMPLE 16

Means (G) according to the present invention was examined as follows.

| Layer (a): | |
|---|---|
| Graphite (particle size: 0.5 μm) | 90 parts |
| α-Al$_2$O$_3$ (average particle size: 0.2 μm) | 10 parts |
| Vinyl chloride copolymer (epoxy content: $8 \times 10^{-4}$ eq/g; molecular weight: 45000) | 15 parts |
| Polyurethane (containing —SO$_3$Na; molecular weight: 45000) | 5 parts |
| Cyclohexanone | 100 parts |
| Methyl ethyl ketone | 100 parts |

The above components were mixed and dispersed in a sand mill for 4 hours. To the dispersion were added polyisocyanate (Colonate L), 5 parts of stearic acid, and 10 parts of butyl stearate to prepare a coating composition of layer (a).

| Layer (b): | |
|---|---|
| Ferromagnetic powder: Fe-Ni-Co (92:6:2; Hc: 1600 Oe; σ$_s$: 135 emu/g; major axis: 0.18 μm; aspect ratio: 9) | 100 parts |
| Vinyl chloride copolymer (containing —SO$_3$Na and epoxy group) | 10 parts |
| Polyurethane resin (containing —SO$_3$Na; molecular weight: 45000) | 5 parts |

| Layer (b): | |
|---|---|
| α-Alumina (average particle size: 0.2 μm) | 5 parts |
| Cyclohexanone | 150 parts |
| Methyl ethyl ketone | 150 parts |

The above components were mixed and dispersed in a sand mill for 6 hours, and to the dispersion were added polyisocyanate (Colonate L), 5 parts of stearic acid, and 10 parts of butyl stearate to obtain a coating composition of layer (b).

A support was coated with the above-prepared coating compositions for layers (a) and (b) to a dry thickness of 3.0 μm and 0.3 μm, respectively, by wet-on-wet coating using two doctor blades differing in gap size. The magnetic powder was orientated in a magnetic field using permanent magnet, the coated layers were dried and calendered. The resulting film was cut to a width of 3.81 mm to prepare digital audio tape (DAT). The dry thickness of layer (b) was measured in the same manner as in Example 15.

Preparation of Samples 16-2 to 16-9 and Comparative Samples 16'-1 TO 16'-9

Samples were prepared in the same manner as for Sample 16-1, except for making alterations as show in Table 24 below. Barium ferrite used as a magnetic powder had the following properties.

Barium Ferrite:

Hc: 1100 Oe

σ$_s$: 70 emu/g

Plate Diameter: 0.05 μm

Aspect Ratio: 5

Each of Samples 16-1 to 16-9 and Comparative Samples 16'-1 to 16'-9 was evaluated in the same manner as in Example 15. The 4.7 MHz output was expressed relatively taking the result of Comparative Sample 16'-1 as a standard (0 dB). In addition, an increase in drop out was measured according to the following test method. The results obtained are shown in Table 24.

DO Increase:

In the measurement of drop out, the sample was played 100 passes on the same deck at 23° C. and 70% RH, and then reproduced. An increase in DO over the initial DO was obtained.

TABLE 24

|  | Sample 16-1 | Sample 16-2 | Sample 16-3 | Sample 16-4 | Sample 16-5 | Sample 16-6 |
|---|---|---|---|---|---|---|
| Layer (b): | | | | | | |
| Ferromagnetic Powder | Fe alloy | Fe alloy | Fe alloy | Fe alloy | Fe alloy | Fe alloy |
| Major axis ($\mu$m) | 0.18 | 0.18 | 0.18 | 0.18 | 0.18 | 0.18 |
| Plate Diameter ($\mu$m) | — | — | — | — | — | — |
| Thickness ($\mu$m) | 0.3 | 0.3 | 0.3 | 0.3 | 0.3 | 0.15 |
| Layer (a): | | | | | | |
| Non-magnetic Powder | graphite | graphite | graphite | graphite | graphite | graphite |
| Plate Diameter ($\mu$m) | 0.5 | 0.5 | 0.5 | 0.2 | 2 | 0.5 |
| Abrasive | $\alpha$-Al$_2$O$_3$ | $\alpha$-Al$_2$O$_3$ | $\alpha$-Al$_2$O$_3$ | $\alpha$-Al$_2$O$_3$ | $\alpha$-Al$_2$O$_3$ | Cr$_2$O$_3$ |
| Particle Size ($\mu$m) | 0.2 | 0.2 | 0.2 | 0.5 | 0.2 | 0.5 |
| Non-magnetic Powder/Abrasive Ratio | 90/10 | 95/5 | 60/40 | 80/20 | 80/20 | 90/10 |
| Binder: | | | | | | |
| Epoxy Content (eq/g) | $8 \times 10^{-4}$ | $8 \times 10^{-4}$ | $8 \times 10^{-4}$ | $8 \times 10^{-4}$ | $16 \times 10^{-4}$ | $8 \times 10^{-4}$ |
| Molecular weight | 45000 | 45000 | 45000 | 55000 | 35000 | 45000 |
| Thickness ($\mu$m) | 3 | 3 | 3 | 3 | 2.5 | 3.5 |
| Coating System | wet-on-wet | wet-on-wet | wet-on-wet | wet-on-wet | wet-on-wet | wet-on-wet |
| Mixed Region | not observed | not observed | not observed | not observed | not observed | not observed |
| RF Output (dB) | 4.5 | 4.2 | 3.8 | 4.6 | 3.2 | 3.6 |
| Drop Out | 60 | 30 | 80 | 70 | 45 | 90 |
| BER ($\times 10^{-6}$) | 7.0 | 5.0 | 5.5 | 8.0 | 20 | 30 |
| Drop Out Increase | 30 | 11 | 13 | 28 | 45 | 30 |

|  | Sample 16-7 | Sample 16-8 | Sample 16-9 | Compara. Sample 16'-1 | Compara. Sample 16'-2 | Compara. Sample 16'-3 |
|---|---|---|---|---|---|---|
| Layer (b): | | | | | | |
| Ferromagnetic Powder | Fe alloy | Fe alloy | Ba ferrite | Fe alloy | Fe alloy | Fe alloy |
| Major axis ($\mu$m) | 0.18 | 0.18 | — | 0.18 | 0.18 | 0.18 |
| Plate Diameter ($\mu$m) | — | — | 0.1 | — | — | — |
| Thickness ($\mu$m) | 0.3 | 0.3 | 0.3 | 3.3 | 0.3 | 0.3 |
| Layer (a): | | | | | | |
| Non-magnetic Powder | boron nitride | mica | graphite | — | graphite | carbon black |
| Plate Diameter ($\mu$m) | 0.5 | 0.5 | 0.5 | — | 0.5 | 0.2 |
| Abrasive | $\alpha$-Al$_2$O$_3$ | $\alpha$-Al$_2$O$_3$ | $\alpha$-Fe$_2$O$_3$ | — | $\alpha$-Al$_2$O$_3$ | $\alpha$-Al$_2$O$_3$ |
| Particle Size ($\mu$m) | 0.2 | 0.2 | 0.5 | — | 0.2 | 0.5 |
| Non-magnetic Powder/Abrasive Ratio | 90/10 | 90/10 | 90/10 | — | 90/10 | 90/10 |
| Binder: | | | | | | |
| Epoxy Content (eq/g) | $8 \times 10^{-4}$ | $8 \times 10^{-4}$ | $8 \times 10^{-4}$ | — | $8 \times 10^{-4}$ | $8 \times 10^{-4}$ |
| Molecular weight | 45000 | 45000 | 45000 | — | 45000 | 45000 |
| Thickness ($\mu$m) | 3 | 0.8 | 3 | — | 3 | 3 |
| Coating System | wet-on-wet | wet-on-wet | wet-on-wet | single layer | wet-on-dry | wet-on-wet |
| Mixed Region | not observed | not observed | not observed | — | observed | observed |
| RF Output (dB) | 4.2 | 3.7 | 3.9 | 0 | 3.8 | −1.5 |
| Drop Out | 60 | 100 | 45 | 150 | 1200 | 500 |
| BER ($\times 10^{-6}$) | 10 | 8.0 | 9.0 | 400 | 900 | 1200 |
| Drop Out Increase | 14 | 26 | 33 | 75 | 110 | 46 |

|  | Compara. Sample 16'-4 | Compara. Sample 16'-5 | Compara. Sample 16'-6 | Compara. Sample 16'-7 | Compara. Sample 16'-8 | Compara. Sample 16'-9 |
|---|---|---|---|---|---|---|

TABLE 24-continued

| Layer (b): | | | | | | |
|---|---|---|---|---|---|---|
| Ferromagnetic Powder | Fe alloy | Fe alloy | Fe alloy | Fe alloy | Fe alloy | Fe alloy |
| Major axis (μm) | 0.18 | 0.18 | 0.18 | 0.18 | 0.18 | 0.4 |
| Plate Diameter (μm) | — | — | — | — | — | — |
| Thickness (μm) | 0.3 | 1.2 | 0.3 | 0.3 | 0.3 | 0.3 |
| Layer (a): | | | | | | |
| Non-magnetic Powder | graphite | graphite | graphite | graphite | graphite | graphite |
| Plate Diameter (μm) | 0.5 | 0.5 | 0.5 | 0.5 | 0.5 | 0.5 |
| Abrasive | none | α-Al$_2$O$_3$ | α-Al$_2$O$_3$ | α-Al$_2$O$_3$ | α-Al$_2$O$_3$ | α-Al$_2$O$_3$ |
| Particle Size (μm) | — | 0.2 | 0.2 | 0.2 | 0.2 | 0.2 |
| Non-magnetic Powder/Abrasive Ratio | — | 90/10 | 50/50 | 90/10 | 90/10 | 90/10 |
| Binder: | | | | | | |
| Epoxy Content (eq/g) | none | none | 8 × 10$^{-4}$ | 8 × 10$^{-4}$ | 8 × 10$^{-4}$ | 8 × 10$^{-4}$ |
| Molecular weight | — | 45000 | 45000 | 45000 | 25000 | 45000 |
| Thickness (μm) | 3 | 3 | 3 | 0.3 | 3 | 3 |
| Coating System | wet-on-wet | wet-on-wet | wet-on-wet | wet-on-wet | wet-on-wet | wet-on-wet |
| Mixed Region | observed | observed | observed | observed | observed | observed |
| RF Output (dB) | 4 | −3 | −1.2 | −0.8 | −1.8 | −0.5 |
| Drop Out | 48 | 75 | 320 | 320 | 160 | 56 |
| BER (× 10$^{-6}$) | un-measurable | 2000 | 900 | 300 | 1100 | 100 |
| Drop Out Increase | 2500 | 230 | 8 | 18 | 78 | 21 |

As is apparent from the results in Table 23, it is demonstrated that Samples 15-1 through 15-7, in which an acicular magnetic powder is used, have an improved RF output, a reduced drop out, and a low BER. In Table 24, it was also proved that Samples 16-1 to 16-9, in which a flaky non-magnetic powder is used, have improved durability (indicated by the inhibited increase in drop out).

To the contrary, Comparative Samples 15'-1 to 15'-6 and 16'-1 to 16'-9, which are out of the scope of the present invention, failed to attain satisfactory results in one or more of BER, drop out, and RF output. For assistance in understanding the data, it is noted that desired levels of BER, drop out, and RF output are typically not more than 10$^{-4}$, not more than 10, and not less than 3.0 dB, respectively.

As described above, the present invention provides a magnetic recording medium having a plurality of layers formed by a wet-on-wet coating system in which an upper magnetic layer is coated simultaneously or successively while a lower non-magnetic layer is wet, in which the layers do not undergo mixing together at the interface. That is, the magnetic recording material according to the present invention exhibits satisfactory electromagnetic characteristics, particularly a high RF output, excellent running durability, a reduced drop out, and a low block error rate and can be produced with good productivity.

| Coating Composition for Layer (a): | |
|---|---|
| Particulate TiO$_2$ (average particle size: 0.04 μm) | 100 parts |
| Carbon black (average particle size: 20 mμ) | 5 parts |
| Vinyl chloride copolymer (containing —SO$_3$Na and epoxy group) | 8 parts |
| Polyurethane resin (containing —SO$_3$Na; molecular weight: 45000) | 5 parts |
| α-Alumina (average particle size: 0.2 μm) | 5 parts |
| Cyclohexanone | 150 parts |
| Methyl ethyl ketone | 50 parts |

The above components were mixed and dispersed in a sand mill for 4 hours, and to the dispersion were added 5 parts of polyisocyanate (Coronate L), 5 parts of stearic acid, and 10 parts of butyl stearate to prepare a coating composition of layer (a).

| Coating Composition for Layer (b): | |
|---|---|
| Ferromagnetic powder: 5% Co-doped Fe alloy (Hc: 1600 Oe; σ$_s$: 135 emu/g; major axis length: 0.18 μm; acicular ratio: 9) | 100 parts |
| Vinyl chloride copolymer (containing —SO$_3$Na and epoxy group) | 10 parts |
| Polyurethane resin (containing —SO$_3$Na; molecular weight: 45000) | 5 parts |
| α-Alumina (average particle size: 0.2 μm) | 5 parts |
| Cyclohexanone | 100 parts |
| Methyl ethyl ketone | 200 parts |

The above components were mixed and dispersed in a sand mill for 6 hours, and to the dispersion were added 5 parts of polyisocyanate (Coronate L), 5 parts of stearic acid, and 10 parts of butyl stearate to prepare a coating composition of layer (b).

The coating compositions for layers (a) and (b) were simultaneously coated on a 5.5 μm thick polyoxyethylene naphthalate film support by wet-on-wet coating using two doctor blades set at different gaps to a dry thickness of 2.5 μm (layer a) and 0.5 μm (layer b). While the layers (a) and (b) were wet, the ferromagnetic powder in layer (b) was orientated with a permanent magnet, followed by drying. A back layer containing carbon black was coated on the opposite side of the support. Thereafter, the coated film was subjected to supercalendering. The resulting magnetic recording medium was cut to a width of 3.81 mm to obtain a digital audio tape (DAT). This sample was designated 17-1.

Samples 17-2 to 17-8 and Comparative Samples 17'-1 to 17'-8 were prepared in the same manner as for Sample 17-1, except for making alterations according to Tables 25 or 26 below.

Each sample was evaluated according to the following test methods.

Thickness (d) of Magnetic Layer:

Measured according to a fluorescent X-ray method. A calibration curve of fluorescent X-ray intensity for an element inherently contained in a magnetic layer is prepared from magnetic layer samples having a known thickness, and a thickness of a sample of unknown thickness is obtained from its fluorescent X-ray intensity.

Residual Coercive Force (Hr):

A magnetic field of 10 kOe was applied to the sample in the in-plane direction of layer (b). When the thus magnetized sample was turned 90° in the thickness direction, the intensity of the outer magnetic field applied in the normal direction with respect to layer (b) which was required for making the residual magnetization zero was-measured.

In the following testing of electromagnetic characteristics, a DAT deck "DTC-1000" produced by Sony Corporation was used.

Reproduction Output (RF Output):

Signals of single frequency 4.7 MHz were recorded, and the reproduced signals were put into a spectrum analyzer, "HP-3585A". The peak of the signals was read out. The result of Comparative Sample 17'-7 was taken as a standard (0 dB).

Block Error Rate (BER):

A block error rate is a number of error flags per 10000 tracks.

$$BER = \frac{\text{Error Flag}}{10000 \times 128 \text{ Blocks}}$$

DAT has a signal processing system of coding analog signals into digital signals. One signal comprises 8 bits, and one block comprises 32 signals×8 pits=256 bits. Accordingly, one track is constituted by 128 blocks.

Signals of two tracks, i.e., 128×2 blocks, were put in memory and shuffled, and the errors were detected. A DAT deck "DTC-1000" produced by Sony Corporation was used, and a counter "HP5328A" produced by Hewlett Pockard Co. was connected to a standard personal computer.

Dropout (DO):

Signals of a single frequency 4.7 MHz were input, and dropouts 0.5 $\mu$sec in length were counted with a dropout counter on a threshold level of −10 dB.

TABLE 25

|  | Sample 17-1 | Sample 17-2 | Sample 17-3 | Sample 17-4 | Sample 17-5 | Sample 17-6 | Sample 17-7 | Sample 17-8 |
|---|---|---|---|---|---|---|---|---|
| Layer (b): | | | | | | | | |
| Ferromagnetic Powder: | | | | | | | | |
| Kind | Fe alloy | Fe alloy | Fe alloy | Fe alloy | Fe alloy | Fe alloy | Ba ferrite | Ba ferrite |
| Hc (Oe) | 1600 | 1540 | 1580 | 1600 | 1600 | 1620 | 1300 | 1300 |
| Major axis length ($\mu$m) | 0.18 | 0.2 | 0.16 | 0.18 | 0.18 | 0.25 | | |
| Plate diameter ($\mu$m) | | | | | | | 0.1 | 0.1 |
| Hr (Oe) | 1800 | 1640 | 1750 | 1800 | 1620 | 1760 | 1800 | 1800 |
| d ($\mu$m) | 0.5 | 0.5 | 0.5 | 0.8 | 0.5 | 0.5 | 0.5 | 0.5 |
| Layer (a): | | | | | | | | |
| Inorganic Powder: | | | | | | | | |
| Kind | $TiO_2$ | $TiO_2$ | $TiO_2$ | $TiO_2$ | $TiO_2$ | $TiO_2$ | $TiO_2$ | $\alpha\text{-}Fe_2O_3$ |
| True specific gravity | 4.2 | 4.2 | 4.2 | 4.2 | 4.2 | 4.2 | 4.2 | 5.0 |
| Average particle size ($\mu$m) | 0.04 | 0.04 | 0.04 | 0.04 | 0.12 | 0.04 | 0.04 | |
| Acicular ratio | | | | | | | | 12 |
| Major axis length ($\mu$m) | | | | | | | | 0.3 |
| Thickness ($\mu$m) | 2.5 | 2.5 | 2.5 | 2.5 | 2.5 | 2.5 | 2.5 | 2.5 |
| Evaluation: | | | | | | | | |
| RF Output (dB) | 4.5 | 3.2 | 4.2 | 3.9 | 4 | 3 | 3.5 | 3.8 |
| Drop out | 60 | 50 | 35 | 55 | 75 | 40 | 68 | 70 |
| BER | $7 \times 10^{-6}$ | $2 \times 10^{-5}$ | $9 \times 10^{-6}$ | $1 \times 10^{-5}$ | $3 \times 10^{-5}$ | $6 \times 10^{-5}$ | $4 \times 10^{-5}$ | $4 \times 10^{-5}$ |

TABLE 26

|  | Compar. Sample 17'-1 | Compar. Sample 17'-2 | Compar. Sample 17'-3 | Compar. Sample 17'-4 | Compar. Sample 17'-5 | Compar. Sample 17'-6 | Compar. Sample 17'-7 | Compar. Sample 17'-8 |
|---|---|---|---|---|---|---|---|---|
| Layer (b): | | | | | | | | |
| Ferromagnetic Powder: | | | | | | | | |
| Kind | Fe alloy | Fe alloy | Fe alloy | Fe alloy | Fe alloy | Fe alloy | Ba ferrite | Ba ferrite |
| Hc (Oe) | 1250 | 1250 | 1600 | 1600 | 1600 | 1600 | 1600 | 1600 |
| Major axis length ($\mu$m) | 0.3 | 0.3 | 0.18 | 0.18 | 0.18 | 0.18 | 0.4 | 0.18 |
| Hr (Oe) | 1300 | 1300 | 1450 | 1390 | 1690 | 1690 | 1700 | 1470 |

TABLE 26-continued

|  | Compar. Sample 17'-1 | Compar. Sample 17'-2 | Compar. Sample 17'-3 | Compar. Sample 17'-4 | Compar. Sample 17'-5 | Compar. Sample 17'-6 | Compar. Sample 17'-7 | Compar. Sample 17'-8 |
|---|---|---|---|---|---|---|---|---|
| d ($\mu$m) | 0.5 | 0.5 | 0.5 | 1.5 | 0.5 | 0.5 | 0.5 | 0.5 |
| Layer (a): | | | | | | | | |
| Inorganic Powder: | | | | | | | | |
| Kind | TiO$_2$ | | TiO$_2$ | $\alpha$Fe$_2$O$_3$ | TiO$_2$ | TiO$_2$ | TiO$_2$ | carbon black |
| True specific gravity | 4.2 | | 4.2 | 5.0 | 4.2 | 4.2 | 4.2 | 2 |
| Average particle size ($\mu$m) | 0.04 | | 0.3 | | 0.04 | 0.04 | 0.04 | 0.02 |
| Acicular ratio | | | | 12 | | | | |
| Major axis length ($\mu$m) | | | | 1.5 | | | | |
| Thickness ($\mu$m) | 2.5 | 2.5 | 2.5 | 2.5 | 2.5 | 2.5 | 2.5 | 2.5 |
| Evaluation: | | | | | | | | |
| RF Output (dB) | 0.7 | −2.8 | 0.5 | 1 | −0.3 | 0.2 | 0 | 0.5 |
| Dropout | 120 | 1800 | 100 | 65 | 45 | 1500 | 160 | 150 |
| BER | $3 \times 10^{-3}$ | all error | $5 \times 10^{-3}$ | $2 \times 10^{-3}$ | $8 \times 10^{-3}$ | $5 \times 10^{-2}$ | $6 \times 10^{-3}$ | $9 \times 10^{-4}$ |

As shown in Tables 25 and 26, Samples 17-1 to 17-8 according to the present invention exhibit satisfactory electromagnetic characteristics, i.e., high RF output, low dropout, and low BER. Comparative Samples 17'-1 to 17'-4 and 17'-8 have low Hr and show no improvement in output. Comparative Sample 17'-2 using no inorganic powder in layer (a) is poor in dropout and BER. Comparative Sample 17'-4 using an inorganic powder of high acicular ratio achieves no improvement in electromagnetic characteristics assumably because of disturbed orientation of the ferromagnetic alloy powder in layer (b). Both of Comparative Sample 17'-5 having a thick magnetic layer (1.5 $\mu$m) and Comparative Sample 17'-6 having a thin non-magnetic lower layer (0.3 $\mu$m) did not exhibit satisfactory characteristics. Comparative Sample 17'-7 using a ferromagnetic layer of long major axis (0.4 $\mu$m) also failed to obtain improved characteristics.

EXAMPLE 18

| Coating Composition for Layer (a): | |
|---|---|
| Particulate TiO$_2$ (average particle size: 0.04 $\mu$m) | 100 parts |
| Carbon black (average particle size: 20 m$\mu$) | 5 parts |
| Vinyl chloride copolymer (containing —SO$_3$Na and epoxy groupy | 8 parts |
| Polyurethane resin (containing —SO$_3$Na; molecular weight: 45000) | 5 parts |
| $\alpha$-Alumina (average particle size: 0.2 $\mu$m) | 5 parts |
| Cyclohexanone | 150 parts |
| Methyl ethyl ketone | 50 parts |

The above components were mixed and dispersed in a sand mill for 4 hours, and to the dispersion were added 5 parts of polyisocyanate (Coronate L), 5 parts of stearic acid, and 10 parts of butyl stearate to prepare a coating composition of layer (a).

| Coating Composition for Layer (b): | |
|---|---|
| Ferromagnetic powder: 5% Co-doped Fe alloy (Hc: 1600 Oe; $\sigma_s$: 130 emu/g; major axis length: 0.18 $\mu$m; acicular ratio: 8) | 100 parts |
| Vinyl chloride copolymer (containing —SO$_3$Na and epoxy group) | 10 parts |
| Polyurethane resin (containing —SO$_3$Na; molecular weight: 45000) | 5 parts |
| $\alpha$-Alumina (average particle size: 0.2 $\mu$m) | 5 parts |
| Cyclohexanone | 100 parts |
| Methyl ethyl ketone | 200 parts |

The above components were mixed and dispersed in a sand mill for 6 hours, and to the dispersion were added 5 parts of polyisocyanate (Coronate L), 5 parts of stearic acid, and 10 parts of butyl stearate to prepare a coating composition of layer (b).

The coating compositions for layers (a) and (b) were simultaneously coated on a 5.5 $\mu$m thick polyoxyethylene naphthalate film support by wet-on-wet coating using two doctor blades set at different gaps to a dry thickness of 2.5 $\mu$m (layer a) and 0.5 $\mu$m (layer b). While the layers (a) and (b) were wet, the ferromagnetic powder in layer (b) was orientated with a permanent magnet, followed by drying. A back layer containing carbon black was coated on the opposite side of the support. Thereafter, the coated film was subjected to supercalendering. The resulting magnetic recording medium was cut to a width of 3.81 mm to obtain a digital audio tape (DAT). This sample was designated 18-1.

Samples 18-2 to 18-5 and Comparative Samples 18'-1 to 18'-6 were prepared in the same manner as for Sample 18-1, except for making alterations according to Tables 27 or 28 below. Comparative Sample 18'-2 was prepared by successive wet-on-dry coating.

Each sample was evaluated in the same manner as in Example 17, and the results obtained are shown in Tables 27 and 28.

TABLE 27

|  | Sample 18-1 | Sample 18-2 | Sample 18-3 | Sample 18-4 | Sample 18-5 |
|---|---|---|---|---|---|
| Layer (b): | | | | | |
| Ferromagnetic Powder: | | | | | |
| Kind | Fe alloy | Fe alloy | Fe alloy | Fe alloy | Fe alloy |
| Major axis length ($\mu$m) | 0.18 | 0.24 | 0.18 | 0.18 | 0.18 |
| Acicular ratio | 8 | 10 | 11 | 8 | 8 |
| Hc in MD (Oe) | 1600 | 1550 | 1700 | 1600 | 1600 |
| Hc in TD (Oe) | 1200 | 1100 | 1180 | 1070 | 1230 |
| d ($\mu$m) | 0.5 | 0.5 | 0.85 | 0.15 | 0.3 |
| Layer (a): | | | | | |
| Inorganic Powder: | | | | | |
| Kind | $TiO_2$ | $TiO_2$ | $TiO_2$ | $\alpha Fe_2O_3$ | $\alpha Fe_2O_3$ |
| True specific gravity | 4.2 | 4.2 | 4.2 | 5 | 5 |
| Average particle size ($\mu$m) | 0.04 | 0.04 | 0.04 | | |
| Acicular ratio | | | | 7 | 16 |
| Major axis length ($\mu$m) | | | | 0.3 | 0.8 |
| Thickness ($\mu$m) | 2.5 | 0.8 | 2.5 | 3.5 | 3 |
| Evaluation: | | | | | |
| RF Output (dB) | 4.5 | 2.9 | 3.2 | 3.6 | 4.2 |
| Dropout | 60 | 70 | 45 | 180 | 60 |
| BER | $2 \times 10^{-6}$ | $8 \times 10^{-5}$ | $2 \times 10^{-6}$ | $1 \times 10^{-5}$ | $7 \times 10^{-6}$ |

TABLE 28

|  | Compar. Sample 18'-1 | Compar. Sample 18'-2 | Compar. Sample 18'-3 | Compar. Sample 18'-4 | Compar. Sample 18'-5 | Compar. Sample 18'-6 |
|---|---|---|---|---|---|---|
| Layer (b): | | | | | | |
| Ferromagnetic Powder: | | | | | | |
| Kind | Fe alloy | Fe alloy | Fe alloy | Fe alloy | Fe alloy | Fe alloy |
| Major axis length ($\mu$m) | 0.18 | 0.18 | 0.18 | 0.3 | 0.24 | 0.18 |
| Acicular ratio | 8 | 8 | 8 | 10 | 19 | 8 |
| Hc in MD (Oe) | 1600 | 1600 | 1600 | 1250 | 1650 | 1600 |
| Hc in TD (Oe) | 1040 | 1150 | 1060 | 870 | 900 | 1200 |
| d ($\mu$m) | 3.3 | 0.5 | 0.5 | 0.5 | 0.5 | 0.5 |
| Layer (a): | | | | | | |
| Inorganic Powder: | | | | | | |
| Kind | | $TiO_2$ | carbon black | $TiO_2$ | $TiO_2$ | $TiO_2$ |
| True specific gravity | | 4.2 | 2 | 4.2 | 4.2 | 4.2 |
| Average particle size ($\mu$m) | | 0.04 | 0.02 | 0.04 | 0.04 | 0.04 |
| Thickness ($\mu$m) | | 2.5 | 2.5 | 2.5 | 2.5 | 0.3 |
| Evaluation: | | | | | | |
| RF Output (dB) | 0 | 3.8 | −1.5 | −1.8 | 0.8 | −0.8 |
| Dropout | 150 | 1200 | 50 | 80 | 75 | 750 |
| BER | $2 \times 10^{-4}$ | $5 \times 10^{-4}$ | $3 \times 10^{-3}$ | $2 \times 10^{-3}$ | $1 \times 10^{-4}$ | $8 \times 10^{-4}$ |

As can be seen from Tables 27 and 28, the samples according to the present invention exhibit excellent electromagnetic characteristics, i.e., high RF output, reduced dropout, and reduced BER. Comparative Sample 18'-1 is an example having no lower non-magnetic layer. Comparative Sample 18'-2, which is prepared by wet-on-dry coating system has increased BER and increased dropout. Comparative Sample 18'-3 using carbon black in place of an inorganic powder does not satisfy BER and reproduction output. Comparative Sample 18'-4 using an excessively large ferromagnetic alloy powder has a low Hc in both TD and MD and therefore fails to obtain high reproduction output and also suffers from high BER. Comparative Sample 18'-5 using a ferromagnetic powder of high acicular ratio has a lower Hc in TD than the level specified in the present invention and therefore fails to obtain high reproduction output and also shows no improvement in BER. Comparative Sample 18'-6 having a thin lower layer fails to satisfy all the electromagnetic requirements.

EXAMPLE 19

A polyethylene terephthalate film support (thickness: 10 $\mu$m; F5 value: 20 kg/mm² in MD, 14 kg/mm² in TD; Young's modulus: 750 kg/mm² in MD, 470 kg/mm² in TD) (hereinafter abbreviated as PET support) or a polyethylene terenaphthalate film support (thickness: 7 $\mu$m; F5 value: 22 kg/mm² in MD, 18 kg/mm² in TD; Young's modulus: 750 kg/mm² in MD, 750 kg/mm² in TD) (hereinafter abbreviated as PEN support) was used.

| Coating Composition for Subbing Layer: | |
|---|---|
| —SO₃Na-Containing polyester resin (Tg: 65° C.; Na content: 4600 ppm) | 100 parts |
| Cyclohexanone | 9900 parts |

The above composition was stirred in a disper stirrer for 12 hours, and the resulting coating composition was coated on the PET or PEN support with a bar coater to a dry thickness of 0.1 $\mu$m.

| Coating Composition for Layer (a): | |
|---|---|
| Rutile TiO₂ (average particle size: 0.035 $\mu$m; TiO₂ content: ≧90%; BET specific surface area: 35 to 45 m²/g; true specific gravity: 4.1; pH: 6.5 to 8.0) | 85 parts |
| Carbon black (average particle size: 16 m$\mu$; DBP absorption: 80 ml/100 g; pH: 8.0; BET specific surface area: 250 m²/g; coloring power: 143%) | 5 parts |
| Vinyl chloride copolymer (—SO₃Na content: 8 × 10⁻⁵ eq/g; containing —OH and epoxy groups; Tg: 71° C.; polimerization degree: 300; Mn: 12000; Mw: 38000) | 13 parts |
| Polyurethane resin (-SO3Na content: 8 × 10⁻⁵ eq/g; —OH content: 8 × 10⁻⁵ eq/g; Tg: 38° C.; Mw: 50000) | 5 parts |
| Cyclohexane | 100 parts |
| Methyl ethyl ketone | 100 parts |

The above components were mixed and dispersed in a sand mill for 4 hours. To the mixture were added 5 parts of polyisocyanate (Coronate L), 5 parts of oleic acid, 5 parts of stearic acid, and 15 parts of butyl stearate to prepare a coating composition for layer (a).

| Coating Composition for Layer (b): | |
|---|---|
| Ferromagnetic powder: Fe/Co/Ni alloy (92:6:2; Hc: 1600 Oe; σₛ: 119 emu/g; major axis length: 0.13 $\mu$m; acicular ratio: 7; crystallite size: 172 Å; water content: 0.6%) | 100 parts |
| Vinyl chloride copolymer (—SO₃Na content: 8 × 10⁻⁵ eq/g; containing —OH and epoxy group; Tg: 71° C.; polymerization degree: 300; number average molecular weight (Mn): 12000; weight average molecular weight (Mw): 38000) | 13 parts |
| Polyurethane resin (-SO3Na content: 8 × 10⁻⁵ eg/g; -OH content: 8 × 10⁻⁵ eq/g; Tg: 38° C.; Mw: 50000) | 5 parts |

| Coating Composition for Layer (b): -continued | |
|---|---|
| α-Alumina (average particle size: 0.15 $\mu$m; BET specific surface area: 8.7 m²/g; pH: 8.2; water content: 0.06%) | 12 parts |
| Cyclohexanone | 150 parts |
| Methyl ethyl ketone | 150 parts |

The above components were mixed and dispersed in a sand mill for 6 hours. To the mixture were added 5 parts of polyisocyanate (Coronate L), 5 part of oleic acid, 7 parts of stearic acid, and 15 parts of butyl stearate to prepare a coating composition for layer (b).

On the subbing layer side of the support were simultaneously coated with the coating compositions for layers (a) and (b) by use of two doctor blades set at different gaps to form layer (a) having a dry thickness of 3.0 $\mu$m and layer (b) having a dry thickness of 0.3 $\mu$m. The ferromagnetic powder in layer (b) was orientated with a permanent magnet of 3500 G and a solenoid of 1600 G. After drying, the coated film was supercalendered through metallic rolls at 80° C.

| Coating Composition for Back Layer: | |
|---|---|
| Carbon black (BET specific surface area: 220 m²/g; average particle size: 17 m$\mu$; DBP absorption: 75 ml/100 g; volatile content: 1.5%; pH: 8.0; bulk density: 15 lbs/ft³) | 100 parts |
| Nitrocellulose "RS1/2" | 100 parts |
| Polyester polyurethane "Nippollan" Dispersing agent: | 30 parts |
| Copper oleate | 10 parts |
| Copper phthalocyanine | 10 parts |
| Barium sulfate (precipitated) | 5 parts |
| Methyl ethyl ketone | 500 parts |
| Toluene | 500 parts |

The above components were preliminarily kneaded and then kneaded in a roll mill. To 100 parts of the resulting dispersion were added 100 parts of carbon black (BET specific surface area: 200 m²/g; average particle size: 200 m$\mu$; DBP absorption: 36 ml/100 g; pH: 8.5) and 0.1 part of α-Al₂O₃ (average particle size: 0.2 $\mu$m), and the mixture was dispersed in a sand grinder, followed by filtration. To 100 parts of the resulting dispersion were further added 120 parts of methyl ethyl ketone and 5 parts of polyisocyanate to prepare a coating composition for a back layer.

The resulting coating composition was coated on the non-magnetic support on the side opposite to layer (b) with a bar coater to a dry thickness of 0.5 $\mu$m. The resulting magnetic recording medium was cut to a width of 8 mm to prepare a 8 mm video tape. The sample using a PET support was designated sample 11-1, and that using a PEN support Sample 11-2.

Each of Samples 19-1 and 19-2 was evaluated according to the following test methods.

1) TEM Observations:

A sample was sliced with a diamond cutter to prepare an about 0.1 $\mu$m thick specimen. The specimen was photographed with TEM. The interface between layers (a) and (b) and the surface of layer (b) were marked, and the thickness of layer (b) was measured with an image analyzer "IBAS II" to obtain an average d and a standard deviation σ.

As a result, layer (b) had a d of 0.45 $\mu$m. A layer (b) thickness suitable for practical use was proved to be not more than 1 μm, and particularly not more than 0.6 μm. The standard deviation σ of the layer (b) thickness variation was found to be not more than 0.08 μm. A practically useful σ was proved to be not more than 0.02 μm, and particularly not more than 0.01 μm.

The above-prepared sample was stretched to have layer (b) released from the support, and layer (b) was scraped off with a cutter blade. The thus removed layer (b) weighing 500 mg was refluxed in 100 ml of a 1N NaOH/methanol solution for 2 hours to hydrolyze the binders. The supernatant liquor was removed with the ferromagnetic powder of greater specific gravity being precipitated. The solid was washed three times with water and then three times with tetrahydrofuran, followed by drying in a vacuum drier at 50° C. The resulting ferromagnetic powder was dispersed in collodion and observed under TEM (×60000). The ferromagnetic powder was found to have a major axis length of 0.13 μm and an acicular ratio of 10. It was proved that a major axis length should be not more than 0.4 μm, and preferably not more than 0.3 μm, for practical use and that an acicular ratio should fall within a range of from 2 to 20, and preferably from 2 to 15, for practical use.

2) Atomic Force Microscope (AFM):

Surface roughness $R_{rms}$ was obtained by scanning the surface of layer (b) with "Nanoscope II" manufactured by Digital Instrument Co. over an area of 6 μm×6 μm at a tunnel current of 10 nA and a bias voltage of 400 mV.

As a result, $R_{rms}$ was 6 nm. It was proved that $R_{rms}$ should be not more than 10 nm, and preferably not more than 8 nm, for practical use.

3) Surface Roughness Tester:

Surface roughness was measured using 3d-MIRAU. Centerline surface roughness (Ra), $R_{rms}$, and peak-to-valley value of layer (b) over an area of about 250 μm×250 μm were measured according to a MIRAU method by means of "TOPO 3D" manufactured by WYKO K.K. Spherical corrections and cylindrical corrections were made at a measuring wavelength of about 650 nm. This testing system is a non-contact roughness tester utilizing interference of light.

As a result, Ra was 2.7 nm. It was proved that a practically useful Ra is from 1 to 4 nm, and particularly from 2 to 3.5 nm. $R_{rms}$ was 3.5 nm. A practically useful $R_{rms}$ is from 1.3 to 6 nm, and particularly from 1.5 to 5 nm. P-V value was between 20 and 30 nm. A practically useful P-V value is not more than 80 nm, and particularly from 10 to 60 nm.

4) Vibrating Sample Magnetometer (VSM):

Magnetic characteristics of the sample were measured at Hm of 5 kOe with VSM manufactured by Toei Kogyo K.K.

The result were Hc: 1620 Oe; Hr: 1800 Oe; Br/Bm: 0.82; SFD: 0.583. For practical use, it was found that Hc should be from 1500 to 2500 Oe, and preferably from 1600 to 2000 Oe; Hr should be from 1000 to 2800 Oe, and preferably from 1200 to 2500 Oe; Br/Bm should be at least 0.75, and preferably at least 0.8; and SFD should be 0.7 or less, and preferably 0.6 or less.

5) X-Ray Diffraction:

X-ray diffractometry was conducted using the ferromagnetic powder sampled from layer (b) in 1) above. The magnetic tape was directly set on an X-ray diffractometer. A crystallite size of the ferromagnetic powder was obtained from the half-width value of the diffraction pattern of the faces (4,4,0) and (2,2,0). As a result, the crystallite size was 180 Å. For practical use, a crystallite size is preferably not more than 400 Å, and more preferably from 100 to 300 Å.

6) Tensile Test:

Young's modulus, yield stress, and yield elongation of the magnetic tape were measured with a tensile tester "STM-T-50BP" manufactured by Toyo Baldwin K.K. in an atmosphere of 23° C. and 70% RH at a rate of pulling of 10%/min.

As a result, the sample had a Young's modulus (modulus of elasticity at 0.5% elongation) of kg/mm$^2$, a yield stress of from 6 to 7 kg/mm$^2$, and a yield elongation of 0.8%. For practical use, a Young's modulus (modulus of elasticity at 0.5% elongation) preferably ranges from 400 to 2000 kg/mm$^2$, and more preferably from 500 to 1500 kg/mm$^2$; a yield stress preferably ranges from 3 to 20 kg/mm$^2$, and more preferably from 4 to 15 kg/mm$^2$; a yield elongation preferably ranges from 0.2 to 8%, and more preferably from 0.4 to 5%.

7) Stiffness in Flexure, Loop Stiffness:

Stiffness in flexure was expressed in terms of a force (mg) required for giving a 5 mm displacement to a 8 mm wide and 50 mm long sample in a loop form with use of a loop stiffness tester at a rate of displacement of about 3.5 mm/sec.

As a result, the 8 mm wide p6-120 tape having a thickness of 10.5 μm had a stiffness between 40 and 60 mg. With a thickness of 10.5±1 μm, a preferred stiffness is from 20 to 90 mg, and particularly from 30 to 70 mg, for practical use. With a thickness of 11.5 μm or more, a preferred stiffness is from 40 to 200 mg. With a thickness of 9.5 μm or less, a preferred stiffness is from 10 to 70 mg.

8) Elongation at Failure:

Elongation at cracking was measured at 23° C. and 70% RH. A 10 cm long specimen was pulled at both ends thereof at a rate of 0.1 mm/sec while microscopically observing the surface of layer (b). The elongation (%) at which 5 or more clear cracks developed on the surface of layer (b) was measured.

As a result, the sample had an elongation at cracking of 4%. It was proved that a preferred elongation at cracking is not more than 20%, and particularly not more than 10%, for practical use.

9) Percent Thermal Shrinkage:

The sample was preserved in a thermostat at 70° C. for 48 hours. The change in length between before and after the preservation was divided by the length before preservation to obtain a percent thermal shrinkage.

As a result, the percent thermal shrinkage of the sample was 0.2%. It was proved that a practically preferred percent thermal shrinkage is not more than 0.4%, and particularly between 0.1 and 0.3%.

10) ESCA:

Cl/Fe spectrum α and N/Fe spectrum β were measured with an X-ray photoelectric spectrophotometer (manufactured by Perkin-Elmer Co.) at 300 W using an Mg anode as an X-ray source. After washing away the lubricant in the sample with n-hexane, the sample was set in an X-ray photoelectric spectrophotometer at a distance of 1 cm from the X-ray source. After 5 minutes from evacuation, Cl-2P spectrum, N-1S spectrum, and Fe-2P (3/2) spectrum were integrated for 10 minutes. A pass energy was fixed at 100 eV. An integrated intensity ratio of the Cl-2P spectrum to the Fe-2P (3/2) spectrum was calculated to obtain α. An integrated intensity ratio of the N-1S spectrum to the Fe-2P (3/2) spectrum was calculated to obtain β.

As a result, α was 0.45, and β was 0.07. It was proved that a practically preferred range of α is from 0.3 to 0.6, and particularly from 0.4 to 0.5, and that of β is from 0.03 to 0.12, and particularly from 0.04 to 0.1.

11) Dynamic Viscoelastometer:

Dynamic viscoelasticity of the sample was measured at 110 Hz with a dynamic viscoelastometer "Rheovibron" manufactured by Toyo Baldwin Co. The peak temperature at E" was taken as Tg. This measurement system comprises adding vibration to one end of the tape and measuring the vibration transmitted to the other end.

It was found, as a result, that Tg was 73° C.; E' (50° C.) was $4\times10^{10}$ dyne/cm$^2$; and E" (50° C.) was $1\times10^{11}$. It was proved that a practically preferred range of Tg is from 40 to 120° C., and particularly from 50 to 110° C., that of E' (50° C.) is from $0.8\times10^{11}$ to $11\times10^{11}$ dyne/cm$^2$, and particularly from $1\times10^{11}$ to $9\times10^{11}$ dyne/cm$^2$, and that of E" (50° C.) is from $0.5\times10^{11}$ to $8\times10^{11}$ dyne/cm$^2$, and particularly from $0.7\times10^{11}$ to $5\times10^{11}$ dyne/cm$^2$.

12) Adhesive Strength:

Adhesive tape produced by 3M was adhered onto a 8 mm wide sample, and a 180° peel strength between the support and the magnetic layer was measured at 23° C. and 70% RH.

As a result, the adhesive strength was 50 g. It was proved that an adhesive strength is preferably 10 g or more, and particularly 20 g or more, for practical use.

13) Wearability:

The sample was placed on a slide glass with both ends thereof fixed with adhesive tape, and a steel ball 6.25 mm in diameter was slid thereon under a load of 50 g. In this case, the ball was once slid over a distance of 20 mm at a speed of 20 mm/sec and then moved to a fresh magnetic layer surface, where the same sliding was repeated 20 times. Thereafter, the sliding surface of the steel ball was observed with a microscope (×40) to obtain its diameter, assuming the sliding surface being a circle. The abrasion wear was calculated from the measured diameter.

As a result, the abrasion wear was found to be $0.7\times10^{-5}$ to $1.1\times10^{-5}$ mm$^3$. For practical use, the abrasion wear was from $0.1\times10^{-5}$ to $5\times10^{-5}$ mm$^3$, and particularly from $0.4\times10^{-5}$ to $2\times10^{-5}$ mm$^3$.

14) Scanning Electron Microscope (SEM):

Five micrographs were taken of the surface of layer (b) with SEM "S-900" manufactured by Hitachi, Ltd. (×5000). The average number of abrasive grains appearing on the surface was found to be $0.2/\mu m^2$. It was proved that a practically usually number of abrasive grains is at least $0.1/\mu m^2$, and particularly from 0.12 to $0.5/\mu m^2$.

15) Gas Chromatography (GC):

A specimen having an area of 20 cm$^2$ was heated to 120° C., and the residual solvent was measured with a gas chromatograph "GC-14A" manufactured by Shimazu Seisakusho Ltd.

As a result, the residual solvent was 8 mg/m$^2$. It was found that a residual solvent is preferably not more than 50 mg/m$^2$, and particularly not more than 20 mg/m$^2{}_1$, for practical use.

16) Sol Fraction:

A weight ratio of tetrahydrofuran-soluble solid contents of the magnetic layer to the magnetic layer was found to be 7%. It was proved that a sol fraction is preferably not more than 15%, and particularly not more than 10%, for practical use.

Samples 19-1 and 19-2 were compared with commercially available 8 mm video tapes according to the above-mentioned test methods or commonly employed methods, and the results obtained are shown in Table 29. Standards for rating the results were as follows.

| Jitter: | |
|---|---|
| Good . . . | less than 0.2 μsec |
| Bad . . . | 0.2 μsec or more |

| Preservation Stability: | |
|---|---|
| Good . . . | No rust occurred after preservation at 60° C. and 90% RH for 2 weeks. |
| Bad . . . | Rust occurred after preservation at 60° C. and 90% RH for 2 weeks. |
| Running Durability: | |
| Good . . . | No jamming occurred during 100 passes. |
| Bad . . . | Jamming occurred during 100 passes. |
| Scratch Resistance: | |
| Good . . . | No scratches were visually perceived after 10 minutes running in a still mode. |
| Bad . . . | Scratches were visually perceived after 10 minutes running in a still mode. |

TABLE 29

| | Sample 19-1 | Sample 19-2 | Single Coated-Metal Tape[1] | Deposited Tape[2] |
|---|---|---|---|---|
| Electromagnetic Characteristics: | | | | |
| 7 MHZ Output (dB) | 5.5 | 6.0 | 3.0 | 6.2 |
| C/N (dB) | 4.3 | 4.5 | 2.0 | 4.1 |
| Color S/N (dB) | 2.5 | 2.6 | 2.5 | −3.0 |
| Video S/N (dB) | 2.1 | 2.3 | 1.5 | 0.5 |
| Durability: | | | | |
| Dropout | 40 | 30 | 30 | 580 |
| BER (×10$^{-5}$) | 4 | 2 | 50 | 80 |
| Jitter | good | good | good | bad |
| Still | ≧30 min | ≧30 min | ≧30 min | ≧30 min |
| Head Wear (μm/100 hr) | 1.2 | 1.4 | 2.0 | 0.2 |
| Preservation Stability (60° C., 90% RH) | good | good | good | bad |
| Running Durability | good | good | good | bad |
| Scratch Resistance | good | good | good | medium to bad |

Note:
[1]: Product of Fuji Photo Film Co., Ltd.; Lot No. 407209M
[2]: Product of Sony Corporation; Lot No. 709011CD While the invention has been described in detail and with reference to specific examples thereof, it will be apparent to one skilled in the art that various changes and modifications can be made therein without departing from the spirit and scope thereof.

What is claimed is:

1. A magnetic recording medium, comprising:

a support;

at least one lower layer disposed over the support, the lower layer formed from a coating solution comprising a non-magnetic inorganic powder dispersed in a binder;

at least one upper magnetic layer formed over the lower layer from a coating solution comprising a ferromagnetic powder dispersed in a binder, said upper magnetic layer having a thickness (d) of 1.0 μm or less and said ferromagnetic powder in the upper magnetic layer having a crystallite size of from 100 to 450 Å and said upper magnetic layer having a coercive force (Hc) of from 1,200 to 3,000 Oe and a maximum magnetic flux density (Bm) of from 2,100 to 4,500 gauss.

2. The magnetic recording medium as claimed in claim 1, wherein said flexible support has a center line average surface roughness of 0.03 μm or less.

3. The magnetic recording medium as claimed in claim 1, wherein said lower non-magnetic layer is formed by wet coating the non-magnetic coating solution comprising the powder dispersed in the binder for the lower layer on the support and said upper magnetic layer is formed simultaneously or successively by coating the upper layer magnetic coating solution comprising the ferromagnetic powder dispersed in the binder on the lower non-magnetic layer, while the lower non-magnetic layer is wet.

4. The magnetic recording medium as claimed in claim 1, wherein said non-magnetic coating solution comprising the powder dispersed in the binder for said lower non-magnetic layer has a thixotropic property.

5. The magnetic recording medium as claimed in claim 1, wherein said ferromagnetic powder for said upper magnetic layer is a ferromagnetic alloy powder comprising as a main component at least one of Fe, Ni and Co and an optional other component selected from the group consisting of Al, Si, S, Sc, Ti, V, Cr, Cu, Y, Mo, Rh, Pd, Ag, Sn, Sb, Te, Ba, Ta, W, Re, Au, Pb, Bi, La, Ce, Pr, Nd, P, Co, Mn, Zn, Ni, Sr and B.

6. The magnetic recording medium as claimed in claim 1, wherein said lower non-magnetic layer contains an inorganic powder having a Mohs hardness of 4 or more.

7. The magnetic recording medium as claimed in claim 1, wherein said powder for the lower non-magnetic layer is at least one inorganic powder selected from the group consisting of α-alumina having an alpha-conversion of 90% or more, β-alumina, γ-alumina, silicon carbide, chromium oxide, cerium oxide, α-iron oxide, corundum, silicon nitride, titanium carbide, titanium oxide, silicon dioxide, tungsten oxide, zirconium oxide, boron nitride, zinc oxide, calcium carbonate, calcium sulfate, barium sulfate and molybdenum disulfide.

8. The magnetic recording medium as claimed in claim 1, wherein said lower layer contains a magnetic powder.

9. The magnetic recording medium as claimed in claim 1, wherein said powder for the lower non-magnetic layer contains a magnetic powder and said non-magnetic layer has a maximum magnetic flux density (Bm) of 500 gauss or less.

10. The magnetic recording medium as claimed in claim 1, wherein said flexible support has a modulus of elasticity of from 100 to 2,000 kg/mm$^2$.

11. The magnetic recording medium as claimed in claim 1, wherein said support is formed of at least one flexible support material selected from the group consisting of polyethylene terephthalate, polyethylene naphthalate, polyolefins, cellulose triacetate, polycarbonate, polyamide, polyimide, polyamide-imide, polysulfone, aramide and aromatic polyamide.

12. A magnetic recording medium according to claim 1, wherein said upper magnetic layer has a thickness of from 0.05 to 0.31 μm.

13. A magnetic recording medium according to claim 1, wherein an average thickness variation (Δd) at the interface between said upper magnetic layer and lower layer is not more than d/2.

* * * * *